United States Patent
Lee et al.

(10) Patent No.: US 11,143,938 B2
(45) Date of Patent: Oct. 12, 2021

(54) LENS DRIVING DEVICE, CAMERA MODULE AND OPTICAL INSTRUMENT

(71) Applicant: LG INNOTEK CO., LTD., Seoul (KR)

(72) Inventors: Sung Guk Lee, Seoul (KR); Seong Min Lee, Seoul (KR); Sang Jun Min, Seoul (KR); Tae Jin Jung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 259 days.

(21) Appl. No.: 16/480,110

(22) PCT Filed: Feb. 12, 2018

(86) PCT No.: PCT/KR2018/001814
§ 371 (c)(1),
(2) Date: Jul. 23, 2019

(87) PCT Pub. No.: WO2018/147697
PCT Pub. Date: Aug. 16, 2018

(65) Prior Publication Data
US 2019/0377241 A1    Dec. 12, 2019

(30) Foreign Application Priority Data

Feb. 10, 2017  (KR) .......................... 10-2017-0018826
Mar. 3, 2017   (KR) .......................... 10-2017-0027847
Apr. 7, 2017   (KR) .......................... 10-2017-0045169

(51) Int. Cl.
*G03B 13/36*    (2021.01)
*G02B 7/09*     (2021.01)
(Continued)

(52) U.S. Cl.
CPC .............. *G03B 13/36* (2013.01); *G02B 7/09* (2013.01); *G02B 27/646* (2013.01); *G03B 5/00* (2013.01);
(Continued)

(58) Field of Classification Search
None
See application file for complete search history.

(56) References Cited

U.S. PATENT DOCUMENTS

2011/0096178 A1* 4/2011 Ryu .................... H04N 5/2252
                                                         348/208.2
2012/0025633 A1  2/2012 Lee et al.
(Continued)

FOREIGN PATENT DOCUMENTS

CN           101990755 A        3/2011
CN           105141105 A        12/2015
(Continued)

*Primary Examiner* — William B Perkey
(74) *Attorney, Agent, or Firm* — Birch, Stewart, Kolasch & Birch, LLP

(57) ABSTRACT

A camera module comprises: a first camera module; and a second camera module including a second side that faces a first side of the first camera module, wherein the first camera module comprises: a housing; a bobbin disposed inside the housing; a coil disposed on the outer circumferential surface of the bobbin; and two magnets, facing each other, that are arranged at the sides of the housing in the direction perpendicular to the first side of the first camera module, so as to face the coil, wherein each of the two magnets comprises: an upper surface; a lower surface; an inner surface facing the coil; an outer surface disposed on the reverse side to the inner surface; and two side surfaces connecting the inner surface and the outer surface, wherein a depressed part is provided on the side surface of the magnet, among the two side surfaces of the magnet, that is disposed on the first side of the first camera module, the depressed part being formed by recessing a portion of the side surface of the magnet, and the area of the inner surface of the magnet is smaller than the area of the outer surface of the magnet.

20 Claims, 38 Drawing Sheets

(51) Int. Cl.
*G02B 27/64* (2006.01)
*G03B 5/00* (2021.01)
*H04N 5/225* (2006.01)

(52) U.S. Cl.
CPC ......... *H04N 5/2252* (2013.01); *H04N 5/2253* (2013.01); *H04N 5/2254* (2013.01); *H04N 5/2257* (2013.01); *G03B 2205/0007* (2013.01); *G03B 2205/0069* (2013.01)

(56) References Cited

U.S. PATENT DOCUMENTS

| | | | |
|---|---|---|---|
| 2016/0018720 A1 | 1/2016 | Bachar et al. | |
| 2016/0320584 A1* | 11/2016 | Lee | G02B 7/08 |
| 2017/0146772 A1 | 5/2017 | Min et al. | |
| 2018/0027185 A1* | 1/2018 | Miller | G02B 7/09 |
| | | | 348/208.11 |
| 2020/0200994 A1* | 6/2020 | Park | G02B 7/04 |

FOREIGN PATENT DOCUMENTS

| | | |
|---|---|---|
| KR | 10-2012-0053836 A | 5/2012 |
| KR | 10-2016-0005927 A | 1/2016 |
| KR | 10-2016-0045384 A | 4/2016 |
| KR | 10-2017-0002804 A | 1/2017 |
| TW | 201830121 A | 8/2018 |
| WO | WO 2015/199341 A1 | 12/2015 |
| WO | WO 2016/156996 A1 | 10/2016 |

\* cited by examiner

LENS DRIVING DEVICE, CAMERA MODULE AND OPTICAL INSTRUMENT

CROSS REFERENCE TO RELATED APPLICATIONS

This application is the National Phase of PCT International Application No. PCT/KR2018/001814, filed on Feb. 12, 2018, which claims priority under 35 U.S.C. 119(a) to Patent Application Nos. 10-2017-0018826, filed in the Republic of Korea on Feb. 10, 2017; 10-2017-0027847, filed in the Republic of Korea on Mar. 3, 2017, and 10-2017-0045169, filed in the Republic of Korea on Apr. 7, 2017, all of which are hereby expressly incorporated by reference into the present application.

TECHNICAL FIELD

The present invention relates to a lens driving device, a camera module and an optical instrument.

BACKGROUND ART

The following description merely provides background information for the present embodiment and does not describe the prior art.

With the widespread use of various portable terminals and the commercialization of wireless Internet services, demands of consumers related to portable terminals have diversified, and various kinds of additional devices have been installed in portable terminals.

Among them, there is a camera module which photographs a subject as a photograph or a moving picture. Meanwhile, in recent years, a dual camera module in which two camera modules are arranged side by side has been studied.

However, in the dual camera module of the prior art, the distances between the camera modules are narrow and there is a problem that mutual magnetic field interference occurs.

DETAILED DESCRIPTION OF THE INVENTION

Technical Subject

The present embodiment is intended to provide a camera module in which the occurrence of magnetic field interference between two camera modules is minimized.

Further, the present embodiment is intended to provide a lens driving device comprising a structure that minimizes magnetic interference to an AF feedback sensor of a drive magnet.

It is intended to provide a lens driving device being provided in the camera module. It is intended to provide an optical instrument comprising the camera module.

Technical Solution

In one embodiment, the camera module comprises: a first camera module; and a second camera module comprising a second side facing a first side of the first camera module, wherein the first camera module comprises: a housing; a bobbin disposed inside the housing; a coil disposed on the outer circumferential surface of the bobbin; and two magnets, facing each other, that are arranged at the sides of the housing in the direction perpendicular to the first side of the first camera module, so as to face the coil, wherein each of the two magnets comprises: an upper surface; a lower surface; an inner surface facing the coil; an outer surface disposed on the reverse side of the inner surface; and two side surfaces connecting the inner surface and the outer surface, wherein a depressed part is provided on the side surface of the magnet, among the two side surfaces of the magnet, that is disposed on the first side of the first camera module, the depressed part being formed by recessing a portion of the side surface of the magnet, and the area of the inner surface of the magnet is smaller than the area of the outer surface of the magnet.

The depressed part may comprise an inclined surface forming an obtuse angle or a right angle with one side surface of the magnet.

The depressed part formed in each of the two magnets comprises an optical axis and may be symmetrical with respect to an imaginary plane parallel to the inner surface of the magnet.

The depressed part formed in each of the two magnets comprises an optical axis and may be symmetrical with respect to an imaginary plane parallel to the inner surface of the magnet.

The housing comprises a first side disposed on a first side surface of the first camera module, a second side disposed on the reverse side of the first side, and a third side and a fourth side which are reversely disposed between the first side and the second side, wherein the two magnets are disposed on the third side and the fourth side, respectively, and wherein the magnet may be disposed biased toward the second side than the first side.

The two magnets have an asymmetrical shape with respect to the center of each of the magnets, and wherein the two magnets may have an asymmetrical shape with respect to a virtual plane that comprises the center of each and is perpendicular to the inner surface of each of the two magnets.

The housing may comprise a guide portion protruding in a shape corresponding to the depressed part to support the depressed part.

An upper elastic member disposed above the bobbin and coupled to the bobbin and the housing; a lower elastic member disposed below the bobbin and coupled to the bobbin and the housing; and a base disposed below the housing are further included, and the lower elastic members may be formed in a pair spaced apart from each other and electrically connected to the coil.

The second camera module comprises: a housing; a bobbin disposed inside the housing of the second camera module; a base disposed below the housing of the second camera module; a magnet disposed in the housing of the second camera module; a first coil disposed on an outer circumferential surface of the bobbin of the second camera module and facing the magnet of the second camera module; and a second coil disposed between the housing of the second camera module and the base of the second camera module and facing the magnet of the second camera module, wherein the magnet of the second camera module comprises four magnets and may be disposed at the corner of the housing of the second camera module.

The camera module according to another embodiment comprises a first camera module and a second camera module comprising a second side surface facing the first side surface of the first camera module, wherein the first camera module comprises: a cover; a bobbin disposed inside the cover; a coil disposed on the outer circumferential surface of the bobbin; and two magnets, facing each other, that are arranged at the sides of the cover in the direction perpendicular to the first side of the first camera module, so as to face the coil, wherein each of the two magnets comprises: an upper surface; a lower surface; an inner surface facing the coil; an outer surface disposed on the reverse side of the inner surface; and two side surfaces connecting the inner surface and the outer surface, wherein both side surfaces of each of the two magnets comprise a first surface disposed on a first surface side of the first camera module and a second surface disposed opposite to the first surface, wherein each of the two magnets comprises: a first groove portion disposed at a first corner connecting the first surface and the inner surface; and a second groove portion disposed at a second corner connecting the second surface and the inner surface, wherein a depressed part is provided on the side surface of the magnet, among the two side surfaces of the magnet, that is disposed on the first side of the first camera module, the depressed part being formed by recessing a portion of the side surface of the magnet, and wherein the length from the first surface to the first groove portion may be smaller than the length from the second surface to the second groove portion.

The length from the first surface to the first groove portion may be a length in the horizontal direction of the magnet and the length from the second surface to the second groove may be a length in the horizontal direction of the magnet.

The first groove portion and the second groove portion may comprise concavely formed curved surfaces.

The length from the inner surface to the first groove portion may be equal to or smaller than the length from the inner surface to the second groove portion.

The first groove portion and the second groove portion formed in each of the two magnets may be symmetrical with respect to an imaginary plane comprising an optical axis and parallel to the inner surface of the magnet.

The cover comprises a first side disposed on a first side surface of the first camera module, a second side disposed on the reverse side of the first side, a third side and a fourth side reversely disposed between the first side and the second side, wherein the two magnets are disposed on the third side and the fourth side, respectively, and wherein the magnet may be disposed more biased toward the second side than the first side.

The length from the inner surface to the first groove portion is the length of the magnet in the vertical direction and the length from the inner surface to the second groove portion may be the length of the magnet in the vertical direction.

A lens driving device comprises: a housing; a bobbin disposed within the housing; a first coil disposed in the bobbin; a first magnet disposed in the housing and facing the first coil; a base disposed below the housing; a substrate comprising a second coil facing the first magnet and disposed on the base; a first sensor disposed in the base and sensing the first magnet; a second magnet disposed on the bobbin; and a second sensor disposed in the housing and sensing the second magnet, wherein the housing comprises a first side, a second side, and a first corner portion disposed between the first side and the second side, wherein the first magnet comprises a first magnet unit disposed on the first side of the housing and a second magnet unit disposed on the second side of the housing, wherein the second sensor being disposed in a first corner portion disposed between the first side of the housing and the second side of the housing, and wherein the first magnet unit comprises a first groove formed on the side of the first corner portion and the second magnet unit may comprise a second groove formed on the side of the first corner portion.

The first magnet unit comprises: a first side surface disposed on the side of the first corner portion; and a second side surface facing the first coil, wherein the first groove may connect the first side surface and the second side surface.

The first magnet unit further comprises: a third side surface in the reverse side of the first side surface; and a fourth side surface in the reverse side of the second side surface, wherein the area of the second side surface of the first magnet unit is smaller than the area of the fourth side surface of the first magnet unit, and the area of the first side surface of the first magnet unit may be smaller than the area of the second side face of the first magnet unit.

The second magnet unit comprises: a fifth side surface disposed on the side of the first corner portion; and a sixth side surface facing the first coil, wherein the second groove may connect the fifth side surface and the sixth side surface.

The second magnet unit further comprises: a seventh side surface in the reverse side of the fifth side surface; and an eighth side surface in the reverse side of the sixth side surface, wherein the area of the sixth side surface of the second magnet unit is smaller than the area of the eighth side surface of the second magnet unit, and the area of the fifth side surface of the second magnet unit may be smaller than the area of the seventh side surface of the second magnet unit.

A second substrate disposed with the second sensor is further included; the second sensor is disposed on the inner surface of the second substrate; and the imaginary extended surface of the inner surface of the second substrate may meet with the first groove or the second groove.

The distance between the second sensor and the second magnet may be shorter than the distance between the second substrate and the second magnet.

An optical instrument comprises: a main body; a dual camera module disposed in the main body and capturing an image of a subject; a display unit disposed in the main body and outputting an image photographed by the dual camera module; a first camera module; and a second camera module comprising a second side surface facing the first side surface of the first camera module, wherein the first camera module comprises: a housing; a bobbin disposed inside the housing; a coil disposed on the outer circumferential surface of the bobbin; and two magnets, facing each other, that are arranged at the sides of the housing in the direction perpendicular to the first side of the first camera module, so as to face the coil, wherein each of the two magnets comprises: an upper surface; a lower surface; an inner surface facing the coil; an outer surface disposed on the reverse side of the inner surface; and two side surfaces connecting the inner surface and the outer surface, wherein a depressed part is provided on the side surface of the magnet, among the two side surfaces of the magnet, that is disposed on the first side of the first camera module, the depressed part being formed by recessing a portion of the side surface of the magnet, and the area of the inner surface of the magnet may be smaller than the area of the outer surface of the magnet.

A lens driving device according to another embodiment comprise: a cover comprising a first side surface and a second side surface in the reverse side of the first side surface; a bobbin disposed inside the cover; a coil disposed in the bobbin; and two magnets, facing each other, that are arranged at the sides of the cover, wherein each of the two magnets comprises: an upper surface; a lower surface; an inner surface facing the coil; an outer surface disposed on the reverse side of the inner surface; and two side surfaces connecting the inner surface and the outer surface, wherein both side surfaces of each of the two magnets comprise a first surface disposed on a first surface side of the first camera module and a second surface disposed opposite to the first surface, wherein each of the two magnets comprises: a first groove portion disposed at a first corner connecting the first surface and the inner surface; and a second groove portion disposed at a second corner connecting the second surface and the inner surface, and wherein the center of the outer surface of each of the two magnets may be disposed biased toward the second side surface than the first side surface of the cover.

A lens driving device according to another embodiment comprises: a housing; a bobbin disposed within the housing; a first coil disposed in the bobbin; a first magnet disposed in the housing and facing the first coil; a base disposed below the housing; a substrate comprising a second coil facing the first magnet and disposed on the base; a first sensor disposed in the base and sensing the first magnet; a second magnet disposed on the bobbin; and a second sensor disposed in the housing and sensing the second magnet, the first magnet comprises a first magnet unit disposed on the first side of the housing and a second magnet unit disposed on the second side of the housing, wherein the second sensor being disposed in a first corner portion disposed between the first side of the housing and the second side of the housing, and wherein the first magnet unit comprises a first groove formed on the side of the first corner portion and the second magnet unit may comprise a second groove formed on the side of the first corner portion.

Advantageous Effects of the Invention

The magnetic interference between the dual camera modules can be minimized through the present embodiment. This minimizes the misalignment of the OIS actuator in the x-axis and y-axis directions.

BEST MODE

Figure 1:
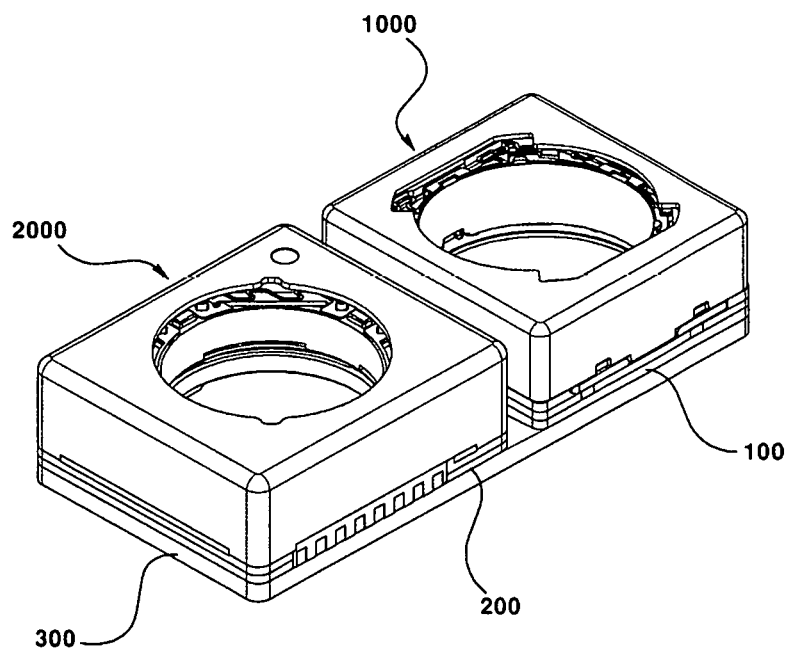
FIG. 1 is a perspective view of a dual camera module according to a first embodiment of the present invention.

Since the present invention, which will be described hereinafter, may apply to various modifications and may have various exemplary embodiments, some specific exemplary embodiments are illustrated in the drawings and will be described in detail in the detailed description.

This, however, is by no means to restrict the invention to the specific embodiments, it is to be understood as embracing all modifications, equivalents and substitutes included in the spirit and scope of the present invention. If the specific description of the related art in the following description of the present invention that are determined to obscure the gist of the invention, the detailed description thereof is omitted.

The terms used in the present specification are merely used to describe particular exemplary embodiments, and are not intended to limit the present invention. Expressions in singular forms comprise plural forms unless the context clearly indicates otherwise. In this application, the terms "comprise," "have," and the like are intended to specify the features, numbers, steps, actions, components, parts, or one that exists combinations thereof described in the specification, but are not intended to preclude the one or more other features, numbers, steps, actions, components, parts, or the presence or possibility of combinations thereof.

Further, terms such as "first", "second" may be used to separately describe various elements, but the above elements shall not be restricted to the above terms. These terms are only used to distinguish one element from the other.

'Optical axis direction' used hereinafter defines a direction of an optical axis of a lens coupled to a lens driving device. On the other hand, "optical axis direction" may be mixedly used with 'vertical direction', 'z-axis,' and the like.

The 'autofocus function' used below is defined as the ability to automatically focus on the subject by moving the lens module in the direction of the optical axis according to the distance of the subject and adjusting the distance from the image sensor in a way that a clear image of the subject can be obtained on the image sensor. Meanwhile, the 'auto-focus' may be used interchangeably with 'auto focus (AF)'. 'Anti-shake correction function' as used hereinafter is defined as the ability to move the lens so as to cancel the vibration (motion) generated in the image sensor by an external force in a direction perpendicular to the optical axis direction, or tilt. On the other hand, 'anti-shake correction' may be used interchangeably with 'optical image stabilization (OIS)'.

Hereinafter, the configuration of the optical instrument according to the present embodiment will be described.

An optical instrument may be any one of a handphone, a mobile phone, a smart phone, a portable smart device, a digital camera, a laptop computer, a digital broadcast terminal, a PDA (Personal Digital Assistants), a PMP (Portable Multimedia Player), and a navigation. However, the type of the optical instrument is not limited thereto, and any device for photographing an image or a photograph may be referred to as an optical device.

The optical instrument may comprise a main body (not shown), a dual camera module, and a display unit (not shown). However, any one or more among the main body, the dual camera module, and the display unit may be omitted or changed in the optical instrument.

The main body may form the appearance of the optical instrument. For example, the main body may comprise a rectangular parallelepiped shape. As another example, the main body may be formed rounded at least in part. The main body may accommodate a dual camera module. A display unit may be disposed on one surface of the main body. For example, a display unit and a dual camera module may be disposed on one surface of the main body, and a dual camera module may be additionally disposed on the other surface (the surface opposite to the one surface) of the main body.

The dual camera module may be disposed in the main body. The dual camera module may be disposed on one surface of the main body. At least a portion of the dual camera module may be accommodated inside the main body. The dual camera module may be provided with two camera modules. Additional camera modules may be disposed on one surface and the other surface of the main body, respectively. The dual camera module may capture an image of a subject.

The display unit may be disposed in the main body. The display unit may be disposed on one surface of the main body. That is, the display unit may be disposed on the same plane as the dual camera module. Alternatively, the display unit may be disposed on the other surface of the main body. The display unit may be disposed on a surface of the main body opposite to the surface where the dual camera module is disposed. The display unit can output the image photographed by the dual camera module.

Hereinafter, the configuration of a dual camera module according to the present embodiment will be described with reference to the drawings.

FIG. 1 is a perspective view of a dual camera module according to the present embodiment.

The dual camera module may comprise a first camera module and a second camera module. The first camera module may comprise a first lens driving device 1000. The first lens driving device 1000 may be referred to as an 'auto focus voice coil motor (AF VCM)' or an 'AF Actuator'. The second camera module may comprise a second lens driving device 2000. The second lens driving device 2000 may be referred to as an 'OIS module (Optical Image Stabilization Module)' or an 'OIS actuator'. The dual camera module may comprise a first lens driving device 1000 and a second lens driving device 2000. The dual camera module may comprise a first camera module and a second camera module comprising a second side surface facing the first side surface of the first camera module. The first camera module and the second camera module may be disposed on the printed circuit board 300 side by side.

The first camera module may comprise a first lens driving device 1000, a lens module 400, an infrared filter (not shown), a printed circuit board 300, an image sensor (not shown) and a control unit (not shown). However, in the first camera module, at least one of the first lens driving device 1000, the lens module 400, the infrared filter, the printed circuit board 300, the image sensor, and the control unit may be omitted or changed.

The lens module 400 may comprise at least one lens. The lens module 400 may comprise a lens and a lens barrel. The lens module 400 may comprise one or more lenses (not shown) and a lens barrel for accommodating the lenses. However, one configuration of the lens module 400 is not limited to the lens barrel, and any holder structure can be used as long as it can support one or more lenses. The lens module 400 may be coupled to the inside of the first lens driving device 1000. The lens module 400 may be coupled to a bobbin 4210 of the first lens driving device 1000. The lens module 400 can move integrally with the bobbin 4210. The lens module 400 may be coupled to the bobbin 4210 by an adhesive (not shown). In one example, the lens module 400 can be screw-coupled to the bobbin 4210. On the other hand, the light having passed through the lens module 400 can be irradiated to the image sensor.

The infrared filter can block the light of the infrared region from entering the image sensor. The infrared filter may be disposed between the lens module 400 and the image sensor. For example, the infrared filter may be disposed on the holder member 100 provided separately from a base 4400. In another example, the infrared filter may be mounted in a through hole 4410 of the base 4400. The infrared filter may be formed of a film material or a glass material. The infrared filter may be formed by coating an infrared blocking coating material on a plate-shaped optical filter such as a cover glass for protecting an imaging surface and a cover glass. For example, the infrared filter may be an infrared absorbing filter (Blue filter) that absorbs infrared rays. In another example, the infrared filter may be an IR cut filter that reflects infrared light.

The first lens driving device 1000 may be disposed on the upper side of the printed circuit board 300. The printed circuit board 300 may be disposed on the lower side of the first lens driving device 1000. The printed circuit board 300 may be coupled with the first lens driving device 1000. An image sensor may be disposed on the printed circuit board 300. The printed circuit board 300 may be electrically connected to the image sensor. For example, the holder member 100 may be disposed between the printed circuit board 300 and the first lens driving device 1000. At this time, the holder member 100 can accommodate the image sensor inside. As another example, the first lens driving device 1000 may be disposed directly on the printed circuit board 300. At this time, the first lens driving device 1000 can accommodate the image sensor on the inner side. With this structure, light having passed through the lens module 400 coupled to the first lens driving device 1000 can be irradiated to the image sensor disposed on the printed circuit board 300. The printed circuit board 300 can supply power (current) to the first lens driving device 1000. On the other hand, a control unit for controlling the first lens driving device 1000 may be disposed on the printed circuit board 300.

The image sensor may be disposed on the printed circuit board 300. The image sensor may be electrically connected to the printed circuit board 300. In one example, the image sensor may be coupled to the printed circuit board 300 by surface mounting technology (SMT). As another example, the image sensor may be coupled to the printed circuit board 300 by a flip chip technique. The image sensor may be disposed in a way that the optical axis of the lens module 400 is coincided with the optical axis. That is, the optical axis of the image sensor and the optical axis of the lens module 400 may be aligned. In this way, the image sensor can acquire light that has passed through the lens module 400. The image sensor can convert the light irradiated to the effective image area of the image sensor into an electrical signal. The image sensor may be any one of a charge coupled device (CCD), a metal oxide semiconductor (MOS), a CPD, and a CID. However, the type of the image sensor is not limited thereto, and the image sensor may comprise any structure capable of converting incident light into an electrical signal.

The control unit may be disposed on the printed circuit board 300. For example, the control unit may be disposed inside the first lens driving device 1000. As another example, the control unit may be located outside the first lens driving device 1000. The control unit can individually control the direction, intensity, and amplitude of the current supplied to the coil 4220 of the first lens driving device 1000. The control unit may control the first lens driving device 1000 to perform the autofocus function of the camera module. That is, the control unit may control the first lens driving device 1000 to move the lens module 400 in the optical axis direction or tilt it in the direction perpendicular to the optical axis direction. Further, the control unit may perform feedback control of the autofocus function. More specifically, the control unit may receive the position of the bobbin 4210 or a housing 4310 sensed by an AF sensor (not shown) and control the current applied to the coil 4220 to perform the autofocus feedback control. Above mentioned feedback control by the control unit is generated in real time, so that a more precise autofocus function can be performed.

The second camera module may comprise a second lens driving device 2000, a lens module (not shown), an infrared filter (not shown), a printed circuit board 300, an image sensor (not shown), and a control unit (not shown). However, in the second camera module, at least one of a second lens driving device 2000, the lens module, the infrared filter, the printed circuit board 300, the image sensor, and the control unit may be omitted or changed.

The lens module may comprise at least one lens. The lens module may comprise a lens and a lens barrel. The lens module may comprise at least one lens (not shown) and a lens barrel for accommodating the lens. However, one configuration of the lens module is not limited to the lens barrel, and any holder structure may be used as long as it can support one or more lenses. The lens module may be coupled to the inside of the second lens driving device 2000. The lens module may be coupled to a bobbin 2210 of the second lens driving device 2000. The lens module can move integrally with the bobbin 2210. The lens module may be coupled to the bobbin 2210 by an adhesive (not shown). In one example, the lens module can be screw-coupled to the bobbin 2210. On the other hand, the light having passed through the lens module can be irradiated to the image sensor.

An infrared filter can block the light of the infrared region from entering the image sensor. The infrared filter may be disposed between the lens module and the image sensor. For example, the infrared filter may be disposed on a holder member 200 provided separately from a base 2430. In another example, the infrared filter may be mounted in a through hole 2431 of the base 2430. The infrared filter may be formed of a film material or a glass material. The infrared filter may be formed by coating an infrared blocking coating material on a plate-shaped optical filter such as a cover glass for protecting an imaging surface or a cover glass. For example, the infrared filter may be an infrared absorbing filter (Blue filter) that absorbs infrared rays. In another example, the infrared filter may be an IR cut filter that reflects infrared light.

The second lens driving device 2000 may be disposed on the upper side of the printed circuit board 300. The printed circuit board 300 may be disposed on the lower side of the second lens driving device 2000. The printed circuit board 300 may be coupled with the second lens driving device 2000. An image sensor may be disposed on the printed circuit board 300. The printed circuit board 300 may be electrically connected to the image sensor. For example, the holder member 200 may be disposed between the printed circuit board 300 and the second lens driving device 2000. At this time, the holder member 200 can accommodate the image sensor inside. As another example, the second lens driving device 2000 may be disposed directly on the printed circuit board 300. At this time, the second lens driving device 2000 can accommodate the image sensor on the inner side. With this structure, light having passed through the lens module coupled to the second lens driving device 2000 can be irradiated to the image sensor disposed on the printed circuit board 300. The printed circuit board 300 can supply power (current) to the second lens driving device 2000. Meanwhile, a control unit for controlling the second lens driving device 2000 may be disposed on the printed circuit board 300.

The image sensor may be disposed on the printed circuit board 300. The image sensor may be electrically connected to the printed circuit board 300. In one example, the image sensor may be coupled to the printed circuit board 300 by surface mounting technology (SMT). As another example, the image sensor may be coupled to the printed circuit board 300 by a flip chip technique. The image sensor may be disposed in a way that the optical axis and the lens module are coincided with each other. That is, the optical axis of the image sensor and the optical axis of the lens module may be aligned. Thereby, the image sensor can acquire light passing through the lens module. The image sensor can convert the light irradiated to the effective image area of the image sensor into an electrical signal. The image sensor may be any one of a charge coupled device (CCD), a metal oxide semiconductor (MOS), a CPD, and a CID. However, the type of the image sensor is not limited thereto, and the image sensor may comprise any structure capable of converting incident light into an electrical signal.

A control unit may be disposed on the printed circuit board 300. For example, the control unit may be disposed inside the second lens driving device 2000. As another example, the control unit may be located outside the second lens driving device 2000. The control unit can individually control the direction, intensity, and amplitude of the current supplied to a first coil 2220 and a second coil 2422 of the second lens driving device 2000. The control unit may control the second lens driving device 2000 to perform one or more of the autofocus function and the anti-shake correction function of the camera module. That is, the control unit can control the second lens driving device 2000 to move the lens module in the optical axis direction or tilt it in the direction perpendicular to the optical axis direction. Furthermore, the control unit may perform any one or more among feedback control of the autofocus function and feedback control of the anti-shake correction function. More specifically, the control unit can receive the position of the bobbin 2210 or a housing 2310 sensed by the AF sensor (not shown) and control the current applied to the first coil 2220 to perform autofocus feedback control. Also, the control unit may receive the position of the bobbin 2210 or the housing 2310 detected by a Hall sensor 2700, and may control the current applied to the second coil 2422 to perform the anti-shake correction feedback control. Since the feedback control by the control unit mentioned above occurs in real time, more accurate autofocus function and anti-shake correction function can be performed.

Hereinafter, the configuration of the first lens driving device according to the present embodiment will be described with reference to the drawings.

Figure 2:
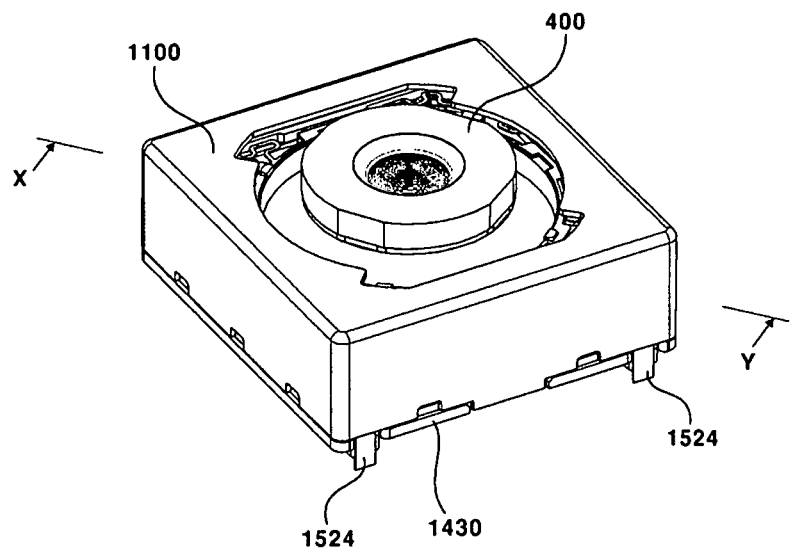
FIG. 2 is a perspective view of a first lens driving device according to the first embodiment of the present invention in which the lens module is coupled.
Figure 3:
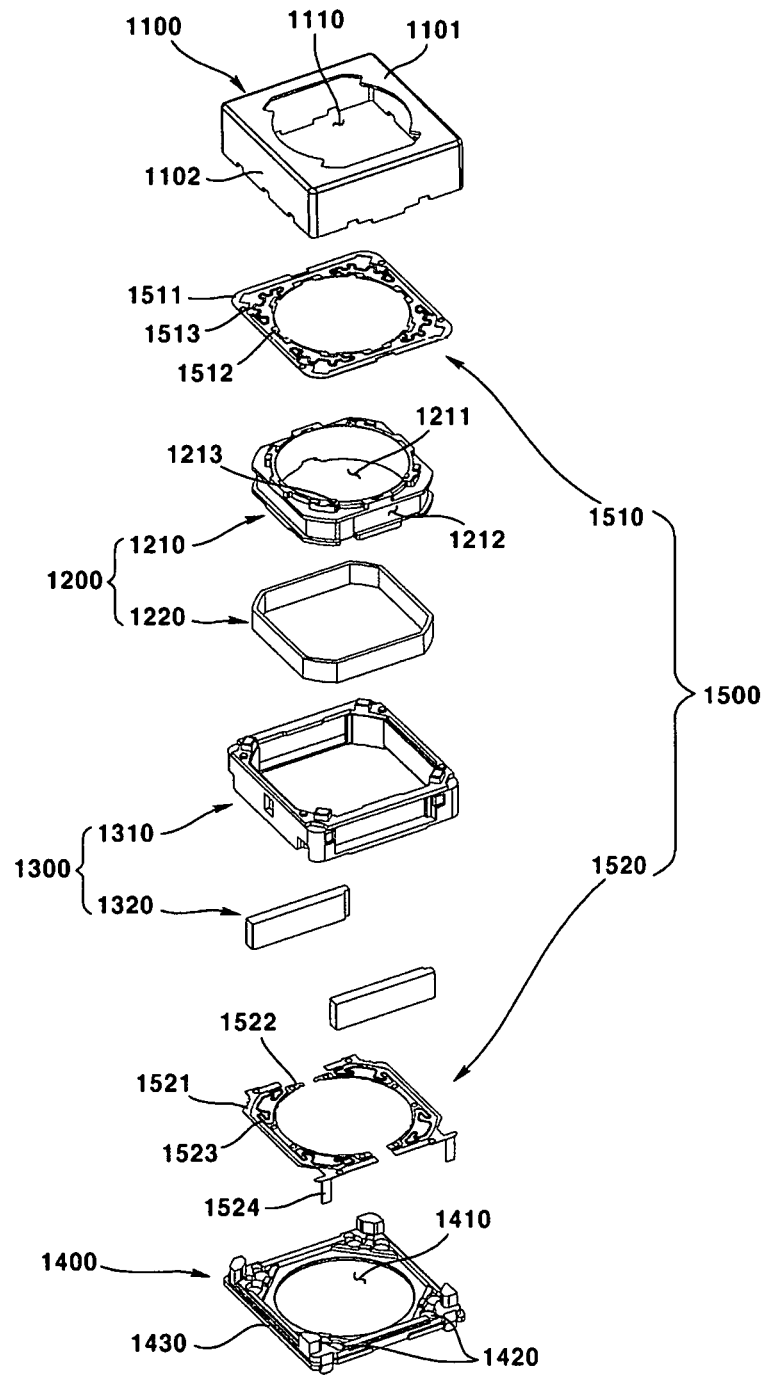
FIG. 3 is an exploded perspective view of the first lens driving device according to the first embodiment of the present invention.
Figure 4:
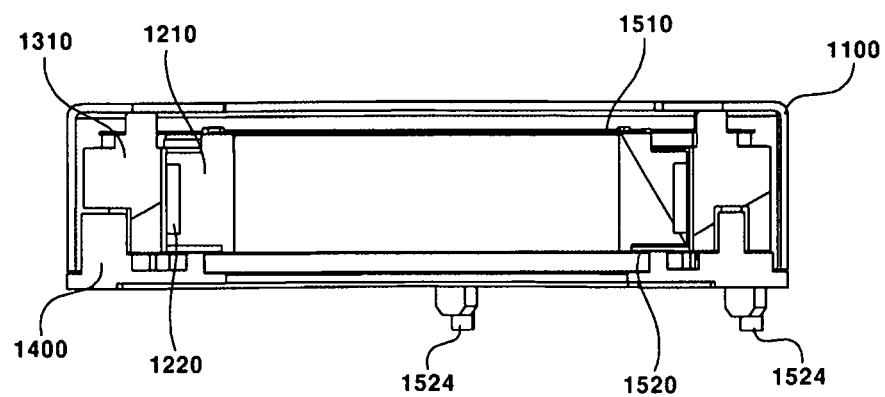
FIG. 4 is a cross-sectional view taken along the line X-Y in FIG. 2.
Figure 5:
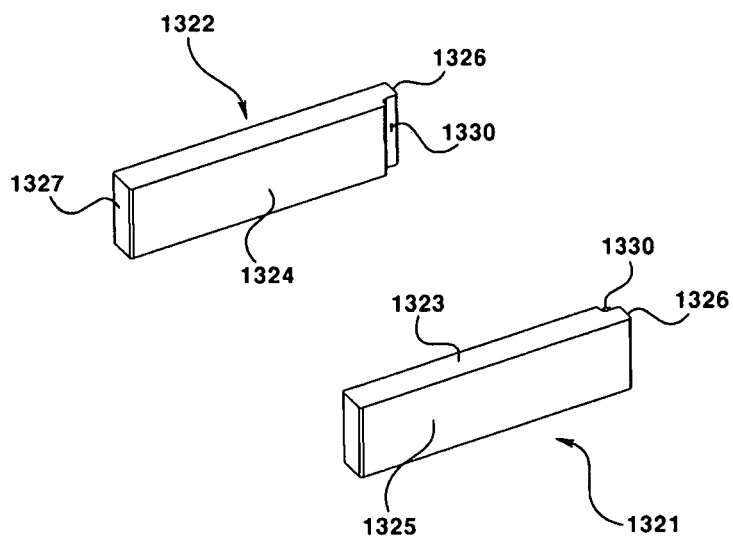
FIG. 5 is a perspective view showing a magnet of the first lens driving device according to the first embodiment of the present invention.
Figure 6:
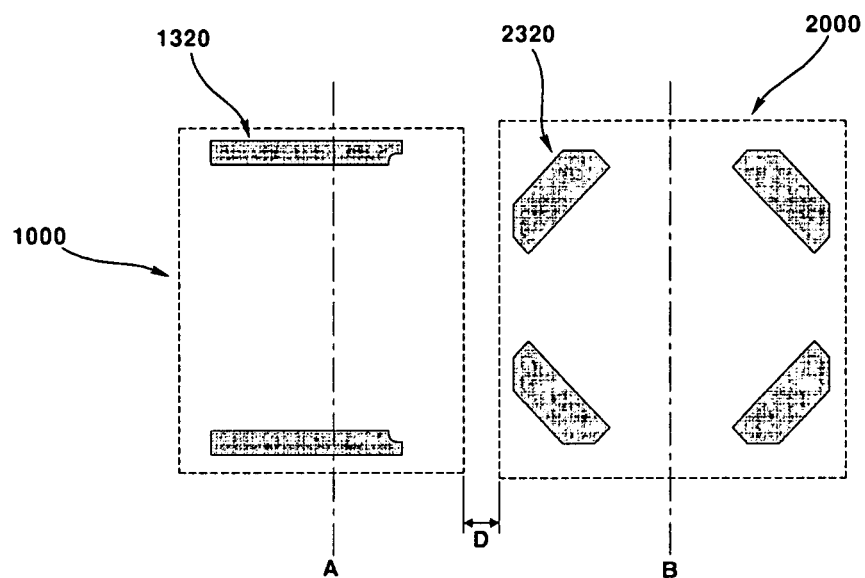
FIG. 6 is a conceptual view showing a magnet of the first lens driving device and a magnet of the second lens driving device according to the first embodiment of the present invention.
Figure 7:
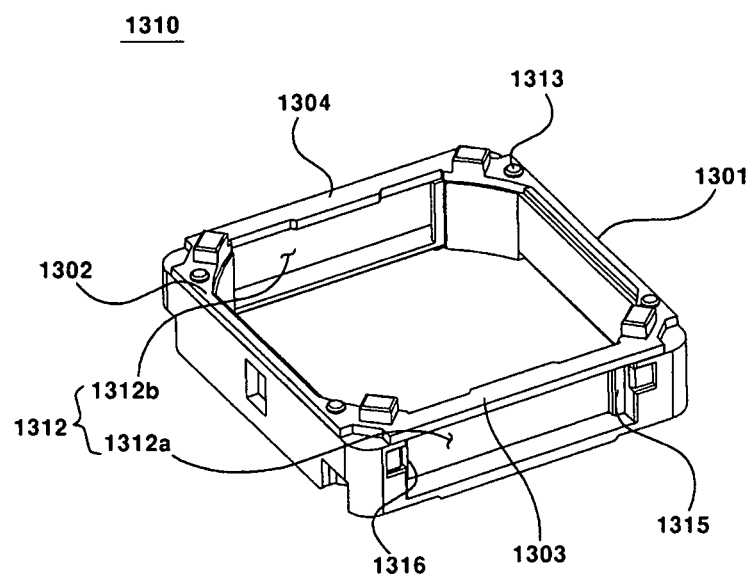
FIG. 7 is a perspective view showing a housing of the first lens driving device according to the first embodiment of the present invention.
Figure 8:
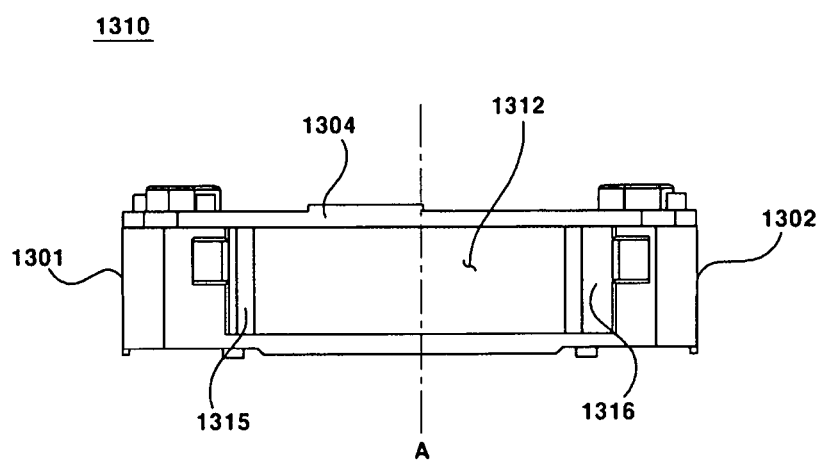
FIG. 8 is a side view showing the housing of the first lens driving device according to the first embodiment of the present invention.

FIG. 2 is a perspective view of the first lens driving device according to the present embodiment in a state where a lens module is coupled to the first lens driving device, FIG. 3 is an exploded perspective view of the first lens driving device according to the present embodiment, FIG. 5 is a perspective view showing a magnet of the first lens driving device according to the present embodiment, FIG. 6 is a cross-sectional view showing a magnet of the first lens driving device and a magnet of the second lens driving device according to the present embodiment, FIG. 7 is a perspective view showing the housing of the first lens driving device according to the present embodiment, and FIG. 8 is a side view showing the housing of the first lens driving device according to the present embodiment.

The first lens driving device 1000 may be an AF module. At this time, the second lens driving device 2000 may be an OIS module. Here, the OIS module can also perform the AF function. However, the first lens driving device 1000 may be an OIS module. At this time, the second lens driving device 2000 may be an AF module. That is, either the first lens driving device 1000 or the second lens driving device 2000 is an AF module and the other is an OIS module. Or both the first lens driving device 1000 and the second lens driving device 2000 may be AF modules. Or both the first lens driving device 1000 and the second lens driving device 2000 may be an OIS module.

The first lens driving device 1000 may comprise a cover member 4100, a mover 4200, a stator 4300, a base 4400, and an AF elastic member 4500. However, at least one among the cover member 4100, the mover 4200, the stator 4300, the base 4400 and the AF elastic member 4500 in the first lens driving device 1000 may be omitted or changed.

The cover member 4100 may be formed as a separate member from the housing 4310. The cover member 4100 may be formed of a material different from that of the housing 4310. The cover member 4100 may be integrally formed with the housing 4310. Alternatively, the cover member 4100 may be omitted and the housing 4310 may function as the cover member 4100. That is, the cover member 4100 may be the housing 4310.

The cover member 4100 may form an appearance of the first lens driving device 1000. The cover member 4100 may be in the form of a hexahedron with its bottom opened. However, it is not limited thereto. The cover member 4100 may be a non-magnetic body. If the cover member 4100 is made of a magnetic material, the magnetic force of the cover member 4100 may affect a magnet 2320 of the second lens driving device 2000. The cover member 4100 may be formed of a metal material. In more detail, the cover member 4100 may be formed of a metal plate. In this case, the cover member 4100 may block electromagnetic interference (EMI). Because of this feature of the cover member 4100, the cover member 4100 can be referred to as an 'EMI shield can'. The cover member 4100 may be connected to the ground portion of the printed circuit board 300. Through this, the cover member 4100 can be grounded. The cover member 4100 can prevent the airflow generated from the outside of the first lens driving device 1000 from flowing into the inside of the cover member 4100. Further, the cover member 4100 can block the radio waves generated inside the cover member 4100 from being emitted to the outside of the cover member 4100. However, the material of the cover member 4100 is not limited thereto.

The cover member 4100 may comprise an upper plate 1101 and a side plate 4102. The cover member 4100 may comprise an upper plate 1101 and a side plate 4102 extending downward from the outer side of the upper plate 1101. The lower end of the side plate 4102 of the cover member 4100 can be mounted on the base 4400. The lower end of the side plate 4102 of the cover member 4100 may be coupled with a stepped portion 4430 of the base 4400. The cover member 4100 may be mounted on the base 4400 such that the inner surface of the cover member 4100 is in close contact with part or all of the side surface of the base 4400. The mover 4200, the stator 4300, and the AF elastic member 4500 can be positioned in the inner space formed by the cover member 4100 and the base 4400. With such a structure, the cover member 4100 can protect the internal components from external impact while preventing the penetration of external contaminants. However, it is not limited thereto, and the lower end of the side plate 4102 of the cover member 4100 may be directly coupled to the printed circuit board 300 located below the base 4400. A portion of the plurality of side plates 4102 may face a cover member 2100 of the second lens driving device 2000.

The cover member 4100 may comprise an opening 1110. The opening 1110 may be formed in the upper plate 1101. The opening 1110 may expose the lens module 400. The opening 1110 may be formed in a shape corresponding to the lens module 400. The size of the opening 1110 may be larger than the diameter of the lens module 400 so that the lens module 400 can be assembled through the opening 1110. On the other hand, the light introduced through the opening 1110 can pass through the lens module 400. At this time, light passing through the lens module 400 can be acquired as an image from the first image sensor.

The mover 4200 can be coupled to the lens module 400. The mover 4200 can accommodate the lens module 400 inside. The outer circumferential surface of the lens module 400 may be coupled to the inner circumferential surface of the mover 4200. The mover 4200 can move integrally with the lens module 400 through interaction with the stator 4300.

The mover 4200 may comprise a bobbin 4210 and a coil 4220. However, any one or more among the bobbin 4210 and the coil 4220 in the mover 4200 may be omitted or changed.

The bobbin 4210 may be located inside the housing 4310. The bobbin 4210 can be accommodated in the through hole 1311 of the housing 4310. The bobbin 4210 may be coupled to the lens module 400. More specifically, the outer circumferential surface of the lens module 400 may be coupled to the inner circumferential surface of the bobbin 4210. The coil 4220 may be coupled to the bobbin 4210. The lower portion of the bobbin 4210 can be coupled with the lower elastic member 4520. The upper portion of the bobbin 4210 may be coupled with an upper elastic member 4510. The bobbin 4210 can move in the direction of the optical axis with respect to the housing 4310.

The bobbin 4210 may comprise a through hole 4211, a coil coupling portion 4212, an upper coupling portion 4213, and a lower coupling portion (not shown). However, in the bobbin 4210, one or more of the through hole 4211, the coil coupling portion 4212, the upper coupling portion 4213, and the lower coupling portion may be omitted or changed.

The through hole 4211 may be formed on the inner side of the bobbin 4210. The through hole 4211 may be formed in a vertically open type. The lens module 400 may be coupled to the through hole 4211. The inner circumferential surface of the through hole 4211 may be formed with a thread having a shape corresponding to the thread formed on the outer circumferential surface of the lens module 400. That is, the through hole 4211 may be screw-coupled to the lens module 400. An adhesive may be interposed between the lens module 400 and the bobbin 4210. At this time, the adhesive may be an epoxy cured by ultraviolet (UV) light, heat or laser. That is, the lens module 400 and the bobbin 4210 can be bonded by ultraviolet curing epoxy and/or thermosetting epoxy.

The coil coupling portion 4212 can accommodate at least a portion of the coil 4220. The coil coupling portion 4212 may be integrally formed with the outer side surface of the bobbin 4210. In addition, the coil coupling portion 4212 may be formed continuously along the outer side surface of the bobbin 4210 or spaced apart from each other at predetermined intervals. As an example, the coil coupling portion 4212 may be formed in a way that a portion of the outer side surface of the bobbin 4210 corresponds to the shape of the coil 4220. At this time, the coil 4220 can be directly wound on the coil coupling portion 4212. As a modified embodiment, the coil coupling portion 4212 may be formed as an upper-side or a lower-side opening type. At this time, the coil 4220 in a pre-wound state may be inserted into and coupled to the coil coupling portion 4212 through a portion that is open.

The upper coupling portion 4213 can be coupled with the upper elastic member 4510. The upper coupling portion 4213 can be coupled with an inner side 4512 of the upper elastic member 4510. The upper coupling portion 4213 may be formed to protrude upward from the upper surface of the bobbin 4210. In one example, a protrusion of the upper coupling portion 4213 can be inserted into and coupled with the grooves or holes of the inner side 4512 of the upper elastic member 4510. At this time, the protrusion of the upper coupling portion 4213 is thermally welded while being inserted into the hole of the inner side 4512, so that the upper elastic member 4510 can be fixed between the thermally welded protrusion and the upper surface of the bobbin 4210.

The lower coupling portion can be coupled with the lower elastic member 4520. The lower coupling portion can be coupled with the inner side 4522 of the lower elastic member 4520. The lower coupling portion may protrude downward from the lower surface of the bobbin 4210. For example, the protrusion of the lower coupling portion can be inserted into and coupled with the groove or the hole of the inner side 4522 of the lower elastic member 4520. At this time, the protrusion of the lower coupling portion is inserted into and coupled to the hole of the inner side 4522 to be thermally welded, so that the lower elastic member 4520 can be fixed between the lower surface of the bobbin 4210 and the thermally welded protrusion.

A coil 4220 may be located on bobbin 4210. The coil 4220 may be disposed on the outer circumferential surface of the bobbin 4210. The coil 4220 may be wound directly on the outer circumferential surface of the bobbin 4210. The coil 4220 may be in electromagnetic interaction with the magnet 4320. The coil 4220 can be facing to the magnet 4320. In this case, when a current is supplied to the coil 4220 to form a magnetic field around the coil 4220, the coil 4220 can be moved with respect to the magnet 4320 due to the electromagnetic interaction between the coil 4220 and the magnet 4320. The coil 4220 can be moved for AF driving. In this case, the coil 4220 may be referred to as an 'AF coil.'

The coil 4220 may comprise a pair of lead wires (not shown) for power supply. The pair of lead wires of the coil 4220 may be electrically connected to the lower elastic member 4520. Each of the pair of lead wires of the coil 4220 may be electrically connected to the lower elastic member 4520 which is separated and provided as a pair. In this case, power can be supplied to the coil 4220 through the lower elastic member 4520 which is electrically connected to the printed circuit board 300 through a terminal portion 4524.

The stator 4300 can accommodate the mover 4200 inside. The stator 4300, which is a fixed member, can move the mover 4200 through electromagnetic interaction.

The stator 4300 may comprise a housing 4310 and a magnet 4320. However, one or more of the housing 4310 and the magnet 4320 in the stator 4300 may be omitted or changed.

The housing 4310 may be located outside the bobbin 4210. The housing 4310 may be spaced apart from the bobbin 4210. At least a portion of the housing 4310 may be formed in a shape corresponding to the inner side surface of the cover member 4100. In particular, the outer side surface of the housing 4310 may be formed in a shape corresponding to the inner side surface of the side plate 4102 of the cover member 4100. The housing 4310 may be in the form of a hexahedron comprising four side surfaces as an example. However, the shape of the housing 4310 may be any shape that can be disposed inside the cover member 4100. The housing 4310 may be formed of an insulating material. The housing 4310 can be formed as an injection molded article in consideration of productivity. The housing 4310 can be fixed on the base 4400. As a modified embodiment, the housing 4310 may be omitted and the magnet 4320 may be fixed to the cover member 4100. An upper elastic member 4510 may be coupled to the upper portion of the housing 4310. The lower elastic member 4520 may be coupled to a lower portion of the housing 4310.

The housing 4310 may comprise first to fourth sides 1301, 1302, 1303, and 1304. The housing 4310 may comprise a first side 1301 disposed on the first side surface of the first camera module, a second side 1302 disposed on the opposite side of the first side 1301, and a third side 1303 and a fourth side 1304 which are disposed opposite to each other between the first side 1301, and the second side 1302. The two magnets 4320 may be disposed on the third side 1303 and the fourth side 1304, respectively. The first magnet 4321 may be disposed on the third side 1303. The second magnet 4322 may be disposed on the fourth side 1304. The two magnets 4320 may be disposed biased toward the second side 1302 side than the first side 1301.

As illustrated in FIG. 6, the two magnets 4320 can be disposed biased away from the second lens driving device 2000. In addition, as illustrated in FIG. 8, the magnet coupling portion 1312 of the housing 4310 may be formed biased toward the center line A of the housing 4310. The magnet coupling portion 1312 of the housing 4310 may be formed more biased toward the second side 1302 than the first side 1301. Due to such a structure, the magnet 4320 coupled to the magnet coupling portion 1312 may also be disposed more biased toward the second side 1302 than the first side 1301. In the present embodiment, the influence of the magnetic force on the second lens driving device 2000 can be minimized by adjusting the position of the magnet 4320 of the first lens driving device 1000.

The housing 4310 may comprise a through hole 1311, a magnet accommodating portion 1312, an upper coupling portion 1313, a lower coupling portion (not shown), a guide portion 1315, and a support portion 1316. Any one or more among the through hole 1311, the magnet accommodating portion 1312, the upper coupling portion 1313, the lower coupling portion (not shown), the guide portion 1315, and the support portion 1316 in the housing 4310 may be omitted or changed. In particular, in the housing 4310, the guide portion 1315 and the support portion 1316 may be omitted.

The through hole 1311 may be formed on the inner side of the housing 4310. The through hole 1311 may be formed in the housing 4310 in a vertically open type. A bobbin 4210 can be accommodated in the through hole 1311. A bobbin 4210 can be movably disposed in the through hole 1311. The through hole 1311 may have a shape corresponding to the bobbin 4210.

The magnet coupling portion 1312 may be formed on the side surface of the housing 4310. The magnet coupling portion 1312 may be formed as a hole penetrating the housing 4310. Alternatively, the magnet coupling portion 1312 may be formed as a groove formed by recessing a portion of the housing 4310. The magnet coupling portion 1312 can accommodate at least a portion of the magnet 4320. An adhesive (not shown) may be disposed between the magnet coupling portion 1312 and the magnet 4320. That is, the magnet coupling portion 1312 and the magnet 4320 can be coupled by the adhesive. The magnet coupling portion 1312 may be located on the inner surface of the housing 4310. The magnet coupling portion 1312 may be formed such that a portion of the inner surface of the housing 4310 is recessed outward. In this case, there is an advantage in favor of the electromagnetic interaction with the coil 4220 located inside the magnet 4320.

The magnet coupling portion 1312 may comprise a first magnet coupling portion 1312a and a second magnet coupling portion 1312b. A first magnet 4321 may be coupled to the first magnet coupling portion 1312a. The first magnet coupling portion 1312a may be formed on the third side 1303 of the housing 4310. A second magnet 4322 may be coupled to the second magnet coupling portion 1312b. The second magnet coupling portion 1312b may be formed on the fourth side 1304 of the housing 4310.

The upper coupling portion 1313 can be coupled with the upper elastic member 4510. The upper coupling portion 1313 can be coupled with an outer side 4511 of the upper elastic member 4510. The upper coupling portion 1313 may be formed to protrude upward from the upper surface of the housing 4310. For example, the protrusion of the upper coupling portion 1313 may be inserted into and coupled to the grooves or holes of the outer side 4511 of the upper elastic member 4510. At this time, the protrusion of the upper coupling portion 1313 is thermally welded while being inserted into the hole of the outer side 4511, so that the upper elastic member 4510 can be fixed between the thermally welded protrusion and the upper surface of the housing 4310.

The lower coupling portion can be coupled with a lower elastic member 4520. The lower coupling portion can be coupled with an outer side 4521 of the lower elastic member 4520. The lower coupling portion may be protruded downward from the lower surface of the housing 4310. For example, the protrusion of the lower coupling portion may be inserted into and coupled to the groove or the hole of the outer side 4521 of the lower elastic member 4520. At this time, the protrusion of the lower coupling portion may be thermally welded while being inserted into the hole of the outer side 4521, so that the lower side elastic member 4520 can be fixed between the thermally welded protrusion and the lower surface of the housing 4310.

The guide portion 1315 may be formed in a shape corresponding to a depressed part 4330. The guide portion 1315 may protrude from the housing 310. The guide portion 1315 may be extended in the vertical direction. The guide portion 1315 may support the recessed surface of the depressed part 4330. The guide portion 1315 may be in surface contact with the recessed surface of the depressed part 4330. The guide portion 1315 can support the magnet 4320 from the inside. The guide portion 1315 may support the magnet 4320 so as to prevent the magnet 4320 from falling off the housing 4310.

The support portion 1316 can support a portion of an inner surface 4324 of the magnet 4320. The support portion 1316 may be in surface contact with a portion of the inner surface 4324 of the magnet 4320. The support portion 1316 can be extended in the vertical direction. The support portion 1316 may be formed on the opposite side of the guide portion 1315. Accordingly, the support portion 1316 and the guide portion 1315 can prevent the magnet 4320 from falling into the inside of the housing 4310.

The magnet 4320 may be disposed in the housing 4310. The magnet 4320 can be accommodated in the magnet coupling portion 1312 of the housing 4310. The magnet 4320 can be electromagnetically interacted with coil 4220. The magnet 4320 may face the coil 4220. The magnet 4320 can move the bobbin 4210 to which the coil 4220 is fixed. The magnet 4320 can move the coil 4220 for AF driving. In this case, the magnet 4320 may be referred to as an 'AF driving magnet'.

The magnet 4320 may comprise a first magnet 4321 and a second magnet 4322. The magnets 4320 may comprise a first magnet 4321 and a second magnet 4322 which are spaced apart from each other. The magnet 4320 may comprise a first magnet 4321 and a second magnet 4322 located opposite from each other. The magnet 4320 may comprise a first magnet 4321 and a second magnet 4322 disposed opposite from each other on a side surface of the housing 4310. The magnet 4320 may comprise a first magnet 4321 disposed on the third side surface 1303 and a second magnet 4322 disposed on the fourth side surface 1304.

In the present embodiment, the magnet 4320 may be arranged to face the coil 4220 on the side of the housing 310 in a direction perpendicular to the first side surface of the first camera module. At this time, the magnet 4320 may comprise a first magnet 4321 and a second magnet 4322 facing each other. Each of the first magnet 4321 and the second magnet 4322 comprises an upper surface 4323, a lower surface 4324, an inner surface 4324 facing the coil 4220, an outer surface 4325 disposed opposite side of the inner surface 4324, and first and second side surfaces 4326 and 4327 for connecting the inner surface 4324 and the outer surface 4325. A depressed part 4330, which is formed when a portion of one side surface 4326 of the magnet 4320 is recessed, may be formed on one side surface 4326 of the magnet 4320 disposed on the first side surface of the first camera module among the first and second side surfaces 4326 and 4327 of the magnet 4320. That is, the depressed part 4330 may be provided at a portion where the first side surface 4326 and the inner surface 4324 of the magnet 4320 meet. In this way, the area of the inner surface 4324 of the magnet 4320 may be smaller than the outer surface 4325 of the magnet 4320 because a portion of the inner surface 4324 of the magnet 4320 is omitted.

The magnet 4320 may comprise four corner portions at a portion where the inner surface 4324 meets the both side surfaces 4326 and 4327 and a portion where the outer surface 4325 meets the both side surfaces 4326 and 4327. The depressed part 4330 may be formed in only one corner portion of the four corner portions of the magnet 4320. That is, the shape of one of the four corner portions of the magnet 4320 may be different from the shape of the remaining three corner portions. At this time, the remaining three corner portions of the magnet 4320 may have a basic curvature generated during the machining process of the edges. The curvature of the depressed part 4330 may be different from the basic curvature generated during the machining process of the edges. In one example, the basic curvature is formed convexly, but the depressed part 4330 can be formed concave. The magnetic field at the first and second side surfaces 4326 and 4327 of the magnet 4320 can be formed differently due to the depressed part 4330.

In a modified embodiment, the depressed part 4330 may be provided at a portion where the first side surface 4326 and the outer surface 4325 of the magnet 4320 meet. The area of the inner surface 4324 of the magnet 4320 may be larger than the area of the outer surface 4325 of the magnet 4320 because a portion of the outer surface 4325 of the magnet 4320 is omitted.

The dual camera module according to the present embodiment may comprise a depressed part 4330 formed in the magnet 4320. In the present embodiment, the influence of the magnetic force applied to the second camera module by the magnet 4320 of the first camera module through the depressed part 4330 can be minimized. The depressed part 4330 according to the present embodiment can be distinguished from the natural curvature generated at the edge during the manufacturing process of the magnet 4320 in terms of shape, size, and function.

In the present embodiment, the influence of the magnetic force exerted on the second lens driving device 2000 can be minimized by adjusting the position of the magnet 4320 of the first lens driving device 1000. More specifically, the magnet coupling portion 1312 of the housing 4310 of the first lens driving device 1000 may be offset toward one side from the center line. Also, in the present embodiment, the shape of the magnet 4320 of the first lens driving device 1000 closer to the second lens driving device 2000 may be machined by cutting it into the shape of a letter 'inverse L' or 'L'. Alternatively, in the present embodiment, the shape of the magnet 4320 of the first lens driving device 1000 closer to the second lens driving device 2000 may be machined by cutting it round.

The depressed part 4330 may be formed in the magnet 4320. The depressed part 4330 may be a shape in which a portion of the magnet 4320 is omitted. The depressed part 4330 may have a shape in which a portion of the outer surface of the magnet 4320 is recessed. The depressed part 4330 may be formed at a portion where the first side surface 4326 and the inner surface 4324 of the magnet 4320 meet. Alternatively, the depressed part 4330 may be formed at a portion where the first side surface 4326 and the outer surface 4325 of the magnet 4320 meet.

The depressed part 4330 may be formed when an area of 10 to 80% of the area of the first side surface 4326 of the magnet 4320 is recessed. That is, 10 to 80% of the area of the first side surface 4326 of the magnet 4320 may be recessed by the depressed part 4330. In other words, 10 to 80% of the area of the first side surface 4326 of the magnet 4320 may be omitted by the depressed part 4330. The width of the depressed part 4330 in the horizontal direction may be 10 to 80% of the width in the horizontal direction of the first side surface 4326 of the magnet 4320. In one example, the width in the horizontal direction of the depressed part 4330 may be 43% of the width in the horizontal direction of the first side surface 4326 of the magnet 4320. On the other hand, when the inner surface 4324 is viewed, the width of the depressed part 4330 may be 100 μm or more.

The depressed part 4330 may be extended from the upper end of the magnet 4320 to the lower end. The depressed portion 4330 may be extended in a predetermined shape from the upper surface 4323 to the lower surface of the magnet 4320. Alternatively, the depressed part 4330 may be formed with a plurality of grooves spaced apart. Alternatively, the depressed part 4330 may be formed of a plurality of through holes spaced apart from each other. That is, the depressed part 4330 may be formed in any shape that minimizes the influence of the magnetic force on the second camera module. The depressed part 4330 may comprise a concave formed round surface.

Alternatively, the depressed part 4330 may comprise a convexly formed round surface. The depressed part 4330 may be formed as a curved surface. Alternatively, the depressed part 4330 may comprise an inclined surface that forms an obtuse angle or a right angle with the first side surface 4326 of the magnet 4320. The depressed part 4330 may inclinedly connect the first side surface 4326 and the inner surface 4324. The depressed part 4330 can form an obtuse angle with the first side surface 4326 and the inner surface 4324, respectively. The depressed part 4330 may form a right angle with any one or more among the first side surface 4326 and the inner surface 4324. At this time, the depressed portion 4330 may comprise two or more planes, and two or more planes may be mutually inclined.

The depressed portion 4330 formed in each of the first and second magnets 4321 and 4322 may be mutually symmetrical with respect to an imaginary plane comprising the optical axis and parallel to the inner surface 4324 of the magnet 4320. With such a structure, the AF driving generated by the interaction between the magnet 4320 and the coil 4220 in the first lens driving device 1000 can be normally performed.

In the present embodiment, the housing 310 comprises a first side 1031 disposed on a first side surface of the first camera module, a second side 1302 disposed on the opposite side of the first side 1301, and a third side 1303 and a fourth side 1304 that are disposed opposite to each other between the first side 1302 and the second side 1302. At this time, the first and second magnets 4321 and 4322 may be disposed on the third side 1303 and the fourth side 1304, respectively. That is, the first magnet 4321 may be disposed on the third side 1303 and the second magnet 4322 may be disposed on the fourth side 1304. In the present embodiment, the first and second magnets 4321 and 4322 may be disposed biased toward the second side 1302 rather than the first side 1301. That is, the center of each of the first and second magnets 4321 and 4322 may be closer to the second side 1302 than the first side 1301. With this structure, the effect of the magnetic force of the magnet 4320 of the first camera module on the second camera module can be minimized.

Each of the first and second magnets 4321 and 4322 may have an asymmetric shape with respect to the center thereof, respectively. Each of the first and second magnets 4321 and 4322 may each have an asymmetric shape with respect to a virtual plane that comprises the center and is perpendicular to the inner surface 4324 thereof, respectively. That is, the depressed portion 4330 may be formed only on the first side surface 4326 of the first and second magnets 4321 and 4322, and the depressed portion 4330 may not be formed on the second side surface 4327.

The base 4400 may be disposed on the lower side of the housing 4310. The base 4400 may be disposed on the upper surface of the printed circuit board 300. An infrared filter may be coupled to the base 4400.

The base 4400 may comprise a through hole 4410, a terminal accommodating portion 4420, and a stepped portion 4430. However, any one or more among the through hole 4410, the terminal accommodating portion 4420, and the stepped portion 4430 in the base 4400 may be omitted or changed.

The through hole 4410 may be formed in the center of the base 4400. The through hole 4410 may be formed to penetrate through the base 4400 vertically. The through hole 4410 may be overlapped with the lens module 400 in the optical axis direction. The through hole 4410 can allow light passing through the lens module 400 to pass therethrough.

The terminal accommodating portion 4420 may be formed on the side surface of the base 4400. The terminal accommodating portion 4420 may be formed such that a portion of the outer side surface of the base 4400 is recessed inward. The terminal accommodating portion 4420 can accommodate at least a portion of the terminal portion 4524 of the lower elastic member 4520. The terminal accommodating portion 4420 may be formed in a shape corresponding to the terminal portion 4524.

The stepped portion 4430 may be formed at the lower surface of the outer surface of the base 4400. The stepped portion 4430 may be protruded outward from the outer surface of the base 4400. The stepped portion 4430 can support the lower end of the side plate 4102 of the cover member 4100.

The AF elastic member 4500 may be coupled to the bobbin 4210 and the housing 4310. The AF elastic member 4500 can elastically support the bobbin 4210. The AF elastic member 4500 can movably support the bobbin 4210 with respect to the housing 4310. At least a portion of the AF elastic member 4500 may have elasticity.

The AF elastic member 4500 may comprise an upper elastic member 4510 and a lower elastic member 4520. However, any one or more among the upper elastic member 4510 and the lower elastic member 4520 in the AF elastic member 4500 may be omitted or changed.

The upper elastic member 4510 may be coupled to the upper portion of the bobbin 4210 and the upper portion of the housing 4310. The upper elastic member 4510 is disposed on the upper side of the bobbin 4210 and can be coupled to the bobbin 4210 and the housing 4310. The upper elastic member 4510 may be integrally formed.

The upper elastic member 4510 may comprise an outer side 4511, an inner side 4512, and a connecting portion 4513. However, in the upper elastic member 4510, any one or more among the outer side 4511, the inner side 4512, and the connecting portion 4513 may be omitted or changed.

The outer side 4511 can be coupled to the housing 4310. The outer side 4511 can be coupled to the upper surface of the housing 4310. The inner side 4512 can be coupled to the bobbin 4210. The inner side 4512 can be coupled to the upper surface of the bobbin 4210. The connecting portion 4513 can connect the outer side 4511 and the inner side 4512. The connecting portion 4513 can elastically connect the outer side 4511 and the inner side 4512. The connecting portion 4513 may have elasticity.

The lower elastic member 4520 can be coupled to the lower portion of the bobbin 4210 and the lower portion of the housing 4310. The lower elastic member 4520 may be disposed below the bobbin 4210 and may be coupled to the bobbin 4210 and the housing 4310. The lower elastic member 4520 may be electrically connected to the coil 4220. The lower elastic members 4520 may be provided as a pair spaced apart from each other. A pair of lower elastic members 4520 may be coupled to a pair of lead wires of the coil 4220.

The lower elastic member 4520 may comprise an outer side 4521, a medial portion 4522, a connecting portion 4523, and a terminal portion 4524. However, one or more among the outer side 4521, the inner side 4522, the connecting portion 4523, and the terminal portion 4524 in the lower elastic member 4520 may be omitted or changed.

The outer side 4521 can be coupled to the housing 4310. The outer side 4521 can be coupled to the lower surface of the housing 4310. The outer side 4521 can be coupled to the base 4400. The outer side 4521 can be fixed between the housing 4310 and the base 4400. The inner side 4522 can be coupled to the bobbin 4210. The inner portion 4522 can be coupled to the lower surface of the bobbin 4210. The connecting portion 4523 can connect the outer side 4521 and the inner side 4522. The connecting portion 4523 can elastically connect the outer side 4521 and the inner side 4522. The connecting portion 4523 may have elasticity. The terminal portion 4524 may be extended from the outer side 4521. The terminal portion 4524 may be formed by bending from the outer side 4521. The terminal portion 4524 can be bent downward from the outer side 4521 and extended. Alternatively, the terminal portion 4524 may be provided as a separate member from the outer side 4521 as a modified embodiment. The terminal portion 4524 and the outer side 4521, which are separately provided, can be coupled by a conductive member. The terminal portion 4524 can be coupled to the printed circuit board 300. The terminal portion 4524 can be coupled to the printed circuit board 300 by soldering. The terminal portion 4524 can be accommodated in the terminal accommodating portion 4420 of the base 4400. The terminal portion 4524 may be disposed on a side surface opposite to the side surface of the first lens driving device 1000 illustrated in FIG. 1. Hereinafter, the configuration of the second lens driving device according to the present embodiment will be described with reference to the drawings.

Figure 9:
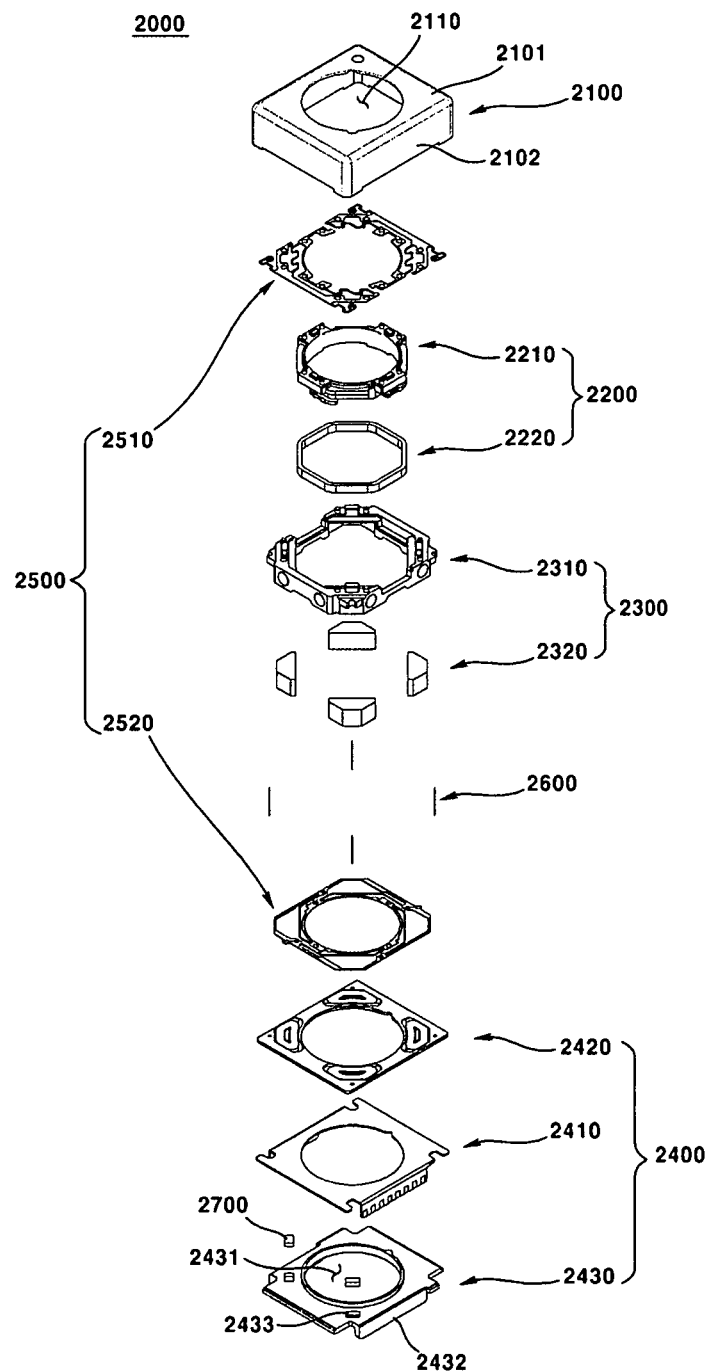
FIG. 9 is an exploded perspective view of a second lens driving device according to the first embodiment of the present invention.
Figure 10:
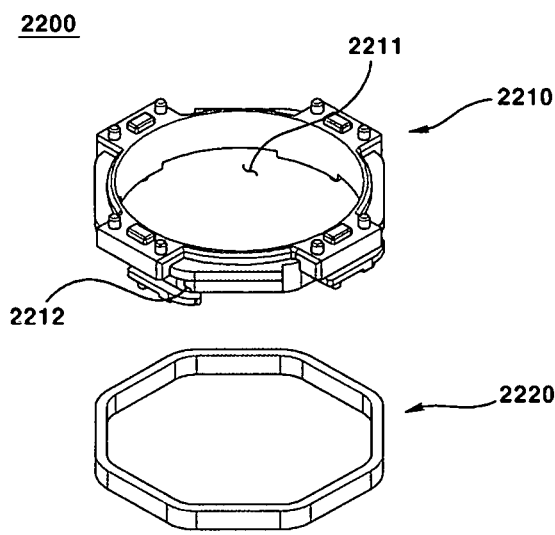
FIG. 10 is an exploded perspective view showing an AF mover of the second lens driving device according to the first embodiment of the present invention.
Figure 11:
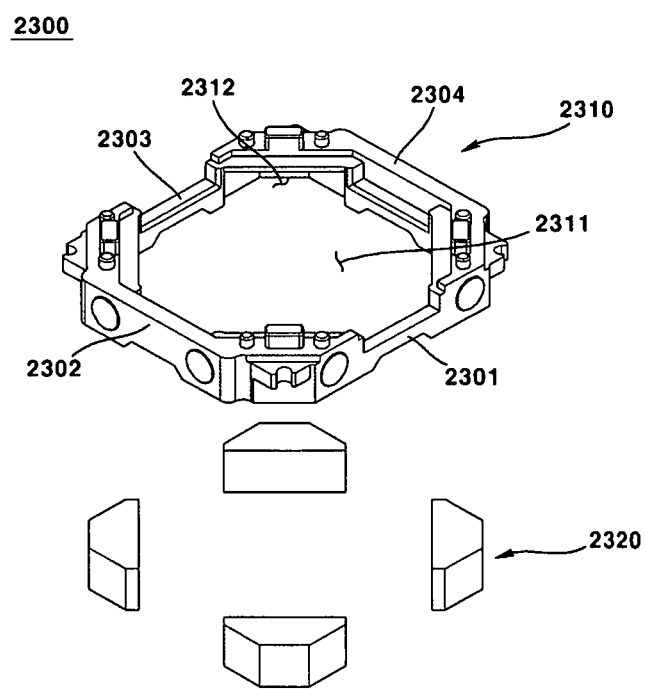
FIG. 11 is an exploded perspective view showing an OIS mover of the second lens driving device according to the first embodiment of the present invention.
Figure 12:
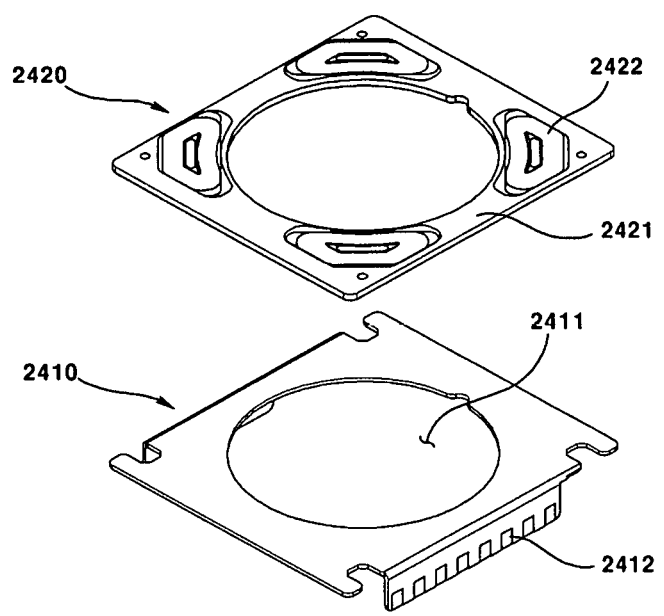
FIG. 12 is an exploded perspective view showing a substrate and a circuit member of the second lens driving device according to the first embodiment of the present invention.
Figure 13:
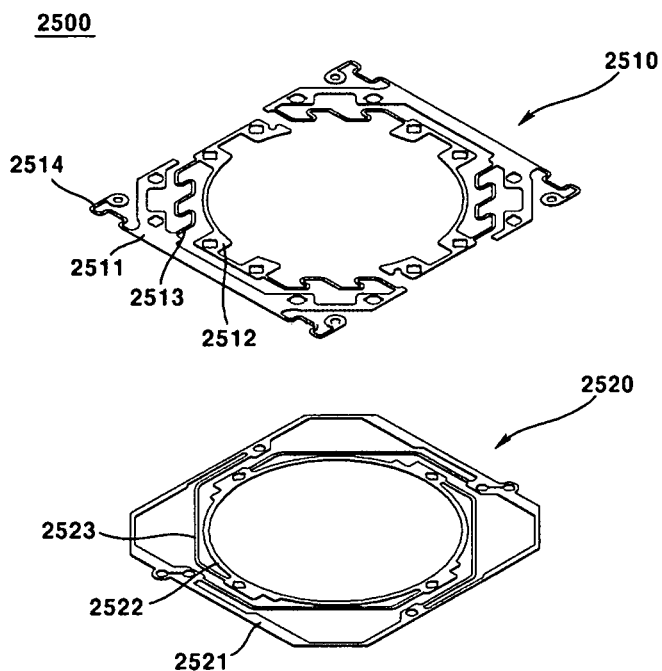
FIG. 13 is an exploded perspective view showing an elastic member of the second lens driving device according to the first embodiment of the present invention.

FIG. 9 is an exploded perspective view of the second lens driving device according to the present embodiment, FIG. 10 is an exploded perspective view showing the AF mover of the second lens driving device according to the present embodiment, FIG. 11 is an exploded perspective view showing the OIS mover of the second lens driving device according to the present embodiment, FIG. 12 is an exploded perspective view showing the substrate and the circuit member of the second lens driving device according to the present embodiment, and FIG. 13 is an exploded perspective view showing an elastic member of the second lens driving device according to the present embodiment.

The second lens driving device 2000 comprises a cover member 2100, an AF mover 2200, an OIS mover 2300, a stator 2400, an elastic member 2500, a support member 2600, and a Hall sensor 2700. In the second camera module 2000, any one or more among the cover member 2100, the AF mover 2200, the OIS mover 2300, the stator 2400, the elastic member 2500, the support member 2600, and the Hall sensor 2700 may be omitted or changed.

The cover member 2100 can accommodate the housing 2310. The cover member 2100 of the second lens driving device 2000 may be spaced apart from the cover member 4100 of the first lens driving device 1000. At this time, the separation distance (refer to D in FIG. 6) between the cover member 2100 and the cover member 4100 may be within 4 mm. Alternatively, the distance D between the cover member 2100 and the cover member 4100 may be within 3 mm. Alternatively, the distance D between the cover member 2100 and the cover member 4100 may be within 2 mm. The distance D between the cover member 2100 and the cover member 4100 may be 1 mm.

The cover member 2100 can form an appearance of the second lens driving device 2000. The cover member 2100 may be in the form of a hexahedron with an open bottom. However, the present invention is not limited thereto. The cover member 2100 may be a non-magnetic material. If the cover member 2100 is made of a magnetic material, the magnetic force of the cover member 2100 may affect the magnet 2320. The cover member 2100 may be formed of a metal material. More specifically, the cover member 2100 may be formed of a metal plate. In this case, the cover member 2100 may block electromagnetic interference (EMI).

Because of this feature of the cover member 2100, the cover member 2100 can be referred to as an 'EMI shield can'. The cover member 2100 may be connected to the ground portion of the printed circuit board 300. Through this, the cover member 2100 can be grounded. The cover member 2100 can block the radio waves generated from the outside of the second lens driving device from entering into the inside of the cover member 2100. Also, the cover member 2100 can block the radio waves generated inside the cover member 2100 from being emitted to the outside of the cover member 2100. However, the material of the cover member 2100 is not limited thereto.

The cover member 2100 may comprise an upper plate 2101 and a side plate 2102. The cover member 2100 may comprise an upper plate 2101 and a side plate 2102 extending downward from the outside of the upper plate 2101. The lower end of the side plate 2102 of the cover member 2100 can be mounted on the base 2430. The cover member 2100 may be mounted on the base 2430 in a way that the inner side surface of the cover member 2100 comes into close contact with a part or all of the side surface of the base 2430. The AF mover 2200, the OIS mover 2300, the stator 2400, the elastic member 2500, and the support member 2600 are located in an inner space formed by the cover member 2100 and the base 2430. With such a structure, the cover member 2100 can protect the internal components from external impact while preventing the penetration of external contaminants. However, it is not limited thereto, also the lower end of the side plate 2102 of the cover member 2100 may be directly coupled to the printed circuit board 300 located below the base 2430.

A portion of the plurality of side plates 2102 of the cover member 2100 of the second lens driving device 2000 may face the cover member 4100 of the first lens driving device 1000. The length of the side plate 2102 of the cover member 2100 in the lengthwise direction may not exceed 1.5 times the length of the side plate 4102 of the cover member 4100 in the lengthwise direction.

The cover member 2100 may comprise an opening 2110. The opening 2110 may be formed in the upper plate 2101. The opening 2110 can expose the lens module. The opening 2110 may be provided in a shape corresponding to the lens module. The size of the opening 2110 may be larger than the diameter of the lens module so that the lens module can be assembled through the opening 2110. Meanwhile, the light introduced through the opening 2110 can pass through the lens module. At this time, the light passing through the lens module can be acquired as an image on the image sensor.

The AF mover 2200 can be combined with the lens module. The AF mover 2200 can accommodate the lens module inside. The outer circumferential surface of the lens module can be coupled to the inner circumferential surface of the AF mover 2200. The AF mover 2200 can move integrally with the lens module through interaction with the OIS mover 2300 and/or the stator 2400.

The AF mover 2200 may comprise a bobbin 2210 and a second coil 2220. However, any one or more among the bobbin 2210 and the second coil 2220 in the AF mover 2200 may be omitted or changed.

The bobbin 2210 may be located inside the housing 2310. The bobbin 2210 can be accommodated in the through hole 2311 of the housing 2310. The bobbin 2210 can be coupled with the lens module. More specifically, the outer circumferential surface of the lens module can be coupled to the inner circumferential surface of the bobbin 2210. The first coil 2220 may be coupled to the bobbin 2210. The lower portion of the bobbin 2210 can be coupled with the lower elastic member 2520. The upper portion of the bobbin 2210 can be coupled with the upper elastic member 2510. The bobbin 2210 can move in the direction of the optical axis with respect to the housing 2310.

The bobbin 2210 may comprise a through hole 2211 and a coil coupling portion 5212. However, any one or more among the through hole 2211 and the coil coupling portion 5212 in the bobbin 2210 may be omitted or changed.

The through hole 2211 may be formed on the inner side of the bobbin 2210. The through hole 2211 may be formed in a vertically open type. The lens module may be coupled to the through hole 2211. The inner circumferential surface of the through hole 2211 may be formed with a thread having a shape corresponding to the thread formed on the outer circumferential surface of the lens module. That is, the through hole 2211 can be screw-coupled to the lens module. An adhesive may be interposed between the lens module and the bobbin 2210. At this time, the adhesive may be an epoxy cured by ultraviolet (UV) light, heat or laser. That is, the lens module and bobbin 2210 may be bonded by ultraviolet curable epoxy and/or thermosetting epoxy.

The coil coupling portion 5212 can accommodate at least a portion of the first coil 2220. The coil coupling portion 5212 may be integrally formed with the outer side surface of the bobbin 2210. The coil coupling portions 5212 may be continuously formed along the outer side surface of the bobbin 2210 or spaced apart from each other at predetermined intervals. As an example, the coil coupling portion 5212 may be formed recessed in a way that a portion of the outer side surface of the bobbin 2210 corresponds to the shape of the first coil 2220. At this time, the first coil 2220 can be directly wound on the coil coupling portion 5212. As a modified embodiment, the coil coupling portion 5212 may be formed as an upper side or a lower side opening type. At this time, the first coil 4220 in a pre-wound state may be inserted into and coupled to the coil coupling portion 5212 through a portion that is open.

The first coil 2220 may be disposed on the bobbin 2210. The first coil 2220 may be disposed on the outer circumferential surface of the bobbin 2210. The first coil 2220 may be directly wound around the outer circumferential surface of the bobbin 2210. The first coil 2220 can be electromagnetically interacted with the magnet 2320. The first coil 2220 may face the magnet 2320. In this case, when a current is supplied to the first coil 2220 and a magnetic field is formed around the first coil 2220, the first coil 2220 can be moved with respect to the magnet 2320 due to the electromagnetic interaction between the first coil 2220 and the magnet 2320. The first coil 2220 may be moved for AF driving. In this case, the first coil 2220 may be referred to as an 'AF coil'.

The first coil 2220 may comprise a pair of lead wires (not shown) for power supply. The pair of lead wires of the first coil 2220 may be electrically connected to the upper elastic member 2510. Each of the pair of lead wires of the first coil 2220 can be electrically connected to the upper elastic member 2510, which is provided as a separated pair. In this case, power is supplied to the first coil 2220 through the upper elastic member 2510 electrically connected to the printed circuit board 300 through the substrate 2410, the substrate portion 2421, and the support member 2600.

The OIS mover 2300 can be moved for anti-shake correction function. The OIS mover 2300 may be disposed outside the AF mover 2200 so as to face the AF mover 2200. The OIS mover 2300 can move the AF mover 2200 or move with the AF mover 2200. The OIS mover 2300 may be movably supported by the stator 2400 and/or the base 2430 located at the lower side of the OIS mover. The OIS mover 2300 may be located in the inner side space of the cover member 2100.

The OIS mover 2300 may comprise a housing 2310 and a magnet 2320. However, any one or more among the housing 2310 and the magnet 2320 in the OIS mover 2300 may be omitted or changed.

The housing 2310 may be disposed apart from the housing 4310 of the first lens driving device 1000. The housing 2310 may be disposed outside the bobbin 2210. The housing 2310 may be disposed apart from the bobbin 2210. At least a portion of the housing 2310 may be formed in a shape corresponding to the inner side surface of the cover member 2100. In particular, the outer side surface of the housing 2310 may be formed in a shape corresponding to the inner side surface of the side plate 2102 of the cover member 2100. The housing 2310, as an example, may be in the form of a hexahedron comprising four side surfaces. However, the shape of the housing 2310 may be any shape that can be disposed inside the cover member 2100. The housing 2310 may be formed of an insulating material. The housing 2310 may be formed as an injection molded article in consideration of productivity. The housing 2310 may be disposed at a distance spaced apart from the cover member 2100 as a moving part for driving the OIS. An upper elastic member 2510 may be coupled to the upper portion of the housing 2310. A lower elastic member 2520 may be coupled to the lower portion of the housing 2310.

The housing 2310 may comprise first to fourth sides 2301, 2302, 2303, and 2304. The housing 2310 may comprise first to fourth sides 2301, 2302, 2303, and 2304 that are continuously disposed.

The housing 2310 may comprise a through hole 2311 and a magnet coupling portion 2312. However, any one or more among the through hole 2311 and the magnet coupling portion 2312 in the housing 2310 may be omitted or changed.

The through hole 2311 may be formed in the inner side of the housing 2310. The through hole 2311 may be formed may be formed in the housing 2310 in a vertically open type. A bobbin 2210 can be accommodated in the through hole 2311. The bobbin 2210 may be movably disposed in the through hole 2311. The through hole 2311 may be formed in a shape corresponding to the bobbin 2210.

The magnet coupling portion 2312 may be formed on the side surface of the housing 2310. The magnet coupling portion 2312 can accommodate at least a portion of the magnet 2320. An adhesive (not shown) may be disposed between the magnet coupling portion 2312 and the magnet 2320. That is, the magnet coupling portion 2312 and the magnet 2320 can be coupled by an adhesive. The magnet coupling portion 2312 may be located on the inner surface of the housing 2310. The magnet coupling portion 2312 may be formed such that a portion of the inner surface of the housing 2310 is recessed outwardly. In this case, there is an advantage in favor of electromagnetic interaction with the first coil 2220 located inside the magnet 2320. The magnet coupling portion 2312 may be a shape with an open bottom. In this case, there is an advantage in favor of electromagnetic interaction with the second coil 2422 located below the magnet 2320.

The magnet 2320 may be located in the housing 2310. The magnet 2320 can be accommodated in the magnet coupling portion 2312 of the housing 2310. Magnet 2320 can be electromagnetically interacted with first coil 2220. The magnet 2320 may face the first coil 2220. The magnet 2320 can move the bobbin 2210 to which the first coil 2220 is fixed. The magnet 2320 can move the first coil 2220 for AF driving. In this case, the magnet 2320 may be referred to as an 'AF driving magnet'. Further, the magnet 2320 may face the second coil 2422. Magnet 2320 can be moved for OIS driving. In this case, the magnet 2320 may be referred to as an 'OIS driving magnet'. Accordingly, the magnet 2320 may be referred to as an 'AF/OIS common driving magnet'.

The magnet 2320 may comprise four corner magnets. The four corner magnets may be disposed such that the N pole faces the inside. Alternatively, the four corner magnets may be disposed such that the S-pole faces the inside. The four corner magnets may have a columnar shape whose inner side surface is larger than the outer side surface.

Figure 14:
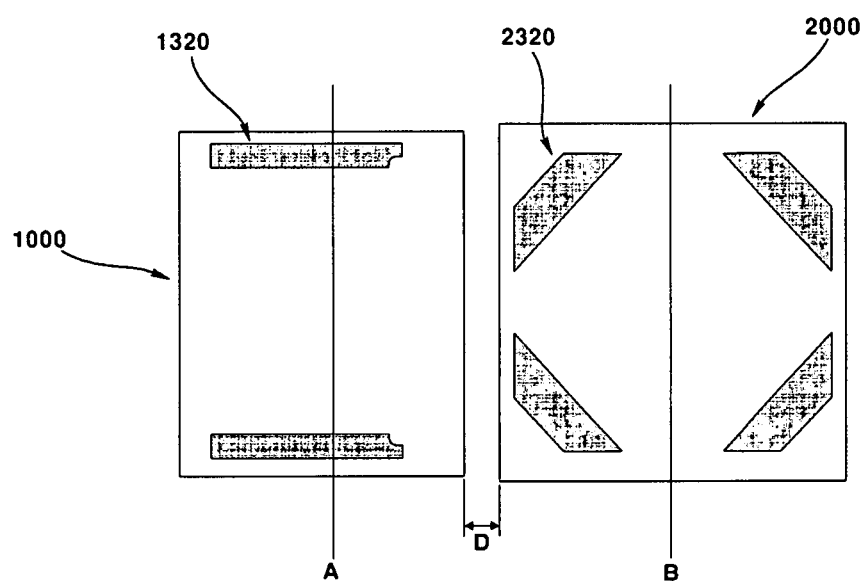
FIG. 14 is a conceptual diagram showing another embodiment of FIG. 6.

The magnet 2320 may be disposed such that the inner surface and the outer surface thereof are parallel to each other, as illustrated in FIG. 6. The inner surface of the magnet 2320 may be disposed on the opposite side of the outer surface of the magnet 2320 in parallel with the outer surface of the magnet 2320. The magnet 2320 may comprise a side surface connecting the inner surface and the outer surface laterally. At this time, portions of both side surfaces of the magnet 2320 may comprise parallel planes that are parallel to each other. However, as another embodiment, both side surfaces of the magnet 2320 may not comprise a parallel plane as illustrated in FIG. 14.

The stator 2400 may be positioned below the AF mover 2200. The stator 2400 may be located below the OIS mover 2300. The stator 2400 can move the OIS mover 2300. At this time, the AF mover 2200 can be moved together with the OIS mover 2300. That is, the stator 2400 can move the AF mover 2200 and the OIS mover 2300.

The stator 2400 may comprise a substrate 2410, a circuit member 2420, and a base 2430. However, any one or more among the substrate 2410, the circuit member 2420, and the base 2430 in the stator 2400 may be omitted or changed.

The substrate 2410 may be a FPCB which is a flexible printed circuit board. The substrate 2410 may be disposed on the upper surface of the base 2430. The substrate 2410 may be located between the base 2430 and the circuit member 2420. The substrate 2410 may be electrically connected to the second coil 2422. The substrate 2410 may be electrically connected to the first coil 2220. The substrate 2410 may be electrically connected to the first coil 2220 through the support member 2600 and the upper elastic member 2510.

The substrate 2410 may comprise a through hole 2411 and a terminal 2412. However, any one or more among the through hole 2411 and the terminal 2412 in the substrate 2410 may be omitted or changed.

The through hole 2411 may be formed in the center of the substrate 2410. The through holes 2411 may be formed to penetrating through the substrate 2410. The through hole 2411 may overlap with the lens module in the optical axis direction. The through hole 2411 can pass the light that has passed through the lens module.

The terminal 2412 may be formed by bending a portion of the substrate 2410. The terminal 2412 may be formed by bending a portion of the substrate 2410 downward. Terminal 2412 may be at least partially exposed to the outside. The lower end of terminal 2412 may be coupled with the printed circuit board 300. The terminal 2412 may be soldered to the printed circuit board 300. The substrate 2410 may be electrically connected to the printed circuit board 300 through the terminal 2412.

The circuit member 2420 may be disposed on the upper surface of the substrate 2410. The circuit member 2420 may be disposed on the base 2430. The circuit member 2420 may be disposed between the substrate 2410 and the housing 2310.

The circuit member 2420 may comprise a substrate portion 2421 and a second coil 2422. However, ant one or more among the substrate portion 2421 and the second coil 2422 in the circuit member 2420 may be omitted or changed.

The substrate portion 2421 may be a flexible printed circuit board (FPCB). The second coil 2422 may be formed of a fine pattern coil (FPC) on the substrate portion 2421. The substrate portion 2421 may be disposed on the upper surface of the substrate 2410. The substrate portion 2421 may be electrically connected with the substrate 2410.

The substrate portion 2421 may be electrically connected to the second coil 2422. The second coil 2422 may be formed of a fine pattern coil (FPC) on the base portion 2421. The second coil 2422 may be located on the base 2430. The second coil 2422 can be electromagnetically interacted with the magnet 2320. And the second coil 2422 can face the magnet 2320. In this case, when a current is supplied to the second coil 2422 to form a magnetic field around the second coil 2422, the magnet 2320 can move with respect to the second coil 2422 due to the electromagnetic interaction between the second coil 2422 and the magnet 2320. The second coil 2422 can move the magnet 2320 for OIS driving. In this case, the second coil 2422 may be referred to as an 'OIS coil'.

The base 2430 may be disposed on the lower side of the housing 2310. The base 2430 can movably support the housing 2310. The base 2430 may be positioned on the upper surface of the printed circuit board 300. An infrared filter may be coupled to the base 2430.

The base 2430 may comprise a through hole 2431, a terminal accommodating portion 2432, and a sensor accommodating portion 2433. However, any one or more among the through hole 2431, the terminal accommodating portion 2432, and the sensor accommodating portion 2433 in the base 2430 may be omitted or changed.

The through hole 2431 may be formed in the center of the base 2430. The through hole 2431 may be formed to penetrate through the base 2430 vertically. The through hole 2431 may overlap with the lens module in the optical axis direction. The through hole 2431 can pass the light that has passed through the lens module.

The terminal accommodating portion 2432 may be formed on the side surface of the base 2430. The terminal accommodating portion 2432 may be formed in a way that a portion of the outer side surface of the base 2430 is recessed inward. The terminal accommodating portion 2432 can accommodate at least a portion of the terminal 2412 in the substrate 2410. The terminal accommodating portion 2432 may be formed to have a width corresponding to the terminal 2412.

The sensor accommodating portion 2433 may be formed on the upper surface of the base 2430. The sensor accommodating portion 2433 may be formed in a way that a portion of the upper surface of the base 2430 is recessed downward. The sensor accommodating portion 2433 may be formed as a groove. The sensor accommodating portion 2433 can accommodate at least a portion of the Hall sensor 2700. The sensor accommodating portion 2433 may be formed in a shape corresponding to the Hall sensor 2700. The sensor accommodating portion 2433 may be formed in a number corresponding to the hole sensor 2700. The sensor accommodating portion 2433 may be formed in two.

The elastic member 2500 may be coupled to the bobbin 2210 and the housing 2310. The elastic member 2500 can elastically support the bobbin 2210. The elastic member 2500 can movably support the bobbin 2210 with respect to the housing 2310. At least a portion of the elastic member 2500 may have elasticity.

The elastic member 2500 may comprise an upper elastic member 2510 and a lower elastic member 2520. However, any one or more among the upper elastic member 2510 and the lower elastic member 2520 in the elastic member 2500 may be omitted or changed.

The upper elastic member 2510 may be coupled to the upper portion of the bobbin 2210 and the upper portion of the housing 2310. The upper elastic member 2510 may be disposed on the upper side of the bobbin 2210 and may be coupled to the bobbin 2210 and the housing 2310. The upper elastic member 2510 may be electrically connected to the first coil 2220. The upper elastic members 2510 may be provided in a pair spaced apart from each other. A pair of upper elastic members 2510 can be coupled to a pair of lead wires of the first coil 2220.

The upper elastic member 2510 may comprise an outer side 2511, an inner side 2512, a connecting portion 2513, and a coupling portion 2514. However, any one or more among the outer side 2511, the inner side 2512, the connecting portion 2513, and the coupling portion 2514 in the upper elastic member 2510 may be omitted or changed.

The outer portion 2511 can be coupled to the housing 2310. The outer side 2511 may be coupled to the upper surface of the housing 2310. The inner side 2512 can be coupled to the bobbin 2210. The inner side 2512 can be coupled to the upper surface of the bobbin 2210. The connecting portion 2513 can connect the outer side 2511 and the inner side 2512. The connecting portion 2513 can elastically connect the outer side 2511 and the inner side 2512. The connecting portion 2513 may have elasticity. The coupling portion 2514 may be extended from the outer side 2511. The coupling portion 2514 may be extended outward from the outer side 2511. The coupling portion 2514 may be located on the four corner portions of the housing 2310. The coupling portion 2514 can be coupled with the supporting member 2600.

The lower elastic member 2520 may be coupled to the lower portion of the bobbin 2210 and the lower portion of the housing 2310. The lower elastic member 2520 may be disposed below the bobbin 2210 and may be coupled to the bobbin 2210 and the housing 2310. The lower elastic member 2520 may be integrally formed.

The lower elastic member 2520 may comprise an outer side 2521, an inner side 2522, and a connecting portion 2523. However, any one or more among the outer side 2521, the inner side 2522 and the connecting portion 2523 in the lower elastic member 2520 may be omitted or changed.

The outer side 2521 may be coupled to the housing 2310. The outer side 2521 can be coupled to the lower surface of the housing 2310. The inner side 2522 can be coupled to the bobbin 2210. The inner side 2522 can be coupled to the lower surface of the bobbin 2210. The connecting portion 2523 can connect the outer side 2521 and the inner side 2522. The connecting portion 2523 can elastically connect the outer side 2521 and the inner side 2522. The connecting portion 2523 may have elasticity.

The support member 2600 can movably support the housing 2310. The support member 2600 can movably support the OIS mover 2300 with respect to the stator 2400. The lower end of the support member 2600 can be coupled with the circuit member 2420. The upper end portion of the support member 2600 can be coupled with the upper elastic member 2510. The support member 2600 may comprise a plurality of wires.

Alternatively, the support member 2600 may comprise a plurality of plate rings. The support member 2600 may have elasticity at least in part. The support member 2600 may be formed of a conductive member. The circuit member 2420 and the second upper elastic member 2510 may be electrically conducted by the support member 2600. The support member 2600 may be provided in four so as to be disposed at each of the four corners of the housing 2310.

A damper (not shown) may be disposed in the support member 2600 and the housing 2310. the damper may be disposed in the support member 2600 and the elastic member 2500. The damper can prevent the resonance phenomenon that may occur during the AF/OIS feedback driving. Alternatively, as a modified embodiment, a buffer (not shown) in which the shape of the support member 2600 and/or a portion of the elastic member 2500 is changed in place of the damper may be provided. The buffer may be formed to be bent or curved.

The Hall sensor 2700 can be used for the anti-shake correction feedback function. Hall sensor 2700 may be a Hall IC. The Hall sensor 2700 can sense the magnetic force of the magnet 2320. The Hall sensor 2700 can sense movement of the housing 2310. The Hall sensor 2700 can sense the magnet 2320 fixed to the housing 2310. The Hall sensor 2700 may be electrically connected to the substrate 2410. The Hall sensor 2700 can be accommodated in the sensor accommodating portion 2433 of the base 2430. The Hall sensors 2700 are provided in two and disposed at right angle to each other with respect to the optical axis so that the movement of the housing 2310 can be detected in x-axis and y-axis components.

Hereinafter, the configuration of the first lens driving device according to the second embodiment of the present invention will be described with reference to the drawings.

Figure 15:
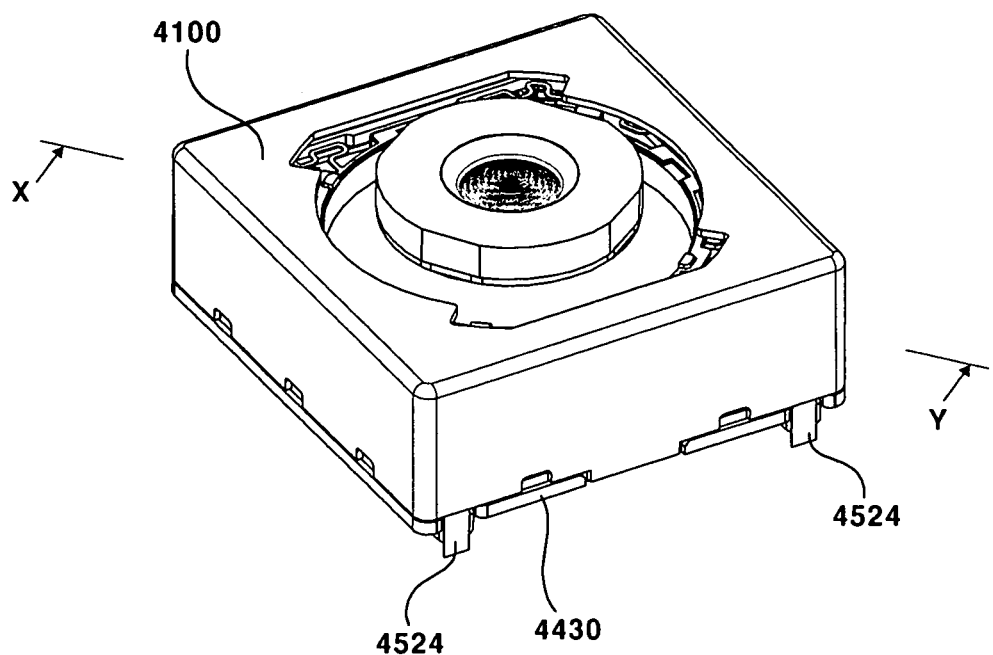
FIG. 15 is a perspective view of a lens module coupled to a first lens driving device according to the second embodiment of the present invention.
Figure 16:
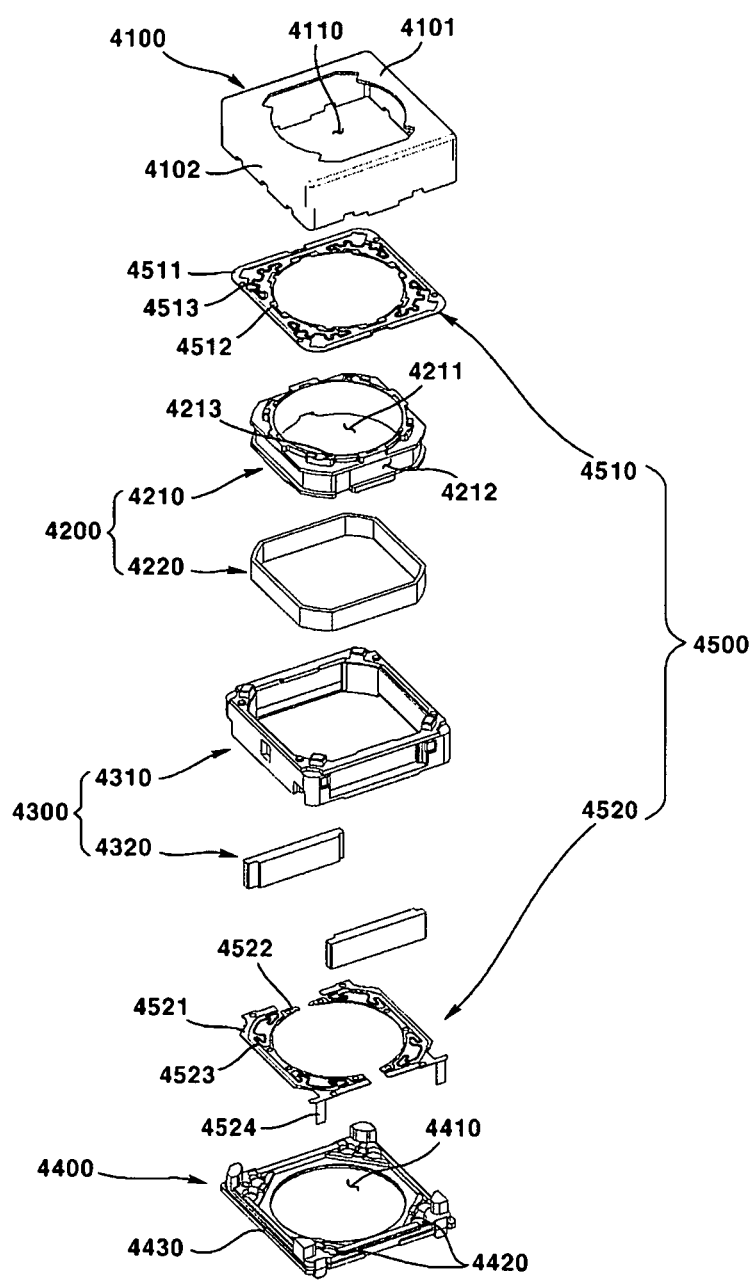
FIG. 16 is an exploded perspective view of the first lens driving device according to the second embodiment of the present invention.
Figure 17:
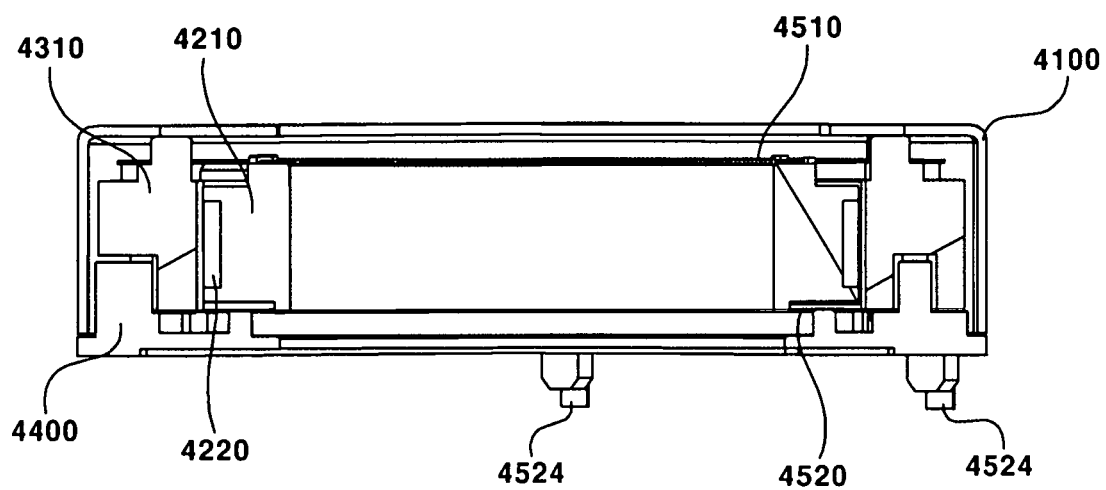
FIG. 17 is a sectional view taken along the line X-Y in FIG. 15.
Figure 18:
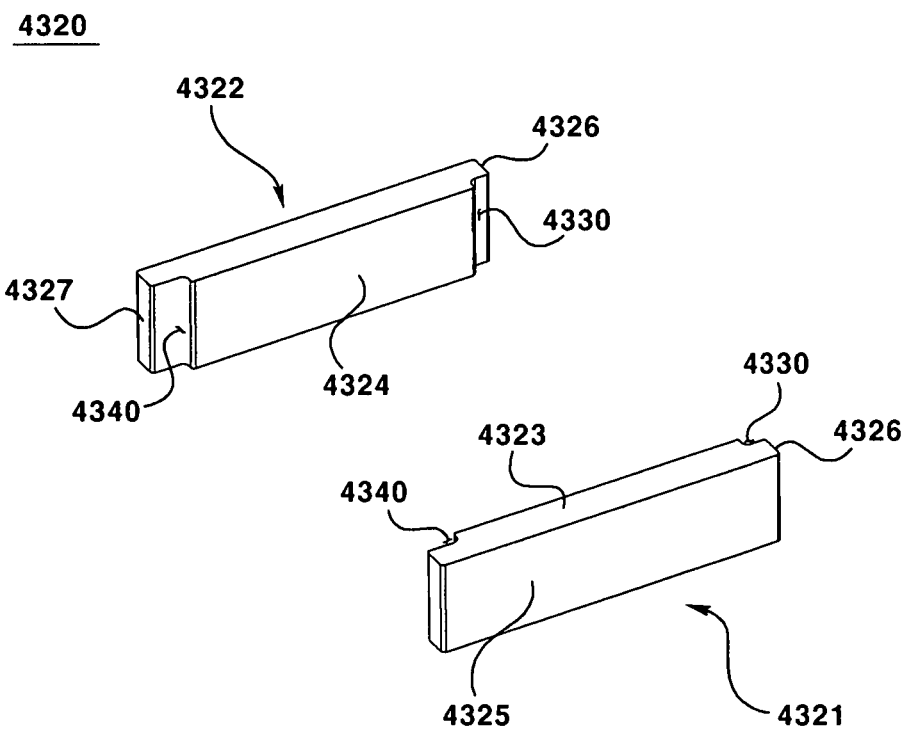
FIG. 18 is a perspective view showing a magnet of the first lens driving device according to the second embodiment of the present invention.
Figure 19:
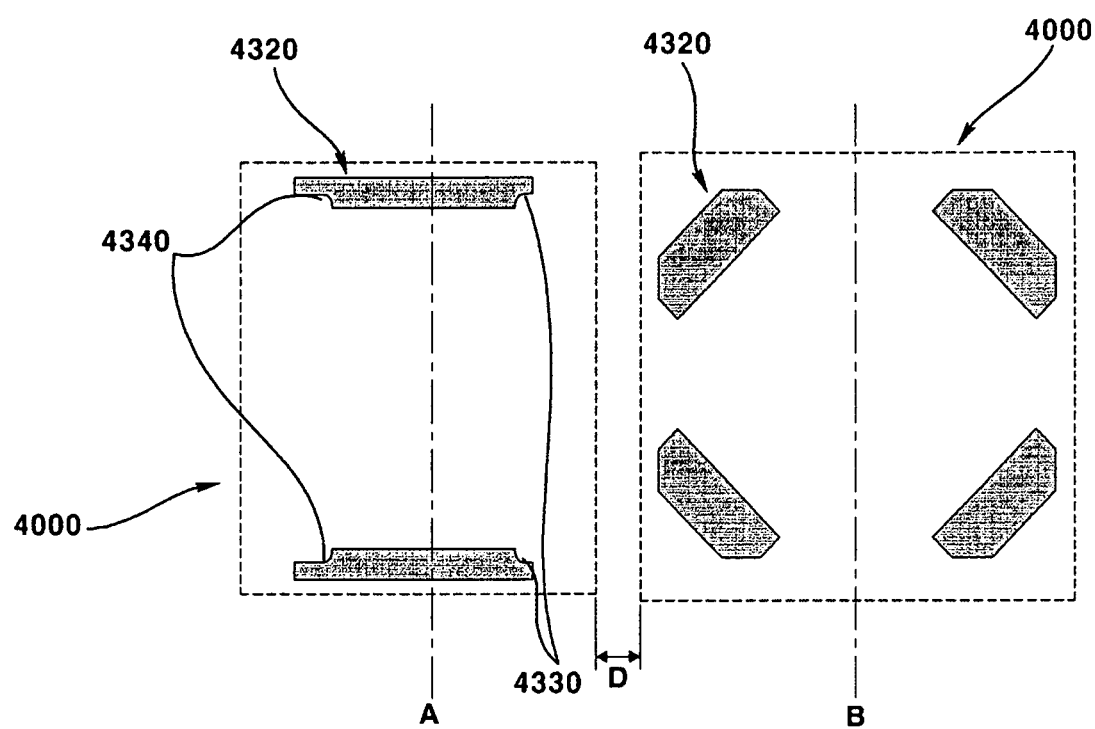
FIG. 19 is a conceptual view showing a magnet of the first lens driving device and a magnet of the second lens driving device according to the second embodiment of the present invention.
Figure 20:
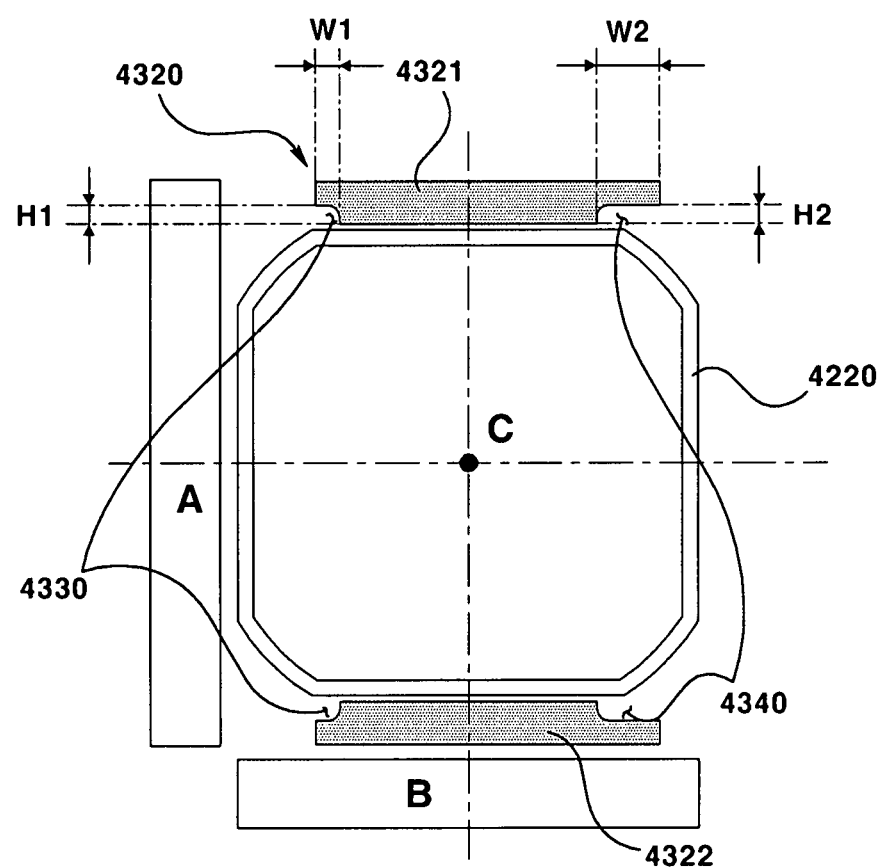
FIG. 20 is a conceptual diagram showing a magnet and related structures of the first lens driving device according to the second embodiment of the present invention.
Figure 21:
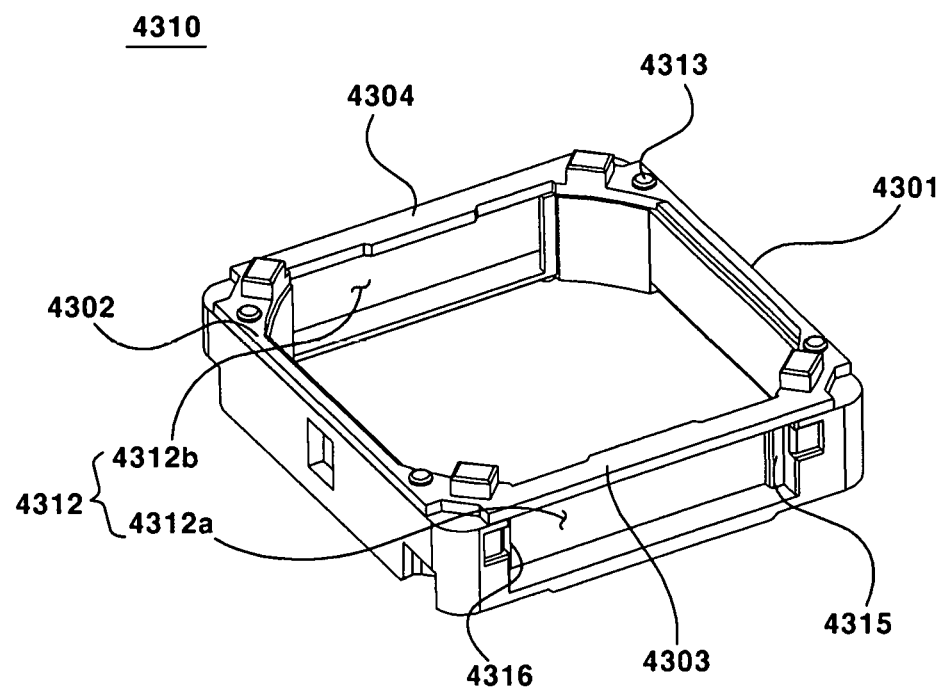
FIG. 21 is a perspective view showing the housing of the first lens driving device according to the second embodiment of the present invention.
Figure 22:
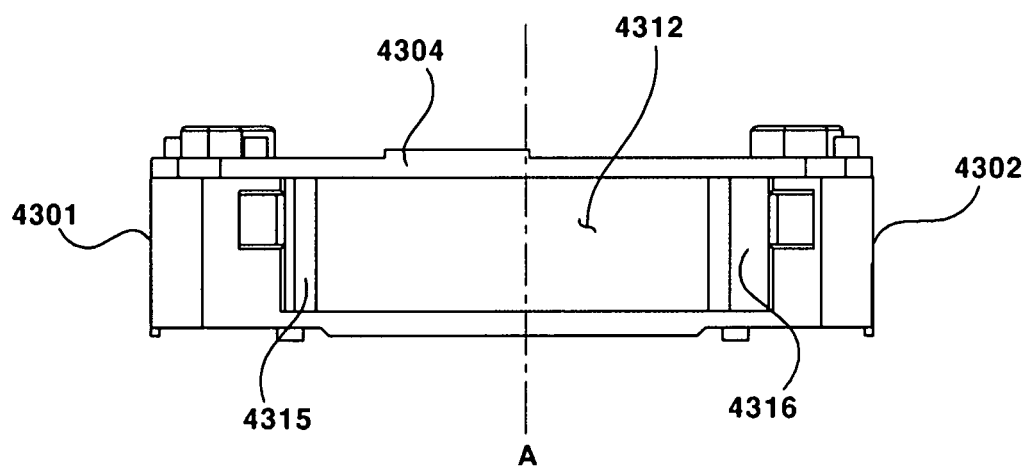
FIG. 22 is a side view showing the housing of the first lens driving device according to the second embodiment of the present invention.
Figure 23:
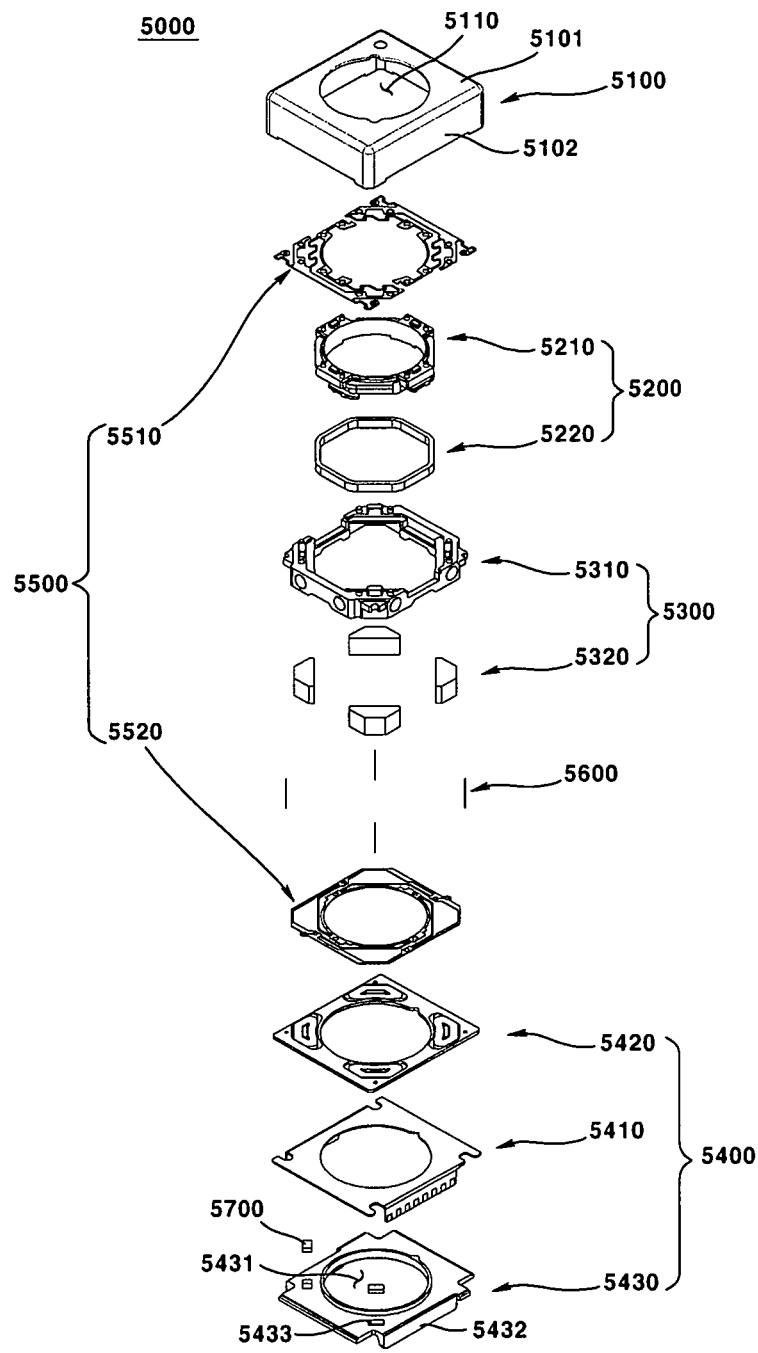
FIG. 23 is an exploded perspective view of the second lens driving device according to the second embodiment of the present invention.
Figure 24:
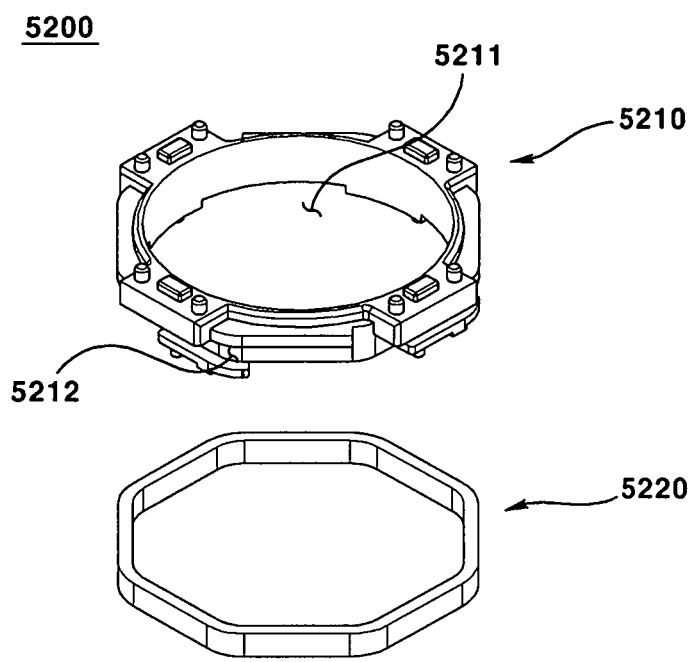
FIG. 24 is an exploded perspective view showing the AF mover of the second lens driving device according to the second embodiment of the present invention.
Figure 25:
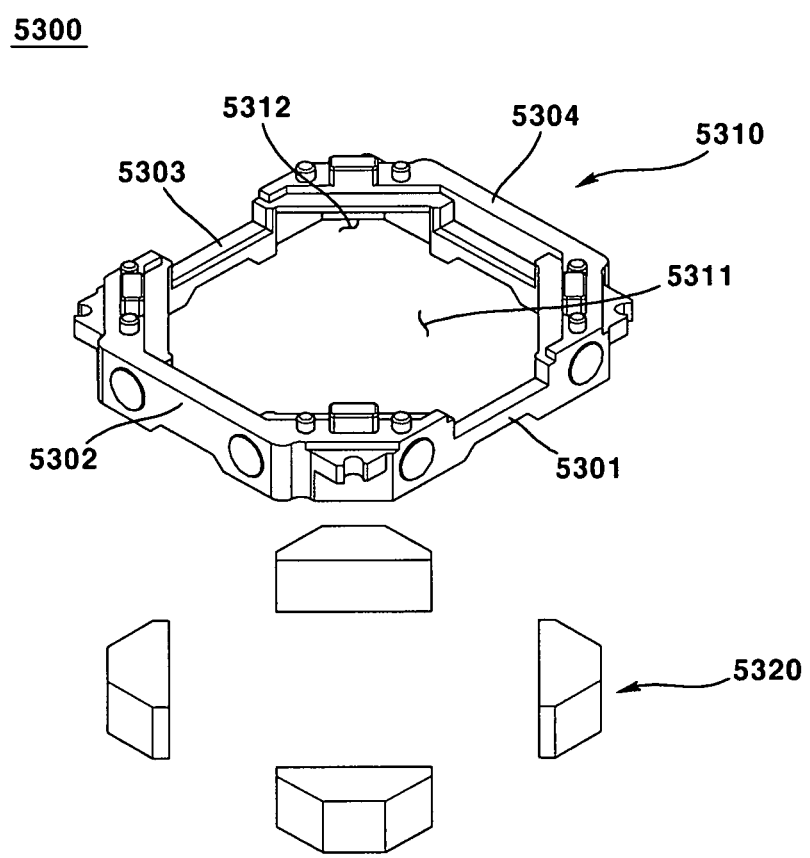
FIG. 25 is an exploded perspective view showing the OIS mover of the second lens driving device according to the second embodiment of the present invention.
Figure 26:
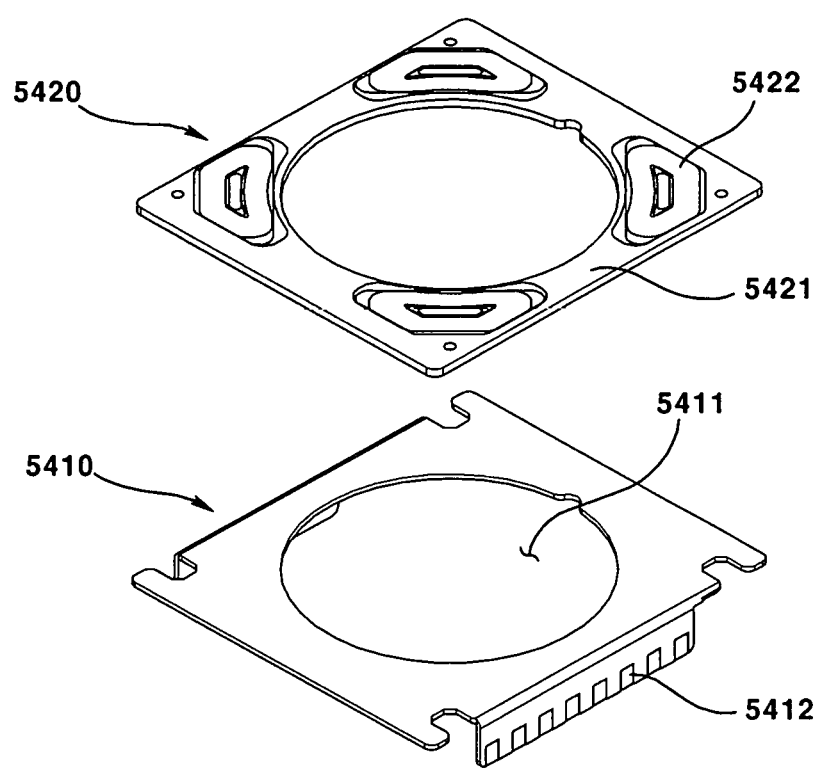
FIG. 26 is an exploded perspective view showing the substrate and the circuit member of the second lens driving device according to the second embodiment of the present invention.
Figure 27:
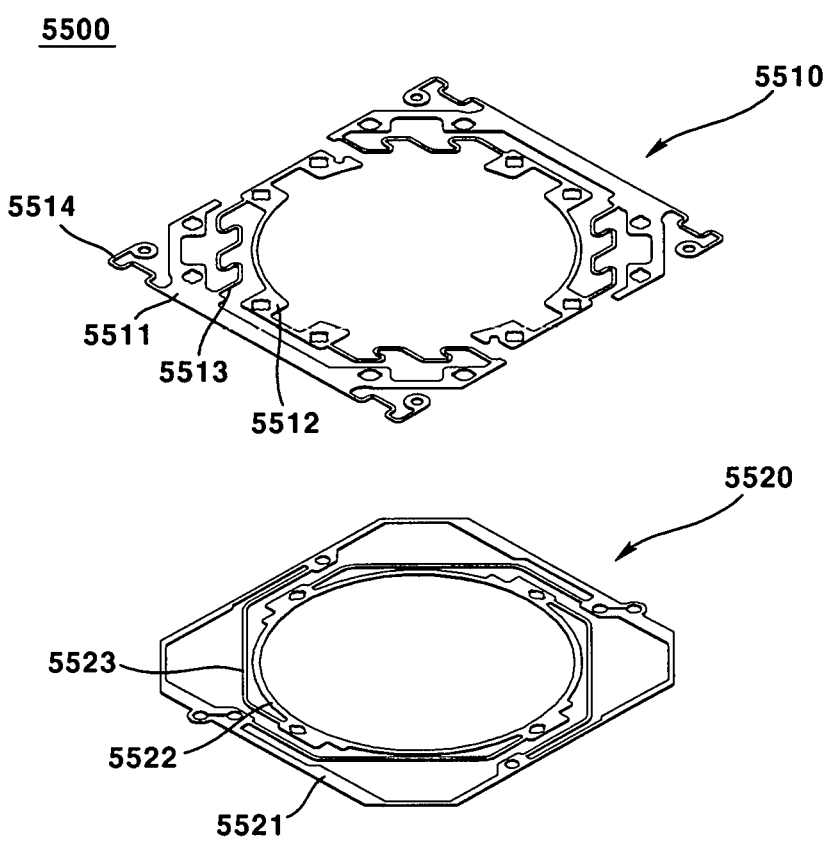
FIG. 27 is an exploded perspective view showing an elastic member of the second lens driving device according to the second embodiment of the present invention.
Figure 28:
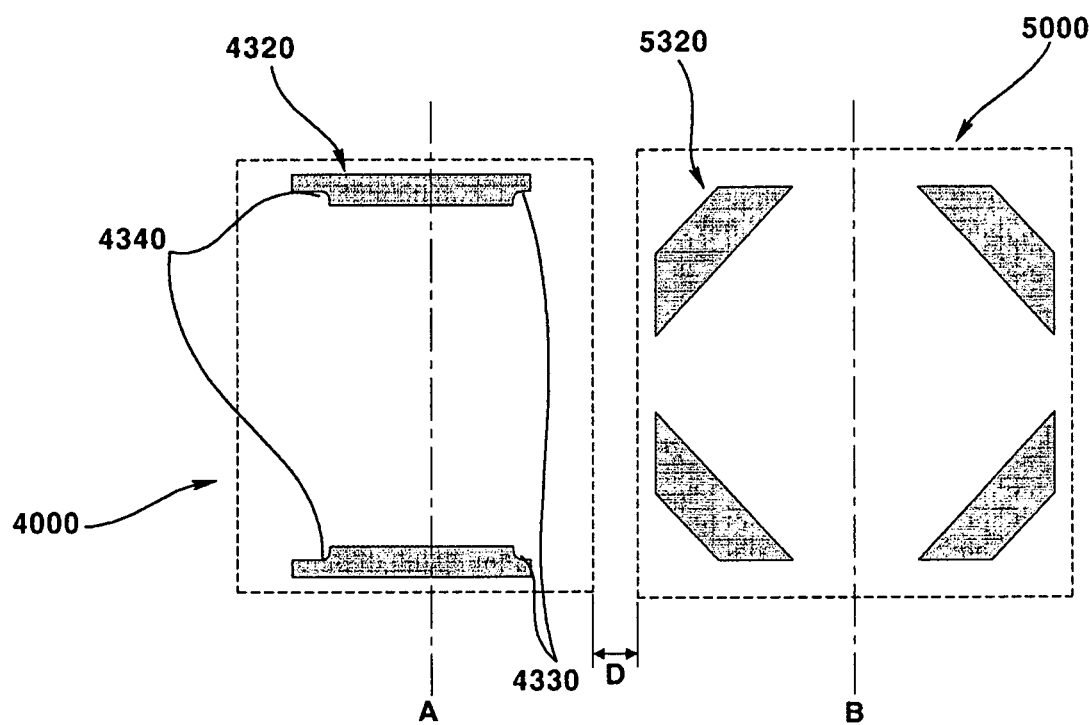
FIG. 28 is a conceptual diagram showing another embodiment of FIG. 19.
Figure 29:
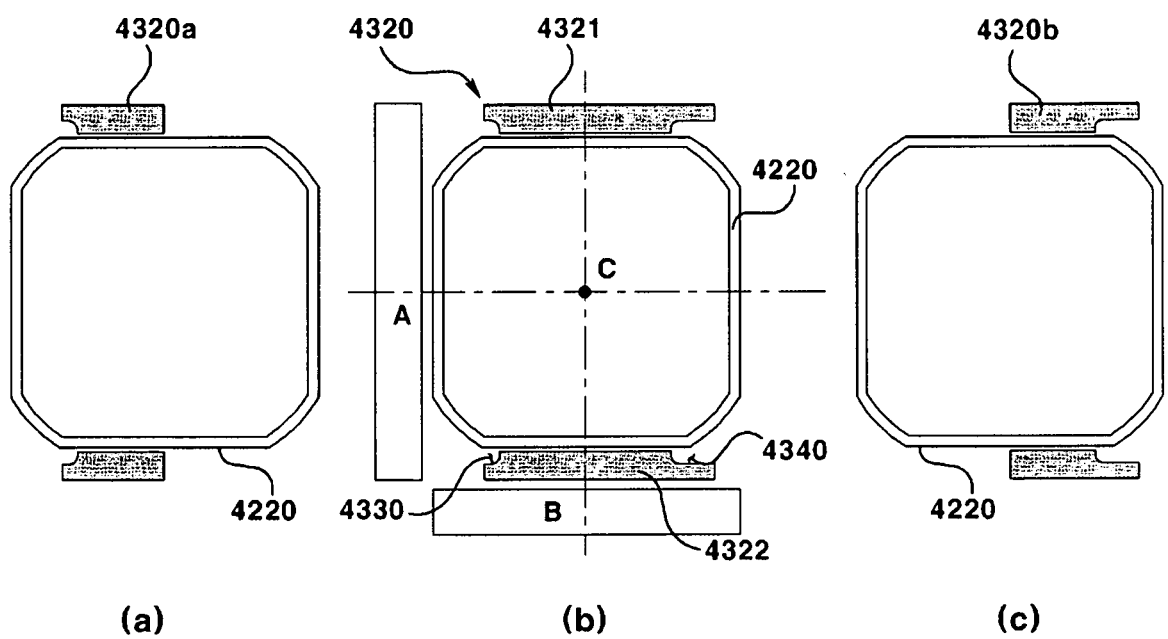
FIG. 29(b) is a conceptual view showing a magnet and related structures of the first lens driving device according to the second embodiment of the present invention.
FIGS. 29(a) and 29(c) are conceptual views illustrating the disassembled magnet shown in FIG. 29(b).

FIG. 15 is a perspective view of a lens module coupled to a first lens driving device according to the second embodiment of the present invention, FIG. 16 is an exploded perspective view of the first lens driving device according to the second embodiment of the present invention, FIG. 17 is a sectional view taken along the line X-Y in FIG. 15, FIG. 18 is a perspective view showing a magnet of the first lens driving device according to the second embodiment of the present invention, FIG. 19 is a conceptual view showing a magnet of the first lens driving device and a magnet of the second lens driving device according to the second embodiment of the present invention, FIG. 20 is a conceptual diagram showing a magnet and related structures of the first lens driving device according to the second embodiment of the present invention, FIG. 21 is a perspective view showing the housing of the first lens driving device according to the second embodiment of the present invention, FIG. 22 is a side view showing the housing of the first lens driving device according to the second embodiment of the present invention, FIG. 23 is an exploded perspective view of the second lens driving device according to the second embodiment of the present invention, FIG. 24 is an exploded perspective view showing the AF mover of the second lens driving device according to the second embodiment of the present invention, FIG. 25 is an exploded perspective view showing the OIS mover of the second lens driving device according to the second embodiment of the present invention, FIG. 26 is an exploded perspective view showing the substrate and the circuit member of the second lens driving device according to the second embodiment of the present invention, FIG. 27 is an exploded perspective view showing an elastic member of the second lens driving device according to the second embodiment of the present invention, FIG. 28 is a conceptual diagram showing another embodiment of FIG. 19, and FIG. 29(b) is a conceptual view showing a magnet and related structures of the first lens driving device according to the second embodiment of the present invention, and FIGS. 29(a) and 29(c) are conceptual views illustrating the disassembled magnet shown in FIG. 29(b).

The first lens driving device 4000 may be an AF module. At this time, the second lens driving device 5000 may be an OIS module. Here, the OIS module can also perform the AF function. However, the first lens driving device 4000 may be an OIS module. At this time, the second lens driving device 5000 may be an AF module. That is, any one among the first lens driving device 4000 or the second lens driving device 5000 is an AF module and the other is an OIS module. Or both the first lens driving device 4000 and the second lens driving device 5000 may be AF modules. Or both the first lens driving device 4000 and the second lens driving device 5000 may be an OIS module.

The first lens driving device 4000 may comprise a cover 4100, a mover 4200, a stator 4300, a base 4400, and an AF elastic member 4500. However, any one or more among the cover 4100, the mover 4200, the stator 4300, the base 4400, and the AF elastic member 4500 in the first lens driving device 4000 may be omitted or changed.

The cover 4100 may be formed as a separate member from the housing 3310. The cover 4100 may be formed of a material different from that of the housing 4310. The cover 4100 may be integrally formed with the housing 4310. Alternatively, the cover 4100 may be omitted and the housing 4310 may function as the cover 4100. That is, the cover 4100 may be the housing 4310.

The cover 4100 can form an appearance of the first lens driving device 4000. The cover 4100 may be in the form of a hexahedron having an opened bottom. However, it is not limited thereto. The cover 4100 may be a non-magnetic material. If the cover 4100 is formed of a magnetic material, the magnetic force of the cover 4100 may affect the magnet 5320 of the second lens driving device 5000. The cover 4100 may be formed of a metal material. In more detail, the cover 4100 may be formed of a metal plate. In this case, the cover 4100 may block electromagnetic interference (EMI). Because of this feature of the cover 4100, the cover 3100 can be referred to as an 'EMI shield can'. The cover 4100 may be connected to the ground portion of the printed circuit board 300. Through this, the cover 4100 can be grounded. The cover 4100 can prevent the radio waves generated from the outside of the first lens driving device 4000 from entering into the cover 4100. Also, the cover 4100 can block the radio waves generated inside the cover 4100 from being emitted to the outside of the cover 4100. However, the material of the cover 4100 is not limited thereto.

The cover 4100 may comprise an upper plate 4101 and a side plate 4102. The cover 4100 may comprise an upper plate 4101 and a side plate 4102 extending downward from the outer side of the upper plate 4101. The lower end of the side plate 3102 of the cover 3100 may be mounted to the base 4400. The lower end of the side plate 3102 of the cover 4100 can be coupled with the stepped portion 4430 of the base 4400. The cover 4100 may be mounted on the base 4400 in a way that the inner side surface of the cover 4100 comes in close contact with part or all of the side surface of the base 4400.

A mover 4200, a stator 4300, and an AF elastic member 4500 can be positioned in the inner space formed by the cover 4100 and the base 4400. With such a structure, the cover 4100 can protect the internal components from external impact while preventing the penetration of external contaminants. The lower end of the side plate 4102 of the cover 4100 may be directly coupled to the printed circuit board 300 located below the base 4400. Some of the plurality of side plates 4102 may face a cover 5100 of the second lens driving device 5000.

The cover 4100 may comprise an opening 4110. The opening 4110 may be formed in the upper plate 4101. The opening 3110 may expose the lens module 400. The opening 4110 may have a shape corresponding to that of the lens module 400. The size of the opening 4110 may be larger than the diameter of the lens module 400 so that the lens module 400 can be assembled through the opening 4110. Meanwhile, the light introduced through the opening 4110 can pass through the lens module 400. At this time, light passing through the lens module 400 can be acquired as an image on the first image sensor.

The mover 4200 can be coupled to the lens module 400. The mover 4200 can accommodate the lens module 400 inside. The outer circumferential surface of the lens module 400 may be coupled to the inner circumferential surface of the mover 4200. The mover 4200 can move integrally with the lens module 400 through interaction with the stator 4300.

The mover 4200 may comprise a bobbin 4210 and a coil 4220. However, any one or more among the bobbin 4210 and the coil 4220 in the mover 4200 may be omitted or changed.

The bobbin 4210 may be located inside the housing 4310. The bobbin 4210 can be accommodated in the through hole 4311 of the housing 4310. The bobbin 4210 may be coupled to the lens module 400. More specifically, the outer circumferential surface of the lens module 400 may be coupled to the inner circumferential surface of the bobbin 4210. A coil 4220 may be coupled to the bobbin 4210. The lower portion of the bobbin 4210 can be coupled with the lower elastic member 4520. The upper portion of the bobbin 4210 may be coupled with the upper elastic member 4510. The bobbin 4210 can move in the direction of the optical axis with respect to the housing 4310.

The bobbin 4210 may comprise a through hole 4211, a coil coupling portion 4212, an upper coupling portion 4213, and a lower coupling portion (not shown). However, in the bobbin 4210, any one or more among the through hole 4211, the coil coupling portion 4212, the upper coupling portion 4213, and the lower coupling portion may be omitted or changed.

The through hole 4211 may be formed on the inner side of the bobbin 4210. The through hole 4211 may be formed in a vertically open type. The lens module 400 may be coupled to the through hole 4211. The inner circumferential surface of the through hole 4211 may be formed with a thread having a shape corresponding to the thread formed on the outer circumferential surface of the lens module 400. That is, the through hole 4211 can be screw-coupled to the lens module 400. An adhesive may be interposed between the lens module 400 and the bobbin 4210. At this time, the adhesive may be an epoxy cured by ultraviolet (UV) light, heat or laser. That is, the lens module 400 and the bobbin 4210 can be bonded by ultraviolet curing epoxy and/or thermosetting epoxy.

The coil coupling portion 4212 can accommodate at least a portion of the coil 4220. The coil coupling portion 4212 may be integrally formed with the outer side surface of the bobbin 4210. In addition, the coil coupling portions 4212 may be formed continuously along the outer side surface of the bobbin 4210 or spaced apart from each other at predetermined intervals. As an example, the coil coupling portion 4212 may be formed in a way that a portion of the outer surface of the bobbin 4210 corresponds to the shape of the coil 4220. At this time, the coil 4220 can be directly wound on the coil coupling portion 4212. As a modified embodiment, the coil coupling portion 4212 may be formed as an upper side or a lower side opening type. At this time, the coil 4220 in a pre-wound state may be inserted into and coupled to the coil coupling portion 4212 through a portion that is open.

The upper coupling portion 4213 can be coupled with the upper elastic member 4510. The upper coupling portion 4213 can be coupled with the inner side 4512 of the upper elastic member 4510. The upper coupling portion 4213 may be formed to be protruded upward from the upper surface of the bobbin 4210. In one example, the protrusion of the upper coupling portion 4213 can be inserted and coupled with the grooves or holes of the inner side 4512 of the upper elastic member 4510. At this time, the protrusion of the upper coupling portion 3213 may be thermally welded while being inserted into the hole of the inner side 4512, so that the upper side elastic member 3510 can be fixed between the thermally welded protrusion and the upper surface of the bobbin 4210.

The lower coupling portion can be coupled with the lower elastic member 4520. The lower coupling portion can be coupled with the inner side 4522 of the lower elastic member 4520. The lower coupling portion may be protruded downward from the lower surface of the bobbin 4210. For example, the protrusion of the lower coupling portion can be inserted and coupled to the groove or the hole of the inner side 4522 of the lower elastic member 4520. At this time, the protrusion of the lower coupling portion may be thermally welded while being inserted into the hole of the inner side 4522, so that the lower elastic member 4520 can be fixed between the lower surface of the bobbin 4210 and the thermally welded protrusion.

A coil 4220 may be located in the bobbin 4210. The coil 4220 may be disposed on the outer circumferential surface of the bobbin 4210. The coil 4220 may be wound directly on the outer circumferential surface of the bobbin 4210. The coil 4220 may electromagnetically interact with the magnet 4320. The coil 4220 may face the magnet 4320. In this case, when a current is supplied to the coil 4220 and a magnetic field is formed around the coil 4220, the coil 4220 can be moved with respect to the magnet 4320 due to the electromagnetic interaction between the first coil 4220 and the magnet 4320. The coil 4220 can be moved for AF driving. In this case, the coil 4220 may be referred to as an 'AF coil.'

The coil 4220 may comprise a pair of lead wires (not shown) for power supply. The pair of lead wires of the coil 4220 may be electrically connected to the lower elastic member 1520. Each of the pair of lead wires of the coil 4220 can be electrically connected to the lower elastic member 1520, which is provided as a separated pair. In this case, power may be supplied to the coil 4220 through the lower elastic member 1520 electrically connected to the printed circuit board 300 through the terminal portion 4524.

The stator 4300 can accommodate the mover 4200 inside. The stator 4300 which is a fixed member can move the mover 4200 through electromagnetic interaction.

The stator 4300 may comprise a housing 4310 and a magnet 4320. However, any one or more among the housing 4310 and the magnet 4320 in the stator 4300 may be omitted or changed.

The housing 4310 may be located outside the bobbin 4210. The housing 4310 may be spaced apart from the bobbin 4210. At least a portion of the housing 4310 may be formed in a shape corresponding to the inner side surface of the cover 4100. In particular, the outer surface of the housing 4310 may be formed in a shape corresponding to the inner side surface of the side plate 1102 of the cover 4100. The housing 4310 may be in the form of a hexahedron comprising four side surfaces as an example. However, the shape of the housing 4310 may be any shape that can be disposed inside the cover 4100. The housing 4310 may be formed of an insulating material. The housing 4310 can be formed as an injection molded article in consideration of productivity. The housing 4310 can be fixed on the base 1400. As a modified embodiment, the housing 4310 may be omitted and the magnet 4320 may be fixed to the cover 4100. An upper elastic member 4510 may be coupled to the upper portion of the housing 4310. The lower elastic member 1520 may be coupled to a lower portion of the housing 4310.

The housing 4310 may comprise first to fourth sides 4301, 4302, 4303, and 4304. The housing 4310 may comprise a first side 4301 disposed on the first side surface of the first camera module, a second side 4302 disposed on the opposite side of the first side 4301, and a third side 4303 and a fourth side 4304 which are disposed opposite to each other between the first side 4301, and the second side 4302. The two magnets 4320 may be disposed on the third side 4303 and the fourth side 4304, respectively. The first magnet 4321 may be disposed on the third side 4303. The second magnet 4322 may be disposed on the fourth side 4304. The two magnets 4320 may be disposed biased toward the second side 4302 side than the first side 4301.

As illustrated in FIG. 6, the two magnets 4320 can be disposed biased away from the second lens driving device 5000. In addition, as illustrated in FIG. 8, the magnet coupling portion 4312 of the housing 4310 may be formed biased toward the center line A of the housing 4310. The magnet coupling portion 4312 of the housing 4310 may be formed more biased toward the second side 4302 than the first side 4301. Due to such a structure, the magnet 4320 coupled to the magnet coupling portion 4312 may also be disposed more biased toward the second side 4302 than the first side 4301. In the present embodiment, the influence of the magnetic force on the second lens driving device 5000 can be minimized by adjusting the position of the magnet 4320 of the first lens driving device 4000.

The housing 4310 may comprise a through hole 4311, a magnet accommodating portion 4312, an upper coupling portion 4313, a lower coupling portion (not shown), a first support portion 4315, and a second support portion 4316. Any one or more among the through hole 4311, the magnet accommodating portion 4312, the upper coupling portion 4313, the lower coupling portion (not shown), the first support portion 4315, and the second support portion 4316 in the housing 4310 may be omitted or changed. In particular, in the housing 4310, the first support portion 4315 and the second support portion 4316 may be omitted.

The through hole 4311 may be formed on the inner side of the housing 4310. The through hole 4311 may be formed in the housing 4310 in a vertically open type. A bobbin 4210 can be accommodated in the through hole 4311. A bobbin 4210 can be movably disposed in the through hole 4311. The through hole 4311 may have a shape corresponding to the bobbin 4210.

The magnet coupling portion 4312 may be formed on the side surface of the housing 4310. The magnet coupling portion 4312 may be formed as a hole penetrating the housing 4310. Alternatively, the magnet coupling portion 4312 may be formed as a groove formed by recessing a portion of the housing 4310. The magnet coupling portion 4312 can accommodate at least a portion of the magnet 4320. An adhesive (not shown) may be disposed between the magnet coupling portion 4312 and the magnet 4320. That is, the magnet coupling portion 4312 and the magnet 4320 can be coupled by the adhesive. The magnet coupling portion 4312 may be located on the inner surface of the housing 4310. The magnet coupling portion 4312 may be formed such that a portion of the inner surface of the housing 4310 is recessed outward. In this case, there is an advantage in favor of the electromagnetic interaction with the coil 4220 located inside the magnet 4320.

The magnet coupling portion 4312 may comprise a first magnet coupling portion 4312*a* and a second magnet coupling portion 4312*b*. A first magnet 4321 may be coupled to the first magnet coupling portion 4312*a*. The first magnet coupling portion 4312*a* may be formed on the third side 4303 of the housing 4310. A second magnet 4322 may be coupled to the second magnet coupling portion 4312*b*. The second magnet coupling portion 4312*b* may be formed on the fourth side 4304 of the housing 4310. The upper coupling portion 4313 can be coupled with the upper elastic member 4510.

The upper coupling portion 4313 can be coupled with an outer side 4511 of the upper elastic member 4510. The upper coupling portion 4313 may be formed to protrude upward from the upper surface of the housing 4310. For example, the protrusion of the upper coupling portion 4313 may be inserted into and coupled to the grooves or holes of the outer side 4511 of the upper elastic member 4510. At this time, the protrusion of the upper coupling portion 4313 is thermally welded while being inserted into the hole of the outer side 4511, so that the upper elastic member 4510 can be fixed between the thermally welded protrusion and the upper surface of the housing 4310.

The lower coupling portion can be coupled with a lower elastic member 1520. The lower coupling portion can be coupled with an outer side 4521 of the lower elastic member 1520. The lower coupling portion may be protruded downward from the lower surface of the housing 4310. For example, the protrusion of the lower coupling portion may be inserted into and coupled to the groove or the hole of the outer side 4521 of the lower elastic member 1520. At this time, the protrusion of the lower coupling portion may be thermally welded while being inserted into the hole of the outer side 4521, so that the lower side elastic member 1520 can be fixed between the thermally welded protrusion and the lower surface of the housing 4310.

The guide portion 4315 may be formed in a shape corresponding to a first groove portion 4330. The first support portion 4315 may protrude from the housing 310. The first support portion 4315 may be extended in the vertical direction. The first support portion 4315 may support the recessed surface of the first groove portion 4330. The first support portion 4315 may be in surface contact with the recessed surface of the first groove portion 4330. The first support portion 4315 can support the magnet 4320 from the inside. The first support portion 4315 may support the magnet 4320 so as to prevent the magnet 4320 from falling off the housing 4310.

The second support portion 4316 may be formed in a shape corresponding to a second groove portion 4330. The second support portion 4316 may be protruded from the housing 310. The second support portion 4316 may be extended in the vertical direction. The second support portion 4316 may support the recessed surface of the second groove portion 4330. The second support portion 4316 may be in surface contact with the recessed surface of the second groove portion 4330. The second support portion 4316 can support the magnet 4320 from the inside. The second support portion 4316 may support the magnet 4320 so as to prevent the magnet 4320 from falling off the housing 4310.

The magnet 4320 may be disposed in the housing 4310. The magnet 4320 can be accommodated in the magnet coupling portion 4312 of the housing 4310. The magnet 4320 can be electromagnetically interacted with coil 4220. The magnet 4320 may face the coil 4220. The magnet 4320 can move the bobbin 4210 to which the coil 4220 is fixed. The magnet 4320 can move the coil 4220 for AF driving. In this case, the magnet 4320 may be referred to as an 'AF driving magnet'.

The magnet 4320 may comprise a first magnet 4321 and a second magnet 4322. The magnets 4320 may comprise a first magnet 4321 and a second magnet 4322 which are spaced apart from each other. The magnet 4320 may comprise a first magnet 4321 and a second magnet 4322 located opposite from each other. The magnet 4320 may comprise a first magnet 4321 and a second magnet 4322 disposed opposite from each other on a side surface of the housing 4310. The magnet 4320 may comprise a first magnet 4321 disposed on the third side surface 1303 and a second magnet 4322 disposed on the fourth side surface 1304.

In the present embodiment, the magnet 4320 may be arranged to face the coil 4220 on the side of the housing 310 in a direction perpendicular to the first side surface of the first camera module. At this time, the magnet 4320 may comprise a first magnet 4321 and a second magnet 4322 facing each other. Each of the first magnet 4321 and the second magnet 4322 comprises an upper surface 4323, a lower surface 4324, an inner surface 4324 facing the coil 4220, an outer surface 4325 disposed opposite side of the inner surface 4324, and first and second side surfaces 4326 and 4327 for connecting the inner surface 4324 and the outer surface 4325.

The magnet 4320 may comprise grooves 4330 and 4340 formed in a way that the first and second corner portions of the magnet 4320 where the both side surfaces 4326 and 4327 of the magnet 4320 and the inner surface 4324 of the magnet 4320 meet are recessed more than the third and fourth corners of the magnet 4320 where both side surfaces 4326 and 4327 of the magnet 4320 meet the outer surface 4325 of the magnet 4320. In this way, the area of the inner surface 4324 of the magnet 4320 may be smaller than the outer surface 4325 of the magnet 4320 because a portion of the inner surface 4324 of the magnet 4320 is omitted.

The both side surfaces 4326 and 4327 of the magnet 4320 may comprise a first side surface 4326 which is more adjacent to the first side surface of the first camera module and a second side surface 4327 which is disposed oppositely to the first side surface 4326.

The grooves 4330 and 4340 may comprise a first groove portion 4330 disposed at a first corner portion where the first side surface 4326 and the inner surface 4324 meet, and a second groove portion 4340 disposed at the second corner portion where the second side surface 4327 and the inner surface 4324 meet. A first length (refer to 111 in FIG. 7), which is the length in the horizontal direction in which the first side surface 4326 is omitted in the first groove portion 4330, may correspond to a second length (refer to H2 in FIG. 7), which is the length in the horizontal direction in which the second side surface 4327 is omitted in the second groove portion 4340. The first length, which is the length in the horizontal direction in which the first side surface 4326 is omitted in the first groove portion 4330, may be equal to the second length, which is the length in the horizontal direction in which the second side surface 4327 is omitted in the second groove portion 4340. The first length, which is the length in the horizontal direction in which the first side surface 4326 is omitted in the first groove portion 4330, may be different from the second length, which is the length in the horizontal direction in which the second side surface 4327 is omitted in the second groove portion 4340. A third length (refer to W1 in FIG. 7), which is the length in the horizontal direction in which the inner surface 4324 is omitted in the first groove portion 4330, may be shorter than a fourth length (refer to W2 in FIG. 7), which is the length in the horizontal direction in which the inner surface 4324 is omitted in the second groove portion 4340. However, as a modified embodiment, the third length, which is the length in the horizontal direction in which the inner surface 4324 is omitted in the first groove portion 4330, may be equal to the fourth length, which is the length in the horizontal direction in which the inner surface 4324 is omitted in the second groove portion 4340. Or, as another modified embodiment, the third length, which is the length in the horizontal direction in which the inner surface 4324 is omitted in the first groove portion 4330, may be longer than the fourth length, which is the length in the horizontal direction in which the inner surface 4324 is omitted in the second groove portion 4340.

A first groove portion 4330, which is formed when a portion of one side surface 4326 of the magnet 4320 is recessed, may be formed on one side surface 4326 of the magnet 4320 disposed on the first side surface of the first camera module among the both side surfaces 4326 and 4327 of the magnet 4320. That is, the first groove portion 4330 may be provided at a portion where the first side surface 4326 and the inner surface 4324 of the magnet 4320 meet. A second groove portion 4340, which is formed when a portion of one side surface 4327 of the magnet 4320 is recessed, may be provided on one side surface 4327 of the magnet 4320 disposed opposite to the first side surface of the first camera module among the both side surfaces 4326 and 4327 of the magnet 4320. That is, the second groove portion 4340 may be provided at a portion where the second side surface 4327 and the inner surface 4324 of the magnet 4320 meet.

The magnet 4320 may comprise four corner portions at a portion where the inner surface 4324 meets the both side surfaces 4326 and 4327 and a portion where the outer surface 4325 meets the both side surfaces 4326 and 4327. The groove portions 4330 and 4340 may be formed in only two corner portions of the four corner portions of the magnet 4320. That is, the shape of two of the four corner portions of the magnet 4320 may be different from the shape of the remaining two corner portions. At this time, the remaining two corner portions of the magnet 4320 may have a basic curvature generated during the machining process of the edges. The curvature of the groove portions 4330 and 4340 may be different from the basic curvature generated during the machining process of the edges. The shapes of the first corner portion and the second corner portion of the magnet 4320 may be different from those of the third corner portion and the fourth corner portion of the magnet 4320. In one example, the basic curvature is formed convexly, but the groove portions 4330 and 4340 may be formed concavely.

The dual camera module according to the present embodiment may comprise a first groove portion 4330 formed in the magnet 4320. In the present embodiment, the influence of the magnetic force applied to the second camera module by the magnet 4320 of the first camera module through the first groove portion 4330 can be minimized. The first groove portion 4330 according to the present embodiment can be distinguished from the natural curvature generated at the edge during the manufacturing process of the magnet 4320 in terms of shape, size, and function.

In the present embodiment, the shape of the side of the magnet 4320 of the first lens driving device 4000 which is more adjacent to the second lens driving device 5000 may be machined by 'R-cut', 'C-cut', 'Inverse L-cut' or 'L-cut' process. Alternatively, in the present embodiment, the shape of the magnet 4320 of the first lens driving device 4000 near the second lens driving device 5000 can be cut roundly.

In the present embodiment, the influence of the magnetic force on the second lens driving device 5000 can be minimized by adjusting the position of the magnet 4320 of the first lens driving device 4000. More specifically, the magnet coupling portion 4312 of the housing 4310 of the first lens driving device 4000 may be biased toward one side from the center line. That is, the magnet 4320 may be biased toward one side with respect to the center of the coil 4220 (refer to C in FIG. 7). More specifically, the two magnets 4320 can be disposed 0.10 to 0.22 mm biased toward the second side 4302 than the first side 4301. The two magnets 4320 may be disposed to be 0.14 to 0.18 mm biased toward the second side 4302 than the first side 4301. The two magnets 4320 may be disposed 0.16 mm biased toward the second side 4302 than the first side 4301. The dual camera module according to the present embodiment may comprise a second groove portion 4340 formed in the magnet 4320. In the present embodiment, when only the first groove portion 4330 is provided in the magnet 4320 without the second groove 4340, magnetic force unbalance of the magnet 4320 may occur due to the bias of the magnet 4320 relative to the center of the coil 4220. This may cause a problem because it causes a tilt of the first lens driving device 4000. More specifically, in the present embodiment, when only the first groove portion 4330 is provided in the magnet 4320 without the second groove 4340, the split magnet (refer to 4320a in FIG. 16) on the side where the first groove portion 4330 is formed around the center of the coil 4220 (refer to FIG. 7C) has a magnetic force of 0.00090476 (N), and the split magnet on the opposite side has a magnetic force of 0.0010575 (N), so that 14.5% of the left-right deviation electromagnetic force may be generated.

The present embodiment may comprise a structure in which the shape of the chamfer is added where the magnetic force of the magnet 4320 is strongly generated with respect to the center of the coil 4220 so that the left and right electromagnetic force deviations are set to zero. The chamfer shape may be referred to as a second groove portion 4340. That is, in the present embodiment, the deviation of the magnetic force of the magnet 4320 can be eliminated or minimized through the second groove portion 4340. More specifically, according to the application of the second groove portion 4340, the split magnet (refer to 4320b in FIG. 16) on the side where the second groove portion 4340 is formed with respect to the center of the coil 4220 has a magnetic force of 0.0009066 (N) so that the left-right deviation electromagnetic force can be close to zero. For reference, A shown in FIGS. 7 and 16 is a schematic diagram of the second lens driving device 5000, and B shown in FIGS. 7 and 16 is a schematic diagram of a direction (pin direction, terminal direction) in which the terminal portion 4524 of the lower elastic member 1520 is disposed. That is, the second magnet 4322 may be disposed at the side of the terminal portion 4524 of the lower elastic member 1520. In the present embodiment, the second groove portion 4340 can also be machined by 'R-cut', 'C-cut', 'inverse L-cut' or 'L-cut' process. Or the second groove portion 4340 may be roundly cut.

In the present embodiment, since the deviation of the left to right electromagnetic force of the magnet 4320 is minimized through the second groove portion 4340, the occurrence of tilt can be minimized. The embodiment illustrated in FIG. 17 is a comparative example in which the second groove portion 4340 is not provided, and the embodiment illustrated in FIG. 18 is the present embodiment comprising the second groove portion 4340. When comparing FIGS. 17 and 18, it is confirmed that the tilt is reduced through the second groove portion 4340.

In the present embodiment, the length W1 from the first side surface 4326 to the first groove portion 4330 may be smaller than the length W2 from the second side face 4327 to the second groove portion 4340. At this time, the length W1 from the first side surface 4326 to the first groove portion 4330 may be the length of the magnet 4320 in the horizontal direction. The length W2 from the second side surface 4327 to the second groove portion 4340 may be the length of the magnet 4320 in the horizontal direction. The center of the outer surface 4325 of each of the two magnets 4321 and 4322 may be disposed biased from the center of the first camera module in the horizontal direction of the magnet 4320 to the opposite side of the second camera module. The length H1 from the inner surface 4324 to the first groove portion 4330 may be equal to the length 112 from the inner surface 4324 to the second groove portion 4340. The length from the inner surface 4324 to the first groove portion 4330 may be smaller than the length from the inner surface 4324 to the second groove portion 4340. The length from the inner surface 4324 to the first groove portion 4330 may be greater than the length from the inner surface 4324 to the second groove portion 4340. The length H1 from the inner surface 4324 to the first groove portion 4330 may be the length in the vertical direction of the magnet 4320.

The length 112 from the inner surface 4324 to the second groove portion 4340 may be the length in the vertical direction of the magnet 4320.

The groove portions 4330 and 4340 may be formed in the magnet 4320. The groove portions 4330 and 4340 may have a shape in which a portion of the magnet 4320 is omitted. The groove portions 4330 and 4340 may be formed by chamfering. In this case, the groove portions 4330 and 4340 may be referred to as a 'chamfer portion'. The groove portions 4330 and 4340 may have a shape in which a portion of the inner surface 4324 of the magnet 4320 is recessed. The groove portions 4330 and 4340 may have a shape in which a portion of both side surfaces 4326 and 4327 of the magnet 4320 is recessed. The first groove portion 4330 may be formed at a portion where the first side surface 4326 and the inner surface 4324 of the magnet 4320 meet. The second groove portion 4340 may be formed at a portion where the second side surface 4327 and the inner surface 4324 of the magnet 4320 meet. As a modified embodiment, the groove portions 4330 and 4340 may have a shape in which a portion of the outer surface 4325 of the magnet 4320 is recessed.

The first groove portion 4330 may be extended from the upper end of the magnet 4320 to the lower end thereof. The first groove portion 4330 may be extended from the upper surface 4323 of the magnet 4320 to a lower surface. As a modified embodiment, the first groove portion 4330 may be formed with a plurality of grooves spaced apart from each other. As another modified embodiment, the first groove portion 4330 may be formed with a plurality of through holes spaced apart from each other. That is, the first groove portion 4330 may be formed in any shape that minimizes the magnetic force exerted on the second camera module.

The first groove portion 4330 may comprise a concavely formed curved surface. As a modified embodiment, the first groove portion 4330 may comprise a convexly formed round surface. The first groove portion 4330 may be formed as a curved surface. As another modified embodiment, the first groove portion 4330 may comprise an inclined surface that forms an obtuse angle or a right angle with the first side surface 4326 of the magnet 4320. As a modified embodiment, the first groove portion 4330 may comprise an inclined surface that forms an acute angle with the first side surface 4326 of the magnet 4320. The first groove portion 4330 may connect the first side surface 4326 and the inner surface 4324 in an inclined manner. The first groove portion 4330 may form an obtuse angle with the first side surface 4326 and the inner surface 4324, respectively. The first groove portion 4330 may form a right angle with any one or more among the first side surface 4326 and the inner surface 4324. At this time, the first groove portion 4330 may comprise two or more planes, and the two or more planes may have mutual inclination.

The first groove portion 4330 may be formed when an area of 10 to 80% of the area of the first side surface 4326 of the magnet 4320 is recessed. That is, 10 to 80% of the area of the first side surface 4326 of the magnet 4320 may be recessed by the first groove portion 4330. In other words, 10 to 80% of the area of the first side surface 4326 of the magnet 4320 may be omitted by the first groove portion 4330. The width of the first groove portion 4330 in the horizontal direction may be 10 to 80% of the width in the horizontal direction of the first side surface 4326 of the magnet 4320. In one example, the width in the horizontal direction of the first groove portion 4330 may be 43% of the width in the horizontal direction of the first side surface 4326 of the magnet 4320. On the other hand, when the inner surface 4324 is viewed, the width of the first groove portion 4330 may be 100 μm or more.

The first groove portion 4330 may be extended from the upper end of the magnet 4320 to the lower end. The first groove portion 4330 may be extended in a predetermined shape from the upper surface 4323 to the lower surface of the magnet 4320. As a modified embodiment, the first groove portion 4330 may be formed with a plurality of grooves spaced apart. As another modified embodiment, the first groove portion 4330 may be formed of a plurality of through holes spaced apart from each other. That is, the first groove portion 4330 may be formed in any shape that minimizes the left to right deviation of the magnetic force of the magnet 4320.

The second groove portion 4340 may comprise a concavely curved surface. As a modified embodiment, the second groove portion 4340 may comprise a rounded surface that is convexly formed. The second groove portion 4340 may be formed as a curved surface. Or, the second groove portion 4340 may comprise an inclined surface that forms an obtuse angle or a right angle with the second side surface 4327 of the magnet 4320. As a modified embodiment, the second groove portion 4340 may comprise an inclined surface that forms an acute angle with the second side surface 4327 of the magnet 4320. The second groove portion 4340 can connect the second side surface 4327 and the inner surface 4324 in an inclined manner. The second groove portion 4340 can form an obtuse angle with the second side surface 4327 and the inner surface 4324, respectively. The second groove portion 4340 may form a right angle with at least one of the second side surface 4327 and the inner surface 4324. At this time, the second groove portion 4340 may comprise two or more planes, and two or more planes may have mutual inclination.

The second groove portion 4340 may be formed when an area of 10 to 80% of the area of the second side surface 4327 of the magnet 4320 is recessed. That is, 10 to 80% of the area of the second side surface 4327 of the magnet 4320 may be recessed by the second groove portion 4340. In other words, 10 to 80% of the area of the second side surface 4327 of the magnet 4320 may be omitted by the second groove portion 4340. The width of the second groove portion 4340 in the horizontal direction may be 10 to 80% of the width in the horizontal direction of the second side surface 4327 of the magnet 4320. In one example, the width in the horizontal direction of the second groove portion 4340 may be 43% of the width in the horizontal direction of the second side surface 4327 of the magnet 4320. On the other hand, when the inner surface 4324 is viewed, the width of the second groove portion 4340 may be 100 μm or more.

The groove portions 4330 and 4340 formed in each of the first and second magnets 4321 and 4322 may be symmetrical with respect to an imaginary plane comprising the optical axis and parallel to the inner surface 4324 of the magnet 4320. Through such a structure, the AF driving generated by the interaction between the magnet 4320 and the coil 4220 in the first lens driving device 4000 can be normally performed.

In the present embodiment, the housing 310 may comprise a first side 1031 disposed on a first side surface of the first camera module, a second side 4302 disposed on the opposite side of the first side 4301, a first side 4301, and a third side 4303 and a fourth side 4304 which are disposed opposite to each other between the first side 4301 and the second side 4302. At this time, the first and second magnets 4321 and 4322 may be disposed on the third side 4303 and the fourth side 4304, respectively. That is, the first magnet 4321 may be disposed on the third side 4303 and the second magnet 4322 may be disposed on the fourth side 4304. In the present embodiment, the first and second magnets 4321 and 4322 may be disposed biased toward the second side 4302 rather than the first side 4301. That is, the center of each of the first and second magnets 4321 and 4322 may be closer to the second side 4302 than the first side 4301. With this structure, the effect of the magnetic force of the magnet 4320 of the first camera module on the second camera module can be minimized.

Each of the first and second magnets 4321 and 4322 may have an asymmetric shape with respect to the center thereof, respectively. Each of the first and second magnets 4321 and 4322 may each have an asymmetric shape with respect to a virtual plane that comprises the center and is perpendicular to the inner surface 4324 thereof, respectively. That is, the first groove portion 4330 disposed on the first side surface 4326 of the first and second magnets 4321 and 4322 and the second groove portion 4340 disposed on the second side surface 4327 may have different shapes and/or size.

The base 1400 may be disposed on the lower side of the housing 4310. The base 1400 may be disposed on the upper surface of the printed circuit board 300. An infrared filter may be coupled to the base 1400.

The base 1400 may comprise a through hole 1410, a terminal accommodating portion 1420, and a stepped portion 4430. However, any one or more among the through hole 1410, the terminal accommodating portion 1420, and the stepped portion 4430 in the base 1400 may be omitted or changed.

The through hole 1410 may be formed in the center of the base 1400. The through hole 1410 may be formed to penetrate through the base 1400 vertically. The through hole 1410 may be overlapped with the lens module 400 in the optical axis direction. The through hole 1410 can allow light passing through the lens module 400 to pass therethrough.

The terminal accommodating portion 1420 may be formed on the side surface of the base 1400. The terminal accommodating portion 1420 may be formed such that a portion of the outer side surface of the base 1400 is recessed inward. The terminal accommodating portion 1420 can accommodate at least a portion of the terminal portion 4524 of the lower elastic member 1520. The terminal accommodating portion 1420 may be formed in a shape corresponding to the terminal portion 4524.

The stepped portion 4430 may be formed at the lower surface of the outer surface of the base 1400. The stepped portion 4430 may be protruded outward from the outer surface of the base 1400. The stepped portion 4430 can support the lower end of the side plate 1102 of the cover 4100.

The AF elastic member 1500 may be coupled to the bobbin 4210 and the housing 4310. The AF elastic member 1500 can elastically support the bobbin 4210. The AF elastic member 1500 can movably support the bobbin 4210 with respect to the housing 4310. At least a portion of the AF elastic member 1500 may have elasticity.

The AF elastic member 1500 may comprise an upper elastic member 4510 and a lower elastic member 1520. However, any one or more among the upper elastic member 4510 and the lower elastic member 1520 in the AF elastic member 1500 may be omitted or changed.

The upper elastic member 4510 may be coupled to the upper portion of the bobbin 4210 and the upper portion of the housing 4310. The upper elastic member 4510 is disposed on the upper side of the bobbin 4210 and can be coupled to the bobbin 4210 and the housing 4310. The upper elastic member 4510 may be integrally formed.

The upper elastic member 4510 may comprise an outer side 4511, an inner side 1512, and a connecting portion 1513. However, in the upper elastic member 4510, any one or more among the outer side 4511, the inner side 1512, and the connecting portion 1513 may be omitted or changed.

The outer side 4511 can be coupled to the housing 4310. The outer side 4511 can be coupled to the upper surface of the housing 4310. The inner side 1512 can be coupled to the bobbin 4210. The inner side 1512 can be coupled to the upper surface of the bobbin 4210. The connecting portion 1513 can connect the outer side 4511 and the inner side 1512. The connecting portion 1513 can elastically connect the outer side 4511 and the inner side 1512. The connecting portion 1513 may have elasticity.

The lower elastic member 1520 can be coupled to the lower portion of the bobbin 4210 and the lower portion of the housing 4310. The lower elastic member 1520 may be disposed below the bobbin 4210 and may be coupled to the bobbin 4210 and the housing 4310. The lower elastic member 1520 may be electrically connected to the coil 4220. The lower elastic members 1520 may be provided as a pair spaced apart from each other. A pair of lower elastic members 1520 may be coupled to a pair of lead wires of the coil 4220.

The lower elastic member 1520 may comprise an outer side 4521, an inner side 1522, a connecting portion 1523, and a terminal portion 4524. However, one or more among the outer side 4521, the inner side 1522, the connecting portion 1523, and the terminal portion 4524 in the lower elastic member 1520 may be omitted or changed.

The outer side 4521 can be coupled to the housing 4310. The outer side 4521 can be coupled to the lower surface of the housing 4310. The outer side 4521 can be coupled to the base 1400. The outer side 4521 can be fixed between the housing 4310 and the base 1400. The inner side 1522 can be coupled to the bobbin 4210. The inner portion 1522 can be coupled to the lower surface of the bobbin 4210. The connecting portion 1523 can connect the outer side 4521 and the inner side 1522. The connecting portion 1523 can elastically connect the outer side 4521 and the inner side 1522. The connecting portion 1523 may have elasticity. The terminal portion 4524 may be extended from the outer side 4521. The terminal portion 4524 may be formed by bending from the outer side 4521. The terminal portion 4524 can be bent downward from the outer side 4521 and extended. Alternatively, the terminal portion 4524 may be provided as a separate member from the outer side 4521 as a modified embodiment. The terminal portion 4524 and the outer side 4521, which are separately provided, can be coupled by a conductive member. The terminal portion 4524 can be coupled to the printed circuit board 300. The terminal portion 4524 can be coupled to the printed circuit board 300 by soldering. The terminal portion 4524 can be accommodated in the terminal accommodating portion 1420 of the base 1400. The terminal portion 4524 may be disposed on a side surface opposite to the side surface of the first lens driving device 4000 illustrated in FIG. 1. Hereinafter, the configuration of the second lens driving device according to the second embodiment of the present invention will be described with reference to the drawings.

FIG. 23 is an exploded perspective view of the second lens driving device according to the second embodiment of the present invention, FIG. 24 is an exploded perspective view showing the AF mover of the second lens driving device according to the second embodiment of the present invention, FIG. 25 is an exploded perspective view showing the OIS mover of the second lens driving device according to the second embodiment of the present invention, FIG. 26 is an exploded perspective view showing the substrate and the circuit member of the second lens driving device according to the second embodiment of the present invention, and FIG. 27 is an exploded perspective view showing an elastic member of the second lens driving device according to the second embodiment of the present invention.

The second lens driving device 5000 comprises a cover member 5100, an AF mover 5200, an OIS mover 5300, a stator 5400, an elastic member 5500, a support member 5600, and a Hall sensor 5700. In the second camera module 5000, any one or more among the cover member 5100, the AF mover 5200, the OIS mover 5300, the stator 5400, the elastic member 5500, the support member 5600, and the Hall sensor 5700 may be omitted or changed.

The cover 5100 can accommodate the housing 5310. The cover 5100 of the second lens driving device 5000 may be spaced apart from the cover 4100 of the first lens driving device 4000. At this time, the separation distance (refer to D in FIG. 6) between the cover 5100 and the cover member 4100 may be within 4 mm. Alternatively, the distance D between the cover 5100 and the cover 4100 may be within 3 mm. Alternatively, the distance D between the cover 5100 and the cover 4100 may be within 2 mm. The distance D between the cover 5100 and the cover 4100 may be 1 mm.

The cover 5100 can form an appearance of the second lens driving device 5000. The cover 5100 may be in the form of a hexahedron with an open bottom. However, the present invention is not limited thereto. The cover 5100 may be a non-magnetic material. If the cover 5100 is made of a magnetic material, the magnetic force of the cover 5100 may affect the magnet 5320. The cover 5100 may be formed of a metal material. More specifically, the cover 5100 may be formed of a metal plate. In this case, the cover 5100 may block electromagnetic interference (EMI). Because of this feature of the cover 5100, the cover 5100 can be referred to as an 'EMI shield can'. The cover 5100 may be connected to the ground portion of the printed circuit board 300. Through this, the cover 5100 can be grounded. The cover 5100 can block the radio waves generated from the outside of the second lens driving device from entering into the inside of the cover 5100. Also, the cover 5100 can block the radio waves generated inside the cover 5100 from being emitted to the outside of the cover 5100. However, the material of the cover 5100 is not limited thereto.

The cover 5100 may comprise an upper plate 5101 and a side plate 5102. The cover 5100 may comprise an upper plate 5101 and a side plate 5102 extending downward from the outside of the upper plate 5101. The lower end of the side plate 5102 of the cover 5100 can be mounted on the base 5430. The cover 5100 may be mounted on the base 5430 in a way that the inner side surface of the cover 5100 comes into close contact with a part or all of the side surface of the base 5430. The AF mover 5200, the OIS mover 5300, the stator 5400, the elastic member 5500, and the support member 5600 are located in an inner space formed by the cover 5100 and the base 5430. With such a structure, the cover 5100 can protect the internal components from external impact while preventing the penetration of external contaminants. However, it is not limited thereto, also the lower end of the side plate 5102 of the cover 5100 may be directly coupled to the printed circuit board 300 located below the base 5430.

A portion of the plurality of side plates 5102 of the cover 5100 of the second lens driving device 5000 may face the cover 4100 of the first lens driving device 4000. The length of the side plate 5102 of the cover 5100 in the lengthwise direction may not exceed 1.5 times the length of the side plate 1102 of the cover 4100 in the lengthwise direction.

The cover 5100 may comprise an opening 5110. The opening 5110 may be formed in the upper plate 5101. The opening 5110 can expose the lens module. The opening 5110 may be provided in a shape corresponding to the lens module. The size of the opening 5110 may be larger than the diameter of the lens module so that the lens module can be assembled through the opening 5110. Meanwhile, the light introduced through the opening 5110 can pass through the lens module. At this time, the light passing through the lens module can be acquired as an image on the image sensor.

The AF mover 5200 can be combined with the lens module. The AF mover 5200 can accommodate the lens module inside. The outer circumferential surface of the lens module can be coupled to the inner circumferential surface of the AF mover 5200. The AF mover 5200 can move integrally with the lens module through interaction with the OIS mover 5300 and/or the stator 5400.

The AF mover 5200 may comprise a bobbin 5210 and a second coil 5220. However, any one or more among the bobbin 5210 and the second coil 5220 in the AF mover 5200 may be omitted or changed.

The bobbin 5210 may be located inside the housing 5310. The bobbin 5210 can be accommodated in the through hole 5311 of the housing 5310. The bobbin 5210 can be coupled with the lens module. More specifically, the outer circumferential surface of the lens module can be coupled to the inner circumferential surface of the bobbin 5210. The first coil 5220 may be coupled to the bobbin 5210. The lower portion of the bobbin 5210 can be coupled with the lower elastic member 5520. The upper portion of the bobbin 5210 can be coupled with the upper elastic member 5510. The bobbin 5210 can move in the direction of the optical axis with respect to the housing 5310.

The bobbin 5210 may comprise a through hole 5211 and a coil coupling portion 5212. However, any one or more among the through hole 5211 and the coil coupling portion 2212 in the bobbin 5210 may be omitted or changed.

The through hole 5211 may be formed on the inner side of the bobbin 5210. The through hole 5211 may be formed in a vertically open type. The lens module may be coupled to the through hole 5211. The inner circumferential surface of the through hole 5211 may be formed with a thread having a shape corresponding to the thread formed on the outer circumferential surface of the lens module. That is, the through hole 5211 can be screw-coupled to the lens module. An adhesive may be interposed between the lens module and the bobbin 5210. At this time, the adhesive may be an epoxy cured by ultraviolet (UV) light, heat or laser. That is, the lens module and bobbin 5210 may be bonded by ultraviolet curable epoxy and/or thermosetting epoxy.

The coil coupling portion 2212 can accommodate at least a portion of the first coil 5220. The coil coupling portion 2212 may be integrally formed with the outer side surface of the bobbin 5210. The coil coupling portions 2212 may be continuously formed along the outer side surface of the bobbin 5210 or spaced apart from each other at predetermined intervals. As an example, the coil coupling portion 2212 may be formed recessed in a way that a portion of the outer side surface of the bobbin 5210 corresponds to the shape of the first coil 5220. At this time, the first coil 5220 can be directly wound on the coil coupling portion 2212. As a modified embodiment, the coil coupling portion 2212 may be formed as an upper side or a lower side opening type. At this time, the first coil 5220 in a pre-wound state may be inserted into and coupled to the coil coupling portion 2212 through a portion that is open.

The first coil 5220 may be disposed on the bobbin 5210. The first coil 5220 may be disposed on the outer circumferential surface of the bobbin 5210. The first coil 5220 may be directly wound around the outer circumferential surface of the bobbin 5210. The first coil 5220 can be electromagnetically interacted with the magnet 5320. The first coil 5220 may face the magnet 5320. In this case, when a current is supplied to the first coil 5220 and a magnetic field is formed around the first coil 5220, the first coil 5220 can be moved with respect to the magnet 5320 due to the electromagnetic interaction between the first coil 5220 and the magnet 5320. The first coil 5220 may be moved for AF driving. In this case, the first coil 5220 may be referred to as an 'AF coil'.

The first coil 5220 may comprise a pair of lead wires (not shown) for power supply. The pair of lead wires of the first coil 5220 may be electrically connected to the upper elastic member 5510. Each of the pair of lead wires of the first coil 5220 can be electrically connected to the upper elastic member 5510, which is provided as a separated pair. In this case, power is supplied to the first coil 5220 through the upper elastic member 5510 electrically connected to the printed circuit board 300 through the substrate 5410, the substrate portion 5421, and the support member 5600.

The OIS mover 5300 can be moved for anti-shake correction function. The OIS mover 5300 may be disposed outside the AF mover 5200 so as to face the AF mover 5200. The OIS mover 5300 can move the AF mover 5200 or move with the AF mover 5200. The OIS mover 5300 may be movably supported by the stator 5400 and/or the base 5430 located at the lower side of the OIS mover. The OIS mover 5300 may be located in the inner side space of the cover 5100.

The OIS mover 5300 may comprise a housing 5310 and a magnet 5320. However, any one or more among the housing 5310 and the magnet 5320 in the OIS mover 5300 may be omitted or changed.

The housing 5310 may be disposed apart from the housing 4310 of the first lens driving device 4000. The housing 5310 may be disposed outside the bobbin 5210. The housing 5310 may be disposed apart from the bobbin 5210. At least a portion of the housing 5310 may be formed in a shape corresponding to the inner side surface of the cover 5100. In particular, the outer side surface of the housing 5310 may be formed in a shape corresponding to the inner side surface of the side plate 5102 of the cover 5100. The housing 5310, as an example, may be in the form of a hexahedron comprising four side surfaces. However, the shape of the housing 5310 may be any shape that can be disposed inside the cover 5100. The housing 5310 may be formed of an insulating material. The housing 5310 may be formed as an injection molded article in consideration of productivity. The housing 5310 may be disposed at a distance spaced apart from the cover 5100 as a moving part for driving the OIS. An upper elastic member 5510 may be coupled to the upper portion of the housing 5310. A lower elastic member 5520 may be coupled to the lower portion of the housing 5310.

The housing 5310 may comprise first to fourth sides 5301, 5302, 5303, and 5304. The housing 5310 may comprise first to fourth sides 5301, 5302, 5303, and 5304 that are continuously disposed.

The housing 5310 may comprise a through hole 5311 and a magnet coupling portion 5312. However, any one or more among the through hole 5311 and the magnet coupling portion 5312 in the housing 5310 may be omitted or changed.

The through hole 5311 may be formed in the inner side of the housing 5310. The through hole 5311 may be formed may be formed in the housing 5310 in a vertically open type. A bobbin 5210 can be accommodated in the through hole 5311. The bobbin 5210 may be movably disposed in the through hole 5311. The through hole 5311 may be formed in a shape corresponding to the bobbin 5210.

The magnet coupling portion 5312 may be formed on the side surface of the housing 5310. The magnet coupling portion 5312 can accommodate at least a portion of the magnet 5320. An adhesive (not shown) may be disposed between the magnet coupling portion 5312 and the magnet 5320. That is, the magnet coupling portion 5312 and the magnet 5320 can be coupled by an adhesive. The magnet coupling portion 5312 may be located on the inner surface of the housing 5310. The magnet coupling portion 5312 may be formed such that a portion of the inner surface of the housing 5310 is recessed outwardly. In this case, there is an advantage in favor of electromagnetic interaction with the first coil 5220 located inside the magnet 2320. The magnet coupling portion 5312 may be a shape with an open bottom. In this case, there is an advantage in favor of electromagnetic interaction with the second coil 5422 located below the magnet 5320. The magnet 5320 may be located in the housing 5310. The magnet 5320 can be accommodated in the magnet coupling portion 5312 of the housing 5310. Magnet 5320 can be electromagnetically interacted with first coil 5220. The magnet 5320 may face the first coil 5220. The magnet 5320 can move the bobbin 5210 to which the first coil 5220 is fixed. The magnet 5320 can move the first coil 5220 for AF driving. In this case, the magnet 5320 may be referred to as an 'AF driving magnet'. Further, the magnet 5320 may face the second coil 5422. Magnet 5320 can be moved for OIS driving. In this case, the magnet 5320 may be referred to as an 'OIS driving magnet'. Accordingly, the magnet 5320 may be referred to as an 'AF/OIS common driving magnet'.

The magnet 5320 may comprise four corner magnets. The four corner magnets may be disposed such that the N pole faces the inside. Alternatively, the four corner magnets may be disposed such that the S-pole faces the inside. The four corner magnets may have a columnar shape whose inner side surface is larger than the outer side surface.

The magnet 5320 may be disposed such that the inner surface and the outer surface thereof are parallel to each other, as illustrated in FIG. 6. The inner surface of the magnet 5320 may be disposed on the opposite side of the outer surface of the magnet 5320 in parallel with the outer surface of the magnet 5320. The magnet 5320 may comprise a side surface connecting the inner surface and the outer surface laterally. At this time, portions of both side surfaces of the magnet 5320 may comprise parallel planes that are parallel to each other. However, as another embodiment, both side surfaces of the magnet 5320 may not comprise a parallel plane as illustrated in FIG. 15.

The stator 5400 may be positioned below the AF mover 5200. The stator 5400 may be located below the OIS mover 5300. The stator 5400 can move the OIS mover 5300. At this time, the AF mover 5200 can be moved together with the OIS mover 5300. That is, the stator 5400 can move the AF mover 5200 and the OIS mover 5300.

The stator 5400 may comprise a substrate 5410, a circuit member 5420, and a base 5430. However, any one or more among the substrate 5410, the circuit member 5420, and the base 5430 in the stator 5400 may be omitted or changed.

The substrate 5410 may be a FPCB which is a flexible printed circuit board. The substrate 5410 may be disposed on the upper surface of the base 5430. The substrate 5410 may be located between the base 5430 and the circuit member 5420. The substrate 5410 may be electrically connected to the second coil 5422. The substrate 5410 may be electrically connected to the first coil 5220. The substrate 5410 may be electrically connected to the first coil 5220 through the support member 5600 and the upper elastic member 5510.

The substrate 5410 may comprise a through hole 5411 and a terminal 5412. However, any one or more among the through hole 5411 and the terminal 5412 in the substrate 5410 may be omitted or changed.

The through hole 5411 may be formed in the center of the substrate 5410. The through holes 5411 may be formed to penetrating through the substrate 5410. The through hole 5411 may overlap with the lens module in the optical axis direction. The through hole 5411 can pass the light that has passed through the lens module.

The terminal 5412 may be formed by bending a portion of the substrate 5410. The terminal 5412 may be formed by bending a portion of the substrate 5410 downward. Terminal 5412 may be at least partially exposed to the outside. The lower end of terminal 5412 may be coupled with the printed circuit board 300. The terminal 5412 may be soldered to the printed circuit board 300. The substrate 5410 may be electrically connected to the printed circuit board 300 through the terminals 5412.

The circuit member 5420 may be disposed on the upper surface of the substrate 5410. The circuit member 5420 may be disposed on the base 5430. The circuit member 5420 may be disposed between the substrate 5410 and the housing 5310.

The circuit member 5420 may comprise a substrate portion 5421 and a second coil 5422. However, ant one or more among the substrate portion 5421 and the second coil 5422 in the circuit member 5420 may be omitted or changed.

The substrate portion 5421 may be a flexible printed circuit board (FPCB). The second coil 5422 may be formed of a fine pattern coil (FPC) on the substrate portion 5421. The substrate portion 5421 may be disposed on the upper surface of the substrate 5410. The substrate portion 5421 may be electrically connected with the substrate 5410. The substrate portion 5421 may be electrically connected to the second coil 5422.

The second coil 5422 may be formed of a fine pattern coil (FPC) on the base portion 5421. The second coil 5422 may be located on the base 5430. The second coil 5422 can be electromagnetically interacted with the magnet 5320. And the second coil 5422 can face the magnet 5320. In this case, when a current is supplied to the second coil 5422 to form a magnetic field around the second coil 5422, the magnet 5320 can move with respect to the second coil 5422 due to the electromagnetic interaction between the second coil 5422 and the magnet 5320. The second coil 5422 can move the magnet 5320 for OIS driving. In this case, the second coil 5422 may be referred to as an 'OIS coil'.

The base 5430 may be disposed on the lower side of the housing 5310. The base 5430 can movably support the housing 5310. The base 5430 may be positioned on the upper surface of the printed circuit board 300. An infrared filter may be coupled to the base 5430.

The base 5430 may comprise a through hole 5431, a terminal accommodating portion 5432, and a sensor accommodating portion 5433. However, any one or more among the through hole 5431, the terminal accommodating portion 5432, and the sensor accommodating portion 5433 in the base 5430 may be omitted or changed.

The through hole 5431 may be formed in the center of the base 5430. The through hole 5431 may be formed to penetrate through the base 5430 vertically. The through hole 5431 may overlap with the lens module in the optical axis direction. The through hole 5431 can pass the light that has passed through the lens module.

The terminal accommodating portion 5432 may be formed on the side surface of the base 5430. The terminal accommodating portion 5432 may be formed in a way that a portion of the outer side surface of the base 5430 is recessed inward. The terminal accommodating portion 5432 can accommodate at least a portion of the terminal 5412 of the substrate 5410. The terminal accommodating portion 5432 may be formed to have a width corresponding to the terminal 5412.

The sensor accommodating portion 5433 may be formed on the upper surface of the base 5430. The sensor accommodating portion 5433 may be formed in a way that a portion of the upper surface of the base 5430 is recessed downward. The sensor accommodating portion 5433 may be formed as a groove. The sensor accommodating portion 5433 can accommodate at least a portion of the Hall sensor 5700. The sensor accommodating portion 5433 may be formed in a shape corresponding to the Hall sensor 5700. The sensor accommodating portion 5433 may be formed in a number corresponding to the hole sensor 5700. The sensor accommodating portion 5433 may be formed in two.

The elastic member 5500 may be coupled to the bobbin 5210 and the housing 5310. The elastic member 5500 can elastically support the bobbin 5210. The elastic member 5500 can movably support the bobbin 5210 with respect to the housing 5310. At least a portion of the elastic member 5500 may have elasticity.

The elastic member 5500 may comprise an upper elastic member 5510 and a lower elastic member 5520. However, any one or more among the upper elastic member 5510 and the lower elastic member 5520 in the elastic member 5500 may be omitted or changed.

The upper elastic member 5510 may be coupled to the upper portion of the bobbin 5210 and the upper portion of the housing 5310. The upper elastic member 5510 may be disposed on the upper side of the bobbin 5210 and may be coupled to the bobbin 5210 and the housing 5310. The upper elastic member 5510 may be electrically connected to the first coil 5220. The upper elastic members 5510 may be provided in a pair spaced apart from each other. A pair of upper elastic members 5510 can be coupled to a pair of lead wires of the first coil 5220.

The upper elastic member 5510 may comprise an outer side 5511, an inner side 5512, a connecting portion 5513, and a coupling portion 5514. However, any one or more among the outer side 5511, the inner side 5512, the connecting portion 5513, and the coupling portion 5514 in the upper elastic member 5510 may be omitted or changed.

The outer portion 5511 can be coupled to the housing 5310. The outer side 5511 may be coupled to the upper surface of the housing 5310. The inner side 5512 can be coupled to the bobbin 5210. The inner side 5512 can be coupled to the upper surface of the bobbin 5210. The connecting portion 5513 can connect the outer side 5511 and the inner side 5512. The connecting portion 5513 can elastically connect the outer side 5511 and the inner side 5512. The connecting portion 5513 may have elasticity. The coupling portion 5514 may be extended from the outer side 5511. The coupling portion 5514 may be extended outward from the outer side 5511. The coupling portion 5514 may be located on the four corner portions of the housing 5310. The coupling portion 5514 can be coupled with the supporting member 5600.

The lower elastic member 5520 may be coupled to the lower portion of the bobbin 5210 and the lower portion of the housing 5310. The lower elastic member 5520 may be disposed below the bobbin 5210 and may be coupled to the bobbin 5210 and the housing 5310. The lower elastic member 5520 may be integrally formed.

The lower elastic member 5520 may comprise an outer side 5521, an inner side 5522, and a connecting portion 5523. However, any one or more among the outer side 5521, the inner side 5522 and the connecting portion 5523 in the lower elastic member 5520 may be omitted or changed.

The outer side 5521 may be coupled to the housing 5310. The outer side 5521 can be coupled to the lower surface of the housing 5310. The inner side 5522 can be coupled to the bobbin 5210. The inner side 5522 can be coupled to the lower surface of the bobbin 5210. The connecting portion 5523 can connect the outer side 5521 and the inner side 5522. The connecting portion 5523 can elastically connect the outer side 5521 and the inner side 5522. The connecting portion 5523 may have elasticity.

The support member 5600 can movably support the housing 5310. The support member 5600 can movably support the OIS mover 5300 with respect to the stator 5400. The lower end of the support member 5600 can be coupled with the circuit member 5420. The upper end portion of the support member 5600 can be coupled with the upper elastic member 5510. The support member 5600 may comprise a plurality of wires.

Alternatively, the support member 5600 may comprise a plurality of plate rings. The support member 5600 may have elasticity at least in part. The support member 5600 may be formed of a conductive member. The circuit member 5420 and the second upper elastic member 5510 may be electrically conducted by the support member 5600. The support member 5600 may be provided in four so as to be disposed at each of the four corners of the housing 5310.

A damper (not shown) may be disposed in the support member 5600 and the housing 5310. the damper may be disposed in the support member 5600 and the elastic member 5500. The damper can prevent the resonance phenomenon that may occur during the AF/OIS feedback driving. Alternatively, as a modified embodiment, a buffer (not shown) in which the shape of the support member 5600 and/or a portion of the elastic member 5500 is changed in place of the damper may be provided. The buffer may be formed to be bent or curved.

The Hall sensor 5700 can be used for the anti-shake correction feedback function. Hall sensor 5700 may be a Hall IC. The Hall sensor 5700 can sense the magnetic force of the magnet 5320. The Hall sensor 5700 can sense movement of the housing 5310. The Hall sensor 5700 can sense the magnet 5320 fixed to the housing 5310. The Hall sensor 5700 may be electrically connected to the substrate 5410. The Hall sensor 5700 can be accommodated in the sensor accommodating portion 5433 of the base 5430. The Hall sensors 5700 are provided in two and disposed at right angle to each other with respect to the optical axis so that the movement of the housing 5310 can be detected in x-axis and y-axis components.

Hereinafter, a configuration of a lens driving device and a camera module according to a third embodiment of the present invention will be described with reference to the drawings.

Hereinafter, any one among an AF driving coil 6220, a driving magnet 6320 and an OIS driving coil 6422 is referred to as a 'first driving unit', the other one as a 'second driving unit' and the other as a 'third driving unit'. On the other hand, the AF driving coil 6220, the drive magnet 6320, and the OIS drive coil 6422 can be disposed with their positions interchanged from each other.

Hereinafter, any one among the AF driving coil 6220 and the OIS drive coil 6422 may be referred to as a "first coil" and the other as a "second coil". Hereinafter, any one among the driving magnet 6320, the sensing magnet 6730 and the compensating magnet 6800 is referred to as a 'first magnet', the other one as a 'second magnet', and the other as a 'third magnet'.

Hereinafter, any one among a substrate 6410 of a stator 6400 and the substrate 6720 of the first sensing unit 6700 may be referred to as a 'first substrate' and the other as a 'second substrate'.

Hereinafter, any one among the AF feedback sensor 6710 and the OIS feedback sensor 6900 may be referred to as a "first sensor" and the other as a "second sensor".

Hereinafter, a configuration of an optical instrument according to a third embodiment of the present invention will be described with reference to the drawings.

Figure 42:
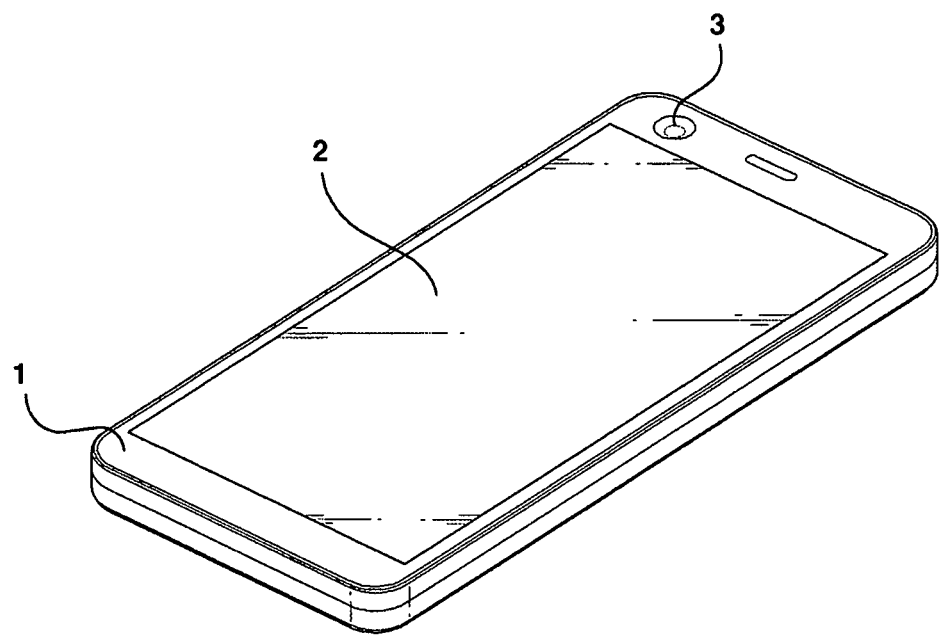
FIG. 42 is a perspective view showing an optical instrument according to the third embodiment of the present invention.

FIG. 42 is a perspective view showing an optical instrument according to the third embodiment of the present invention.

An optical instrument may be any one of a handphone, a mobile phone, a smart phone, a portable smart device, a digital camera, a laptop computer, a digital broadcast terminal, a PDA (Personal Digital Assistants), a PMP (Portable Multimedia Player), and a navigation. However, the type of the optical instrument is not limited thereto, and any device for photographing an image or a photograph may be referred to as an optical device.

The optical device may comprise a main body 1. The main body 1 can form an appearance of an optical instrument. The main body 1 can accommodate a camera module 3. A display unit 2 may be disposed on one surface of the main body 1. For example, the display unit 2 and the camera module 3 are disposed on one side of the main body 1, and the camera module 3 may be further disposed on the other surface (the surface opposite to the one surface) of the main body 1.

The optical instrument may comprise a display unit 2. The display unit 2 may be disposed on one side of the main body 1. The display unit 2 can output the image photographed by the camera module 3.

The optical instrument may comprise a camera module 3. The camera module 3 may be disposed in the main body 1. At least a portion of the camera module 3 can be housed inside the main body 1. A plurality of camera modules 3 may be provided. The camera module 3 can be disposed on one side of the main body 1 and on the other side of the main body 1, respectively. The camera module 3 can take an image of a subject.

Hereinafter, a configuration of a camera module according to a third embodiment of the present invention will be described.

The camera module 3 may comprise a lens module. The lens module may comprise at least one lens. The lens module may comprise a lens and a barrel. The lens module can be coupled to the bobbin 6210 of the lens driving device. The lens module may be coupled to the bobbin 6210 by screws and/or adhesives. The lens module can move integrally with the bobbin 6210.

The camera module 3 may comprise a filter. The filter may comprise an infrared filter. The infrared filter can block the light of the infrared region from entering into the image sensor. The infrared filter may be disposed between the lens module and the image sensor. In one example, the infrared filter may be disposed in a sensor base (not shown) disposed between the lens driving device and the printed circuit board. In another example, the infrared filter may be disposed in a base 6430.

The camera module 3 may comprise a printed circuit board. A lens driving device may be disposed on the printed circuit board. At this time, the sensor base may be disposed between the printed circuit board and the lens driving device. The printed circuit board may be electrically connected to the lens driving device. An image sensor may be disposed on the printed circuit board. The printed circuit board may be electrically connected to the image sensor.

The camera module 3 may comprise an image sensor. The image sensor may be disposed on the printed circuit board. The image sensor may be electrically connected to the printed circuit board. In one example, the image sensor may be coupled to the printed circuit board by surface mounting technology (SMT). As another example, the image sensor may be coupled to the printed circuit board by a flip chip technique. The image sensor may be disposed in a way that the optical axis of the lens module is coincided with the optical axis. That is, the optical axis of the image sensor and the optical axis of the lens module may be aligned. The image sensor can convert the light irradiated to the effective image area of the image sensor into an electrical signal. The image sensor may be any one of a charge coupled device (CCD), a metal oxide semiconductor (MOS), a CPD, and a CID.

The camera module 3 may comprise a control unit. The control portion may be disposed on the printed circuit board. The control unit can individually control the direction, intensity, and amplitude of the current supplied to the AF driving coil 6220 and the OIS driving coil 6422 of the lens driving device. The control unit controls the lens driving device to perform the autofocus function and/or the anti-shake correction function. Furthermore, the control unit may perform autofocus feedback control and/or anti-shake correction feedback control on the lens driving device.

Figure 30:
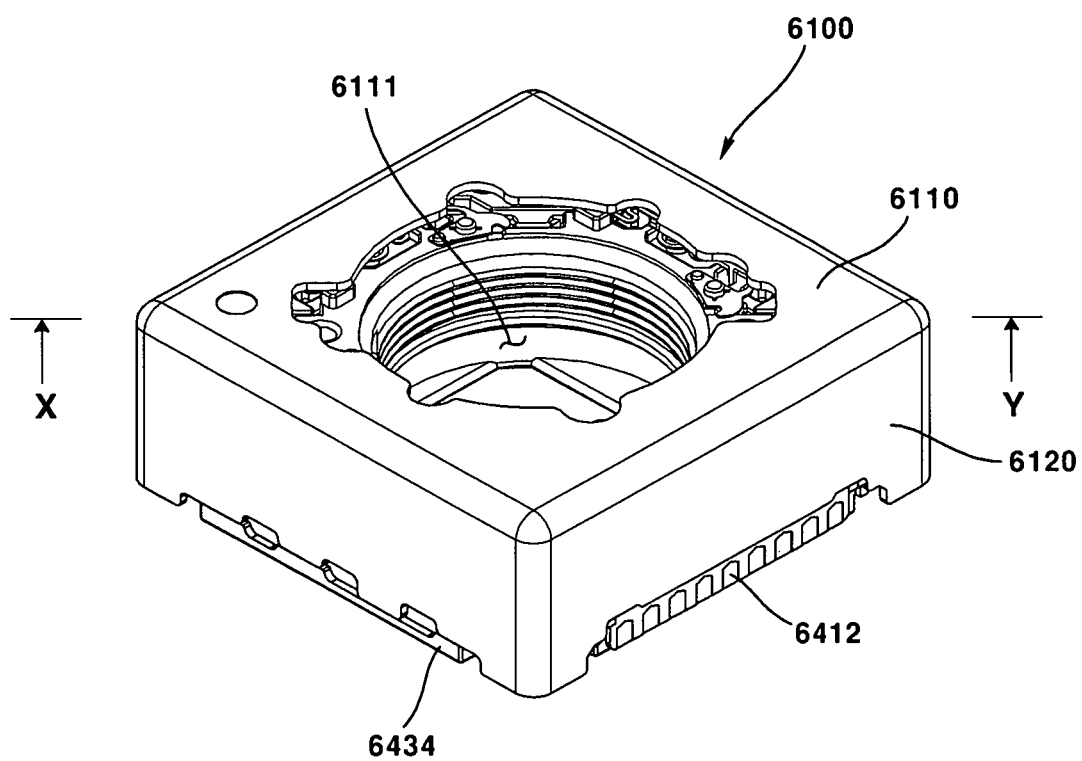
FIG. 30 is a perspective view of a lens driving device according to a third embodiment of the present invention.
Figure 31:
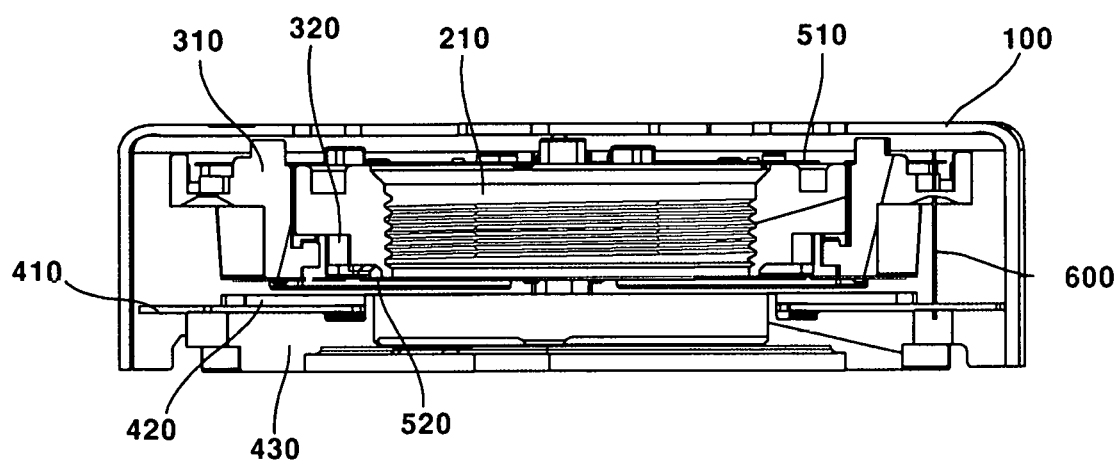
FIG. 31 is a sectional view taken along the line X-Y in FIG. 30.
Figure 32:
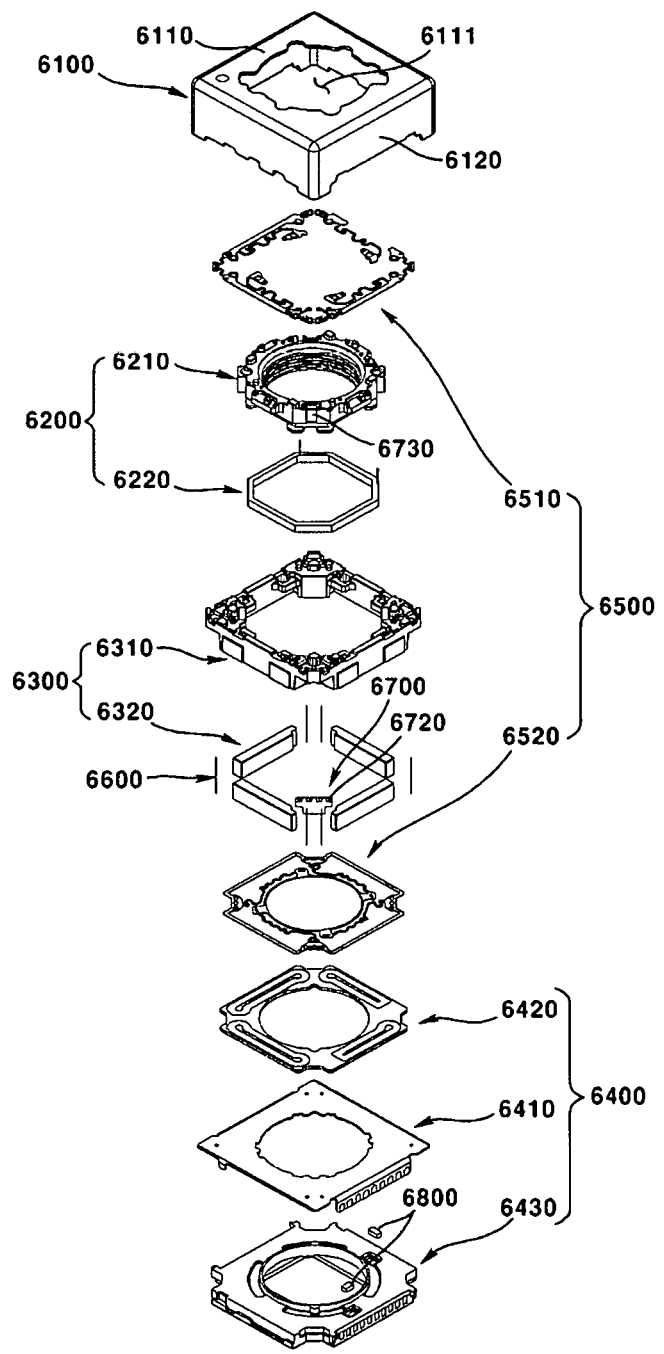
FIG. 32 is an exploded perspective view of a lens driving device according to the third embodiment of the present invention.
Figure 33:
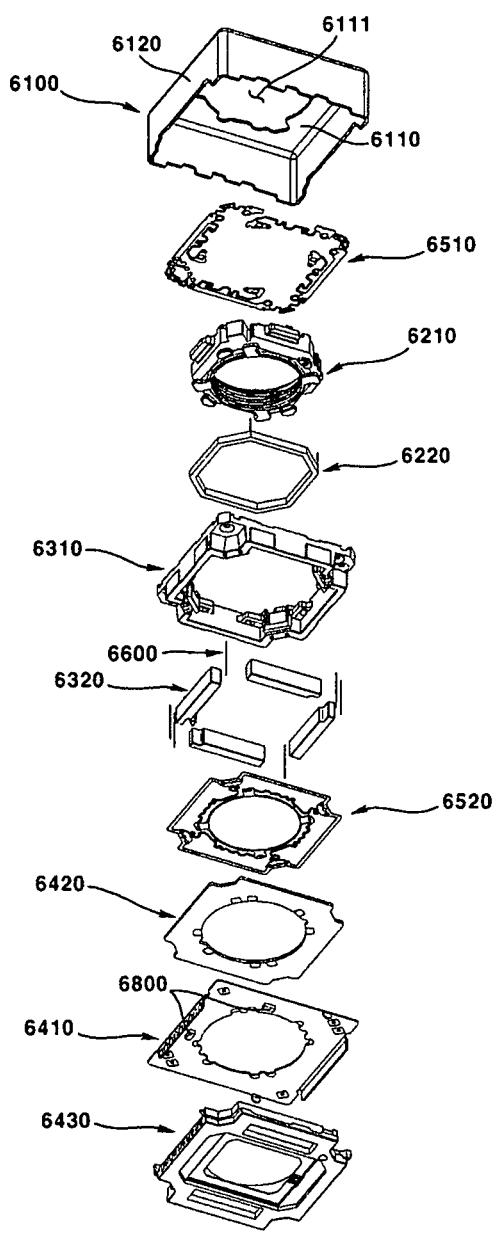
FIG. 33 is an exploded perspective view of the lens driving device according to the third embodiment of the present invention, viewed from a direction different from that of FIG. 32.
Figure 34:
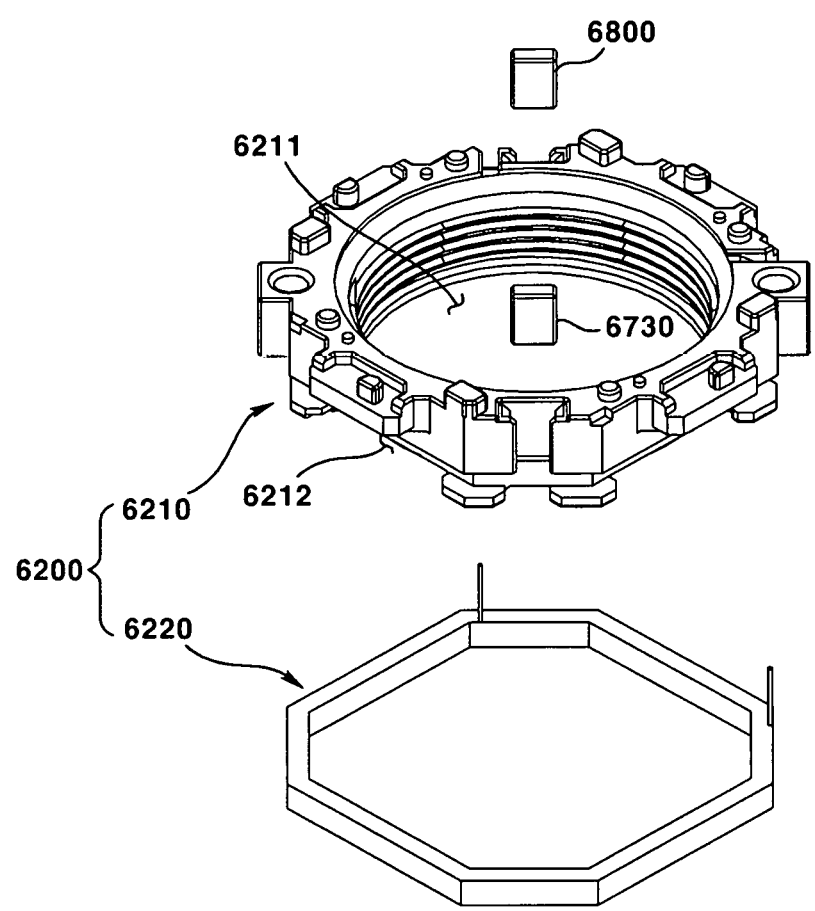
FIG. 34 is an exploded perspective view showing a first mover and related structures according to the third embodiment of the present invention.
Figure 35:
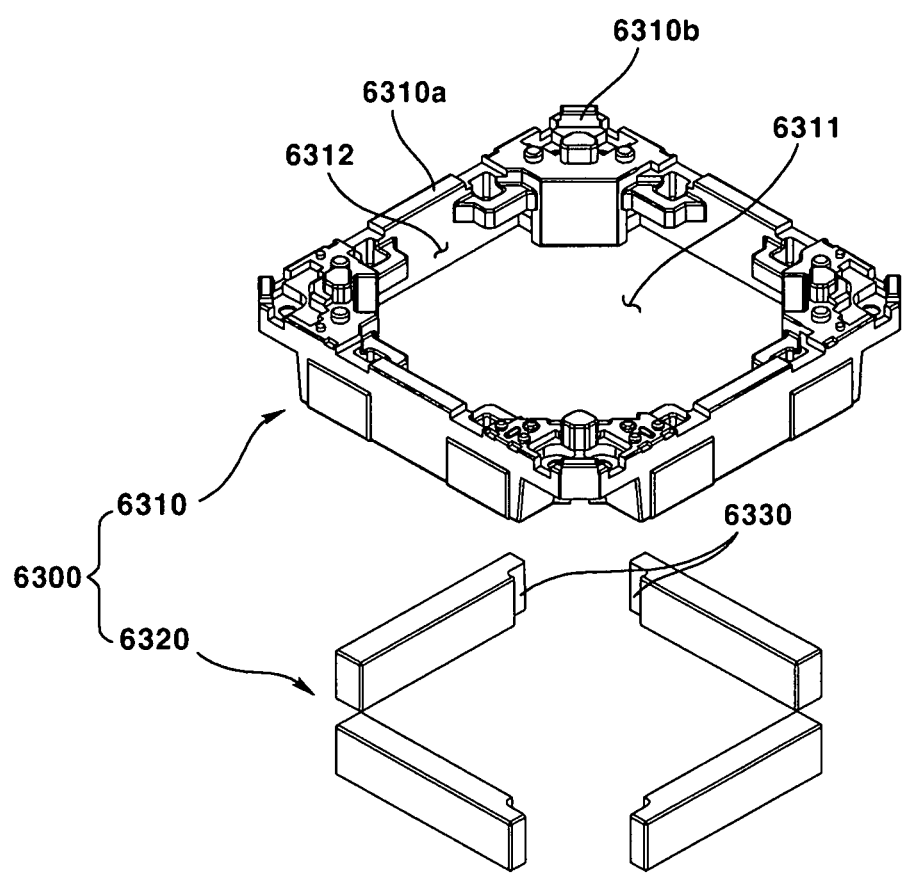
FIG. 35 is an exploded perspective view showing a second mover according to the third embodiment of the present invention.
Figure 36:
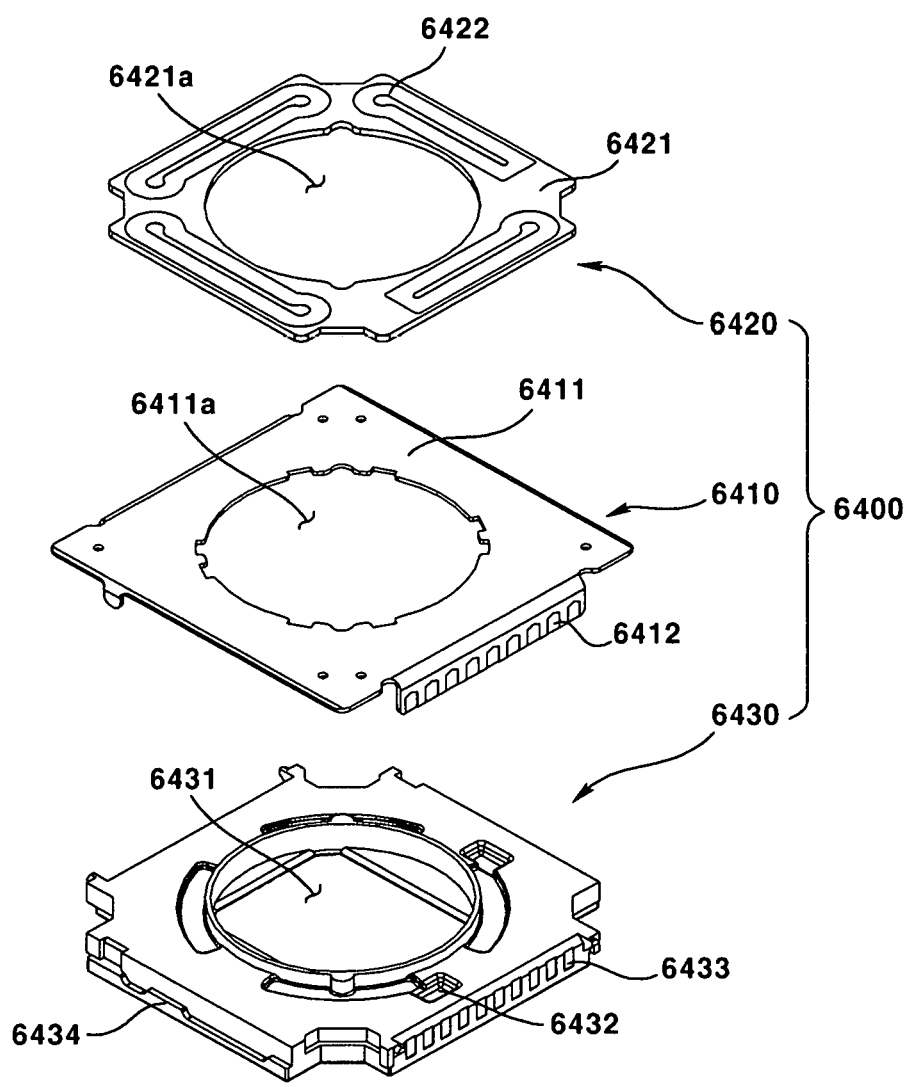
FIG. 36 is an exploded perspective view showing a stator according to the third embodiment of the present invention.
Figure 37:
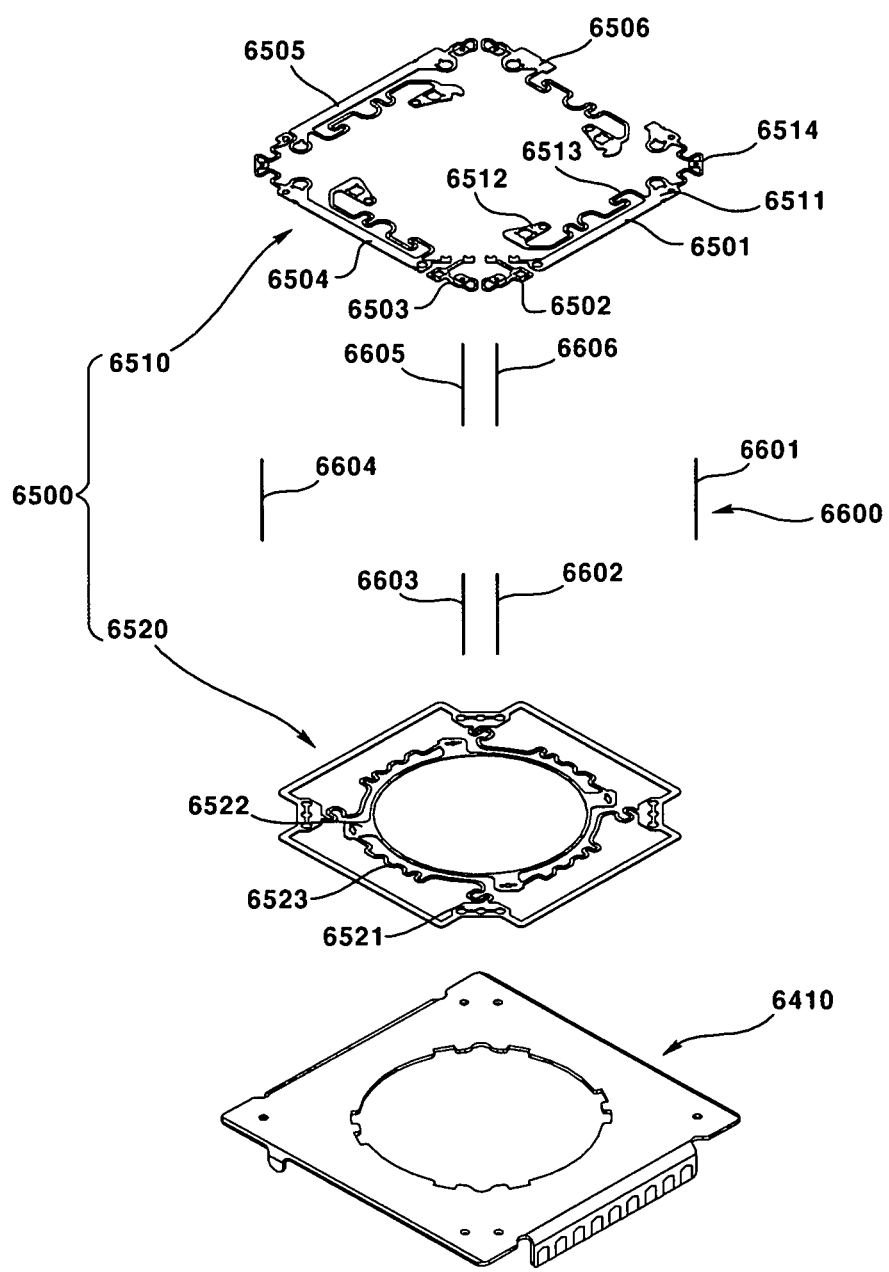
FIG. 37 is an exploded perspective view showing an elastic member, a support member, and related structures according to the third embodiment of the present invention.
Figure 38:
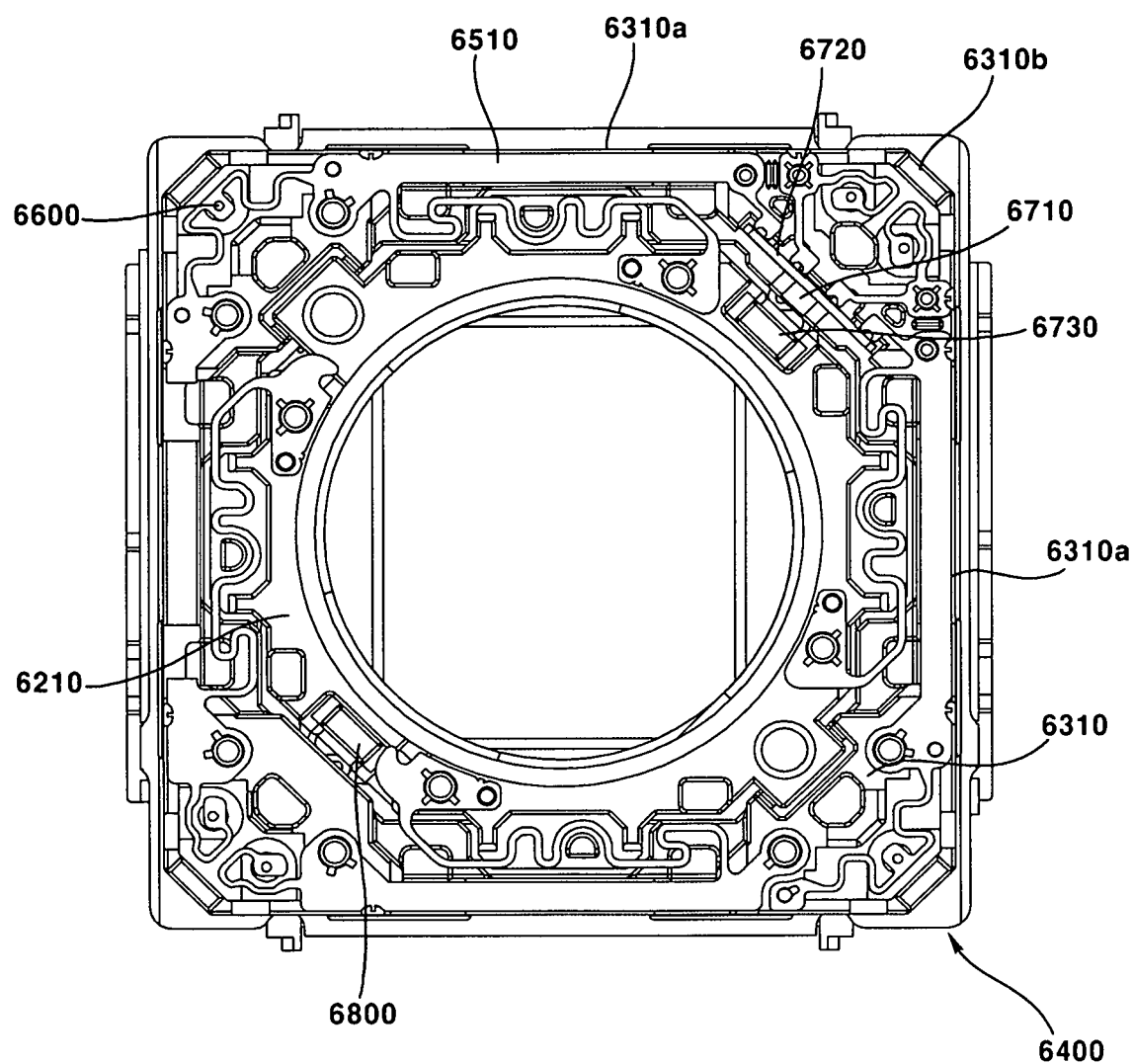
FIG. 38 is a plan view of the lens driving device according to the third embodiment of the present invention, with the cover omitted.
Figure 39:
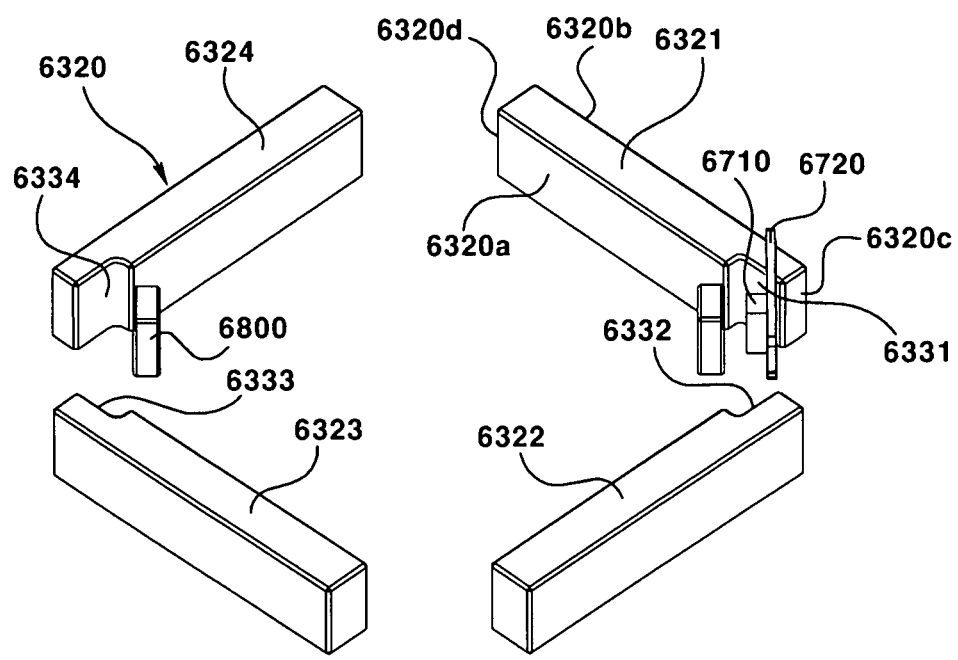
FIG. 39 is a perspective view showing a drive magnet, a first sensing unit, and related structures according to the third embodiment of the present invention.
Figure 40:
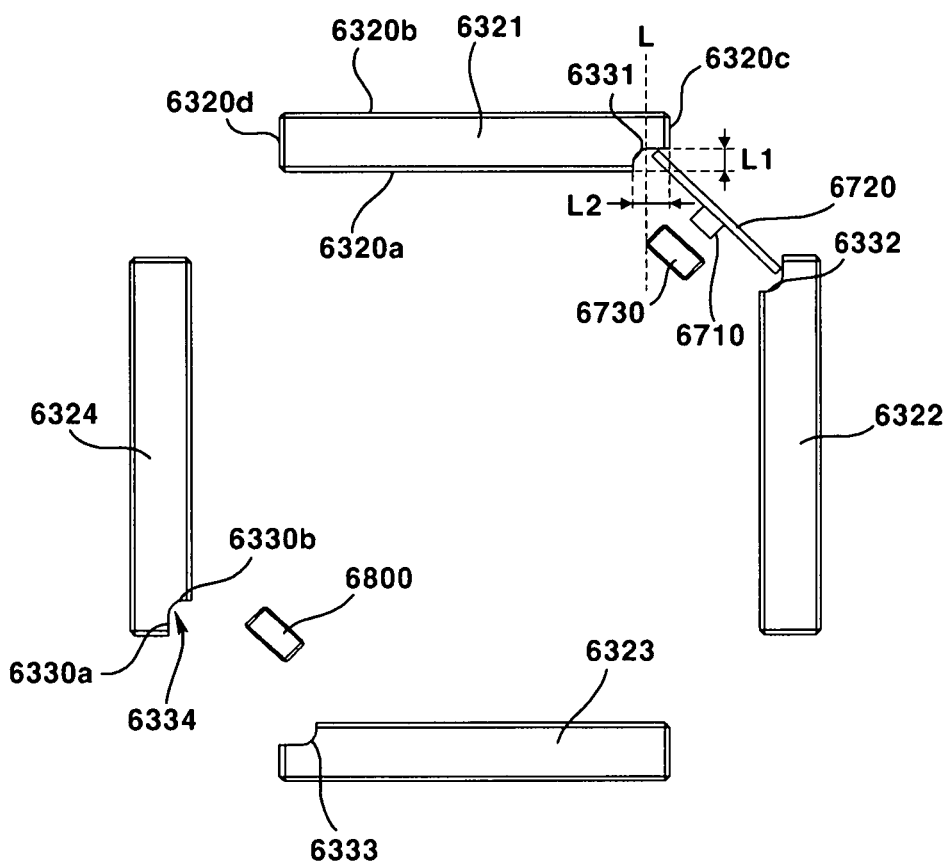
FIG. 40 is a plan view of FIG. 39 viewed from above.
Figure 41:
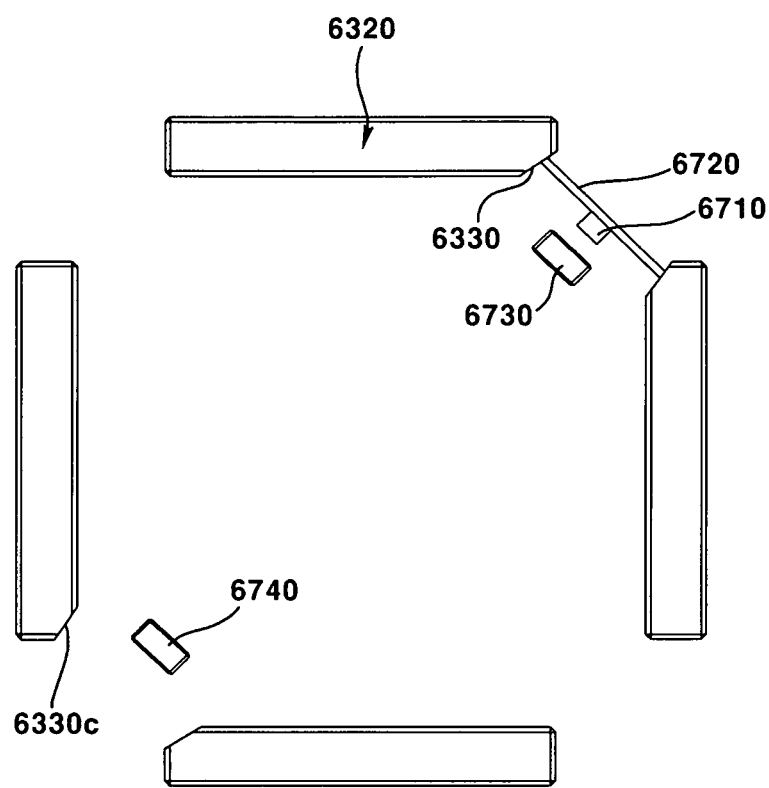
FIG. 41 is a plan view showing the drive magnet, the first sensing unit and the related driving of the lens driving device according to a modified embodiment.

Hereinafter, the configuration of a lens driving device according to a third embodiment of the present invention will be described with reference to the drawings. FIG. 30 is a perspective view of a lens driving device according to a third embodiment of the present invention, FIG. 31 is a sectional view taken along the line X-Y in FIG. 30, FIG. 32 is an exploded perspective view of a lens driving device according to the third embodiment of the present invention, FIG. 33 is an exploded perspective view of the lens driving device according to the third embodiment of the present invention, viewed from a direction different from that of FIG. 32, FIG. 34 is an exploded perspective view showing a first mover and related structures according to the third embodiment of the present invention, FIG. 35 is an exploded perspective view showing a second mover according to the third embodiment of the present invention, FIG. 36 is an exploded perspective view showing a stator according to the third embodiment of the present invention, FIG. 37 is an exploded perspective view showing an elastic member, a support member, and related structures according to the third embodiment of the present invention, FIG. 38 is a plan view of the lens driving device according to the third embodiment of the present invention, with the cover omitted, FIG. 39 is a perspective view showing a drive magnet, a first sensing unit, and related structures according to the third embodiment of the present invention. FIG. 40 is a plan view of FIG. 39 viewed from above, and FIG. 41 is a plan view showing the drive magnet, the first sensing unit and the related driving of the lens driving device according to a modified embodiment. The lens driving device may be a voice coil motor (VCM).

The lens driving device may comprise a cover 6100. The cover 6100 can be coupled with the base 6430. The cover 6100 can accommodate the housing 6310 inside or inner side. The cover 6100 can form an appearance of the lens driving device. The cover 6100 may be in the form of a hexahedron whose lower surface is opened. The cover 6100 may be a non-magnetic material. The cover 6100 may be formed of a metal material.

The cover 6100 may be formed of a metal plate. The cover 6100 may be connected to the ground portion of the printed circuit board. Through this, the cover 6100 can be grounded. The cover 6100 may block electromagnetic interference (EMI). At this time, the cover 6100 may be referred to as an EMI shield can.

The cover 6100 may comprise an upper plate 6110 and a side plate 6120. The cover 6100 may comprise an upper plate 6110 and a side plate 6120 extending downward from an outer periphery or edge of the upper plate 6110. The lower end of the side plate 6120 of the cover 6100 may be disposed at a stepped portion 6434 of the base 6430. The inner surface of the side plate 6120 of the cover 6100 can be coupled to the base 6430 by an adhesive.

The upper plate 6110 of the cover 6100 may comprise a through hole 6111. The through hole 6111 may be formed in the upper plate 6110 of the cover 6100. The through hole 6111 can expose the lens upward. The through hole 6111 may be formed in a size and shape corresponding to the lens. The size of the through hole 6111 may be larger than the diameter of the lens module so that the lens module can be inserted and assembled through the through hole 6111. The light introduced through the through hole 6111 can pass through the lens. At this time, the light passing through the lens can be converted into an electrical signal in the image sensor and can be obtained as an image.

The lens driving device may comprise a first mover 6200. The first mover 6200 can be coupled to the lens. The first mover 6200 can be coupled with a second mover 6300 through an elastic member 6500. The first mover 6200 can move through the interaction with the second mover 6300. At this time, the first mover 6200 can move integrally with the lens. On the other hand, the first mover 6200 can move during AF driving. At this time, the first mover 6200 may be referred to as an 'AF mover'. However, the first mover 6200 can also move during OIS driving.

The first mover 6200 may comprise a bobbin 6210. The bobbin 6210 may be disposed inside or within the housing 6310. The bobbin 6210 may be disposed in the through hole 6311 of the housing 6310. The bobbin 6210 may be movably coupled to the housing 6310. The bobbin 6210 can move in the direction of the optical axis with respect to the housing 6310. A lens may be coupled to the bobbin 6210. The bobbin 6210 and the lens can be coupled by a screw-coupling and/or an adhesive. The AF driving coil 6220 can be coupled to the bobbin 6210. An upper elastic member 6510 may be coupled to the upper surface of the bobbin 6210. A lower elastic member 6520 may be coupled to the lower surface of the bobbin 6210. The bobbin 6210 may be bonded to the elastic member 6500 by thermal welding and/or an adhesive. The adhesive for bonding the bobbin 6210 and the lens and the bobbin 6210 and the elastic member 6500 may be an epoxy which is cured by one or more among ultraviolet (UV) light, heat, and laser.

The bobbin 6210 may comprise a through hole 6211. The through hole 6211 can penetrate the bobbin 6210 in the optical axis direction. The lens module can be accommodated in the through hole 6211. For example, a thread corresponding to a thread formed on the outer circumferential surface of the lens module may be disposed on the inner circumferential surface of the bobbin 6210 forming the through hole 6211.

The bobbin 6210 may comprise a driving portion coupling portion 6212. The AF driving coil 6220 may be coupled to the driving portion coupling portion 6212. The driving portion coupling portion 6212 may be disposed on the outer circumferential surface of the bobbin 6210. The driving portion coupling portion 6212 may comprise a groove formed by recessing a portion of the outer surface of the bobbin 6210. At this time, the AF driving coil 6220 can be accommodated in the groove of the driving portion coupling portion 6212. The driving portion coupling portion 6212 may be formed integrally with the outer circumferential surface of the bobbin 6210.

The first mover 6200 may comprise the AF driving coil 6220. The AF driving coil 6220 may be disposed in the bobbin 6210. The AF driving coil 6220 may be disposed between the bobbin 6210 and the housing 6310. The AF driving coil 6220 may be disposed on the outer circumferential surface of the bobbin 6210. The AF driving coil 6220 can be directly wound on the bobbin 6210. Alternatively, the AF driving coil 6220 in a directly wound state may be coupled to the bobbin 6210. The AF driving coil 6220 may face the drive magnet 6320. The AF driving coil 6220 can be electromagnetically interacted with the drive magnet 6320. In this case, when an electric current is supplied to the AF driving coil 6220 to form an electromagnetic field around the AF driving coil 6220, the electromagnetic force is generated by the electromagnetic interaction between the AF driving coil 6220 and the drive magnet 6320 so that the AF driving coil 6220 can be moved with respect to the drive magnet 6320. The AF driving coil 6220 may be a single coil formed integrally.

The AF driving coil 6220 may comprise a pair of lead wires for power supply. One end (lead wire) of the AF driving coil 6220 is coupled to a fifth upper elastic unit 6505 and the other end (lead wire) of the AF driving coil 6220 may be coupled to a sixth upper elastic unit 6506. That is, the AF driving coil 6220 can be electrically connected to the upper elastic member 6510. More specifically, the AF driving coil 6220 can be sequentially supplied with power through the printed circuit board, the substrate 6410, a support member 6600, and the upper elastic member 6510. Alternatively, the AF driving coil 6220 may be electrically connected to the lower elastic member 6520.

The lens driving device may comprise a second mover 6300. The second mover 6300 can be movably coupled to the stator 6400 through the support member 6600. The second mover 6300 can support the first mover 6200 via the elastic member 6500. The second mover 6300 can move the first mover 6200 or move with the first mover 6200. The second mover 6300 can move through interaction with the stator 6400. The second mover 6300 can move during OIS driving. At this time, the second mover 6300 may be referred to as an 'OIS mover'. The second mover 6300 can move integrally with the first mover 6200 during OIS driving.

The second mover 6300 may comprise a housing 6310. The housing 6310 may be disposed outside the bobbin 6210. The housing 6310 can accommodate at least a portion of the bobbin 6210 inside. The housing 6310 may be disposed inner side or inside the cover 6100. The housing 6310 may be disposed between the cover 6100 and the bobbin 6210. The housing 6310 may be formed of a material different from that of the cover 6100. The housing 6310 may be formed of an insulating material. The housing 6310 may be formed of an injection molded article. The outer side surface of the housing 6310 may be spaced apart from the inner surface of the side plate 6120 of the cover 6100. Through the separating space between the housing 6310 and the cover 6100, the housing 6310 can move for OIS driving. A drive magnet 6320 may be disposed in the housing 6310. The housing 6310 and the drive magnet 6320 may be bonded together by an adhesive. The upper elastic member 6510 may be coupled to an upper surface of the housing 6310. The lower elastic member 6520 may be coupled to a lower surface of the housing 6310. The housing 6310 may be coupled to the elastic member 6500 by thermal welding and/or adhesive. The adhesive that couples the housing 6310 and the drive magnet 6320, and the housing 6310 and the elastic member 6500 may be an epoxy that is cured by any one or more among ultraviolet (UV) light, heat, and laser. The housing 6310 may comprise a support portion formed in a shape corresponding to the groove portion 6330 to support the groove portion 6330.

The housing 6310 may comprise four sides 6310a and four corner portions 6310b disposed between the four sides 6310a. The housing 6310 may comprise a first side, a second side, and a first corner portion disposed between the first side and the second side. The housing 6310 may comprise a third side disposed opposite the first side, a fourth side disposed opposite the second side, and a second corner portion disposed between the third side and the fourth side.

The housing 6310 may comprise a through hole 6311. The through hole 6311 may be formed in the housing 6310. The through hole 6311 may be formed to penetrate the housing 6310 in the optical axis direction. A bobbin 6210 may be disposed in the through hole 6311. The through hole 6311 may be formed in a shape corresponding to the bobbin 6210 at least in part. The inner circumferential surface of the housing 6310 forming the through hole 6311 may be located spaced apart from the outer circumferential surface of the bobbin 6210. However, the housing 6310 and the bobbin 6210 may be overlapped at least a part in the optical axis direction to limit the moving stroke distance of the bobbin 6210 in the optical axis direction.

The housing 6310 may comprise a driving portion engaging portion 6312. A drive magnet 6320 may be coupled to the driving portion coupling portion 6312. The driving portion coupling portion 6312 may comprise a groove formed by recessing a portion of the inner circumferential surface and/or the lower surface of the housing 6310. The driving portion engaging portion 6312 may be formed on each of the four sides 6310a of the housing 6310. As a modified embodiment, the driving portion engaging portion 6312 may be formed at each of the four corner portions 6310b of the housing 6310. The second mover 6300 may comprise a drive magnet 6320. The drive magnet 6320 may be disposed in the housing 6310. The drive magnet 6320 can be fixed to the housing 6310 by an adhesive. The drive magnet 6320 may be disposed between the bobbin 6210 and the housing 6310. The drive magnet 6320 may face the AF driving coil 6220. The drive magnet 6320 can be electromagnetically interacted with the AF driving coil 6220. The drive magnet 6320 can face the OIS driving coil 6422. The drive magnet 6320 can be electromagnetically interacted with the OIS driving coil 6422. The drive magnet 6320 can be commonly used for AF driving and OIS driving. The drive magnet 6320 may be disposed on the side of the housing 6310. At this time, the drive magnet 6320 may be a flat plate magnet having a flat plate shape. As a modified embodiment, the drive magnet 6320 may be disposed at a corner of the housing 6310. At this time, the drive magnet 6320 may be a corner magnet having an inner side surface having a hexahedron shape wider than the outer side surface.

The drive magnet 6320 may comprise an inner surface 6320a facing the first coil 6220 and side surfaces 6320c and 6320d disposed on the corner portion 6310b side of the housing 6310. The drive magnet 6320 may comprise an outer surface 6320b disposed opposite the inner surface 6320a. The side surfaces 6320c and 6320d of the drive magnet 6320 may comprise a first side surface 6320c disposed on the first corner portion or the second corner portion of the housing 6310 and a second side surface 6320d disposed on the opposite side of the first side surface 6320c. The size of the first side surface 6320c of the drive magnet 6320 may be smaller than the size of the inner surface 6320a of the drive magnet 6320.

The drive magnet 6320 may comprise a groove portion 6330 disposed at a corner connecting the inner surface 6320a and the first side surface 6320c. At this time, the area of the inner surface 6320a of the drive magnet 6320 may be smaller than the area of the outer surface 6320b of the drive magnet 6320. In the present embodiment, since a portion of the inner surface 6320a of the drive magnet 6320 is omitted by the groove portion 6330, when the area of the inner surface 6320a of the drive magnet 6320 in which the groove portion 6330 is formed is compared with the area of the outer surface 6320b of the drive magnet 6320, the area of the inner surface 6320a may be smaller than the area of the outer surface 6320b. The area of the first side surface 6320c of the drive magnet 6320 may be smaller than the area of the second side surface 6320d of the drive magnet 6320. In the present embodiment, since a portion of the first side surface of the drive magnet 6320 is omitted by the groove portion 6330, when the area of the first side surface 6320c of the drive magnet 6320 formed with the groove portion 6330 is compared with the second side surface 6320d of the drive magnet 6320, the area of the first side surface 6320c may be smaller than the area of the second side surface 6320d.

The drive magnet 6320 may comprise first to fourth magnet units 6321, 6322, 6323, and 6324 that are spaced apart from each other. The drive magnet 6320 may comprise a first magnet unit 6321 disposed on the first side of the housing 6310 and a second magnet unit 6322 disposed on the second side of the housing 6310. At this time, the first sensor 6710 may be disposed at the first corner portion of the housing 6310. That is, the first sensor 6710 may be disposed between the first magnet unit 6321 and the second magnet unit 6322. However, the first sensor 6710 may be disposed above the first magnet unit 6321 and the second magnet unit 6322. The drive magnet 6320 may comprise a third magnet unit 6323 disposed on the third side of the housing 6310 and a fourth magnet unit 6324 disposed on the fourth side of the housing 6310.

The first magnet unit 6321 may comprise a first groove portion 6331 formed on the first corner portion side of the housing 6310. The first magnet unit 6321 may comprise a first groove portion 6331 disposed at a corner connecting the inner surface 6320a and the first side surface 6320c. The area of the inner surface 6320a of the first magnet unit 6321 may be smaller than the area of the outer surface 6320*b* of the first magnet unit 6321. The area of the first side surface 6320*c* of the first magnet unit 6321 may be smaller than the area of the second side surface 6320*d* of the first magnet unit 6321. The second magnet unit 6322 may comprise a second groove portion 6332 formed on the first corner portion side of the housing 6310. The second magnet unit 6322 may comprise a second groove portion 6332 disposed at a corner connecting the inner surface 6320*a* and the first side surface 6320*c*. The area of the inner surface 6320*a* of the second magnet unit 6322 may be smaller than the area of the outer surface 6320*b* of the second magnet unit 6322. The area of the first side surface 6320*c* of the second magnet unit 6322 may be smaller than the area of the second side surface 6320*d* of the second magnet unit 6322.

The third magnet unit 6323 may comprise a third groove portion 6333 formed on the second corner portion side of the housing 6310. The third magnet unit 6323 may comprise a third groove portion 6333 disposed at a corner connecting the inner surface 6320*a* and the first side surface 6320*c*. The area of the inner surface 6320*a* of the third magnet unit 6323 may be smaller than the area of the outer surface 6320*b* of the third magnet unit 6323. The area of the first side surface 6320*c* of the third magnet unit 6323 may be smaller than the area of the second side surface 6320*d* of the third magnet unit 6323.

The fourth magnet unit 6324 may comprise a fourth groove 334 formed on the second corner portion side of the housing 6310. The fourth magnet unit 6324 may comprise a fourth groove 334 disposed at a corner connecting the inner surface 6320*a* and the first side surface 6320*c*. The area of the inner surface 6320*a* of the fourth magnet unit 6324 may be smaller than the area of the outer surface 6320*b* of the fourth magnet unit 6324. The area of the first side surface 6320*c* of the fourth magnet unit 6324 may be smaller than the area of the second side surface 6320*d* of the fourth magnet unit 6324.

The drive magnet 6320 may comprise a groove portion 6330. The groove portion 6330 may be disposed at a corner connecting the inner surface 6320*a* of the drive magnet 6320 and the first side surface 6320*c*. Since, in the present embodiment, a portion of the inner surface 6320*a* and the first side surface 6320*c* of the drive magnet 6320 is omitted by the groove portion 6330, the magnetic force distribution formed through the inner surface 6320*a* and the first side surface 6320*c* of the drive magnet 6320 can be altered. With this structure of the groove portion 6330, the influence of the drive magnet 6320 on the AF feedback sensor 6710 and/or the sensing magnet 6730 can be minimized. The groove portion 6330 may be provided in any shape in which the influence of the drive magnet 6320 on the AF feedback sensor 6710 and/or the sensing magnet 6730 can be minimized. The groove portion 6330 may be formed only at one side corner of the four side corners of the driving magnet 6320. Only one side corner of the four side corners of the drive magnet 6320 may have a shape different from the remaining three side corners. The drive magnet 6320 may have an asymmetric shape. The groove portions 6320 can be extended from the upper surface to the lower surface of the driving magnet 6320 in a predetermined shape. The groove portion 6320 may be integrally formed with the drive magnet 6320.

The length from the inner surface 6320*a* of the drive magnet 6320 to the groove portion 6330 (refer to L1 in FIG. 11) may be smaller than the length from the first side surface 6320*c* of the drive magnet 6320 to the groove portion 6330 (refer to L2 in FIG. 11). The length L1 from the inner surface 6320*a* of the drive magnet 6320 to the groove 6330 may be half or less of the thickness of the drive magnet 6320. The groove portion 6330 may be overlapped with an imaginary straight line (refer to L in FIG. 11) extending perpendicularly to the outer surface 6320*b* of the drive magnet 6320 at the end of the sensing magnet 6730. That is, the length L2 from the first side 6320*c* of the drive magnet 6320 to the groove 6330 is longer than the distance between the imaginary straight-line L and the first side 6320*c* of the drive magnet 6320. That is, the groove portion 6330 is asymmetric with respect to the virtual corner where the imaginary extended surface of the inner surface 6320*a* of the drive magnet 6320 meets the imaginary extended surface of the first side surface 6320*c* of the drive magnet 6320. As a modified embodiment, the length from the inner surface 6320*a* of the drive magnet 6320 to the groove 6330 may correspond to the length from the first side surface 6320*c* of the drive magnet 6320 to the groove 6330. As another modified embodiment, the length from the inner surface 6320*a* of the drive magnet 6320 to the groove 6330 may be greater than the length from the first side surface 6320*c* of the drive magnet 6320 to the groove 6330.

The groove portion 6330 may comprise a plane 6330*a* parallel to the inner surface 6320*a* of the drive magnet 6320 and a curved surface 6330*b* connecting the plane 6330*a* and the inner surface 6320*a* of the drive magnet 6321. In the present embodiment, the groove portion 6330 may be formed as a curved surface 6330*b* at least in part. The groove portion 6330 may be formed by R-cut machining. The groove 6330 may be formed as a round cut in a portion of the edge of the drive magnet 6320. The corner of the drive magnet 6320 may have a basic curvature generated during the machining process of the edges. However, the curvature of the groove portion 6330 may be different from the basic curvature generated during the machining process of the edges. That is, the shape of the groove 6330 may be different from other corner shapes of the drive magnet 6320. The groove portion 6330 may be formed by chamfering. The groove 6330 may be formed by recessing a portion of the drive magnet 6320.

As a modified embodiment, the groove 6330 may comprise an inclined surface 6330*c*. The groove portion 6330 may be formed by C-cut processing. The inclined surface 6330*c* can form an obtuse angle with the inner surface 6320*a* and the first side surface 6320*c* of the drive magnet 6320, respectively. The inclined surface 6330*c* can form an angle of 135 degrees with the inner surface 6320*a* and the first side surface 6320*c* of the drive magnet 6320, respectively. The inclined surface 6330*c* may form 6120 degrees to 150 degrees with respect to the inner surface 6320*a* and the first side surface 6320*c* of the drive magnet 6320, respectively. Alternatively, the groove portion 6330 may be formed by an inverse L-cut or an L-cut process. In this case, the inclined surface may comprise a plurality of inclined surfaces, and the plurality of inclined surfaces may form 90 degrees with the inner surface 6320*a* and the first side surface 6320*c*, respectively.

The groove portion 6330 may be disposed in each of the four drive magnets 6320. The groove portion 6330 comprises a first groove 6331 disposed in the first magnet unit 6321, a second groove 6332 disposed in the second magnet unit 6322, a third groove 6333 disposed in the third magnet unit 6323, and a fourth groove 334 disposed in the fourth magnet unit 6324. The first to fourth grooves 6331, 6332, 6333, and 334 may have a shape corresponding to each other. The first and second grooves 6331 and 6332 may face each other. The third and fourth grooves 6333 and 334 may face each other.

The first groove 6331 can connect the first side surface and the second side surface of the first magnet unit 6321. At this time, the first side surface may be the side surface disposed at the side of the first corner portion of the housing 6310 in the first magnet unit 6321, and the second side surface may be the side surface facing the AF coil 6220 in the first magnet unit 6321. The first magnet unit 6321 may further comprise a third side surface opposite to the first side surface and a fourth side surface opposite the second side surface. At this time, the area of the second side surface of the first magnet unit 6321 is smaller than the area of the fourth side surface of the first magnet unit 6321, and the area of the first side surface of the first magnet unit 6321 is smaller than the area of the second side surface of the first magnet unit 6321. This is a characteristic due to the first groove 6331, and with this characteristic, in the present embodiment, the influence of the first magnet unit 6321 on the AF feedback sensor 6710 can be minimized.

The second groove 6332 can connect the fifth side surface and the sixth side surface of the second magnet unit 6322. The fifth side surface is disposed on the first corner portion side of the housing 6310 in the second magnet unit 6322 and the sixth side surface is the side surface facing the AF coil 6220 in the second magnet unit 6322. The second magnet unit 6322 may further comprise a seventh side surface opposite to the fifth side surface and an eighth side surface opposite the sixth side surface. At this time, the area of the sixth side surface of the second magnet unit 6322 may be smaller than the area of the eighth side surface of the second magnet unit 6322, and the area of the fifth side surface of the second magnet unit 6322 may be smaller than that of the seventh side surface of the second magnet unit 6322. This is a characteristic due to the second groove 6332. With this characteristic, in the present embodiment, the influence of the second magnet unit 6322 on the AF feedback sensor 6710 can be minimized.

The lens driving device may comprise a stator 6400. The stator 6400 may be disposed below the first and the second movers 6200 and 6300. The stator 6400 can movably support the second mover 6300. The stator 6400 can move the second mover 6300. At this time, the first mover 6200 can also move together with the second mover 6300.

The stator 6400 may comprise a substrate 6410. The substrate 6410 may comprise an OIS driving coil 6422 facing the drive magnet 6320. The substrate 6410 may be disposed on the base 6430. The substrate 6410 may be disposed between the housing 6310 and the base 6430. The support member 6600 can be coupled to the substrate 6410. The substrate 6410 can supply power to the OIS driving coil 6422. The substrate 6410 may be coupled to the circuit member 6420. The substrate 6410 may be coupled with the OIS driving coil 6422. The substrate 6410 may be coupled to a printed circuit board disposed below the base 6430. The substrate 6410 may comprise a flexible printed circuit board (FPCB). The substrate 6410 may be partially bent.

The substrate 6410 may comprise a body portion 6411. The substrate 6410 may comprise a through hole 6411a formed in the body portion 6411. The substrate 6410 may comprise a through hole 6411a corresponding to a lens coupled to the bobbin 6210. The substrate 6410 may comprise a terminal portion 6412. The terminal portion 6412 may be extended from the body portion 6410 of the substrate 6410. The terminal portion 6412 may be formed by bending a portion of the substrate 6410 downward. At least a portion of the terminal portion 6412 may be exposed to the outside. The terminal portion 6412 may be coupled to a printed circuit board disposed below the base 6430 by soldering. The terminal portion 6412 can be disposed in a terminal accommodating portion 6433 of the base 6430.

The stator 6400 may comprise a circuit member 6420. The circuit member 6420 may be disposed on the base 6430. The circuit member 6420 may be disposed on the substrate 6410. The circuit member 6420 may be disposed between the drive magnet 6320 and the base 6430. Here, although the circuit member 6420 is described as a to component separated from the substrate 6410, the circuit member 6420 can also be understood as a constituent included in the substrate 6410.

The circuit member 6420 may comprise a substrate portion 6421. The substrate portion 6421 may be a circuit substrate. The substrate portion 6421 may be an FPCB. The OIS driving coil 6422 may be integrally formed with a fine pattern coil (FP coil) on the substrate portion 6421. A hole through which the support member 6600 passes may be formed in the substrate portion 6421. The substrate portion 6421 may comprise a through hole 6421a. The through hole 6421a of the substrate portion 6421 may be disposed to correspond to the through hole 6411a of the substrate 6410.

The circuit member 6420 may comprise an OIS driving coil 6422. The OIS driving coil 6422 can be opposed to the drive magnet 6320. The OIS driving coil 6422 can be electromagnetically interacted with the drive magnet 6320. In this case, when a current is supplied to the OIS driving coil 6422 and a magnetic field is formed around the OIS driving coil 6422, electromagnetic interference between the OIS driving coil 6422 and the drive magnet 6320 causes the drive magnet 6320 to move with respect to the OIS driving coil 6422. The OIS driving coil 6422 can move the housing 6310 and the bobbin 6210 in a direction perpendicular to the optical axis with respect to the base 6430 through an electromagnetic interaction with the drive magnet 6320. The OIS driving coil 6422 may be a fine pattern coil (FP coil) formed integrally with the substrate portion 6421.

The stator 6400 may comprise a base 6430. The base 6430 may be disposed lower side or below the housing 6310. The base 6430 may be disposed on the lower side of the substrate 6410. A substrate 6410 may be disposed on the upper surface of the base 6430. The base 6430 can be coupled to the cover 6100. The base 6430 may be disposed on the upper side of the printed circuit board.

The base 6430 may comprise a through hole 6431. The through hole 6431 may be formed in the base 6430. The through hole 6431 may be formed to penetrate the base 6430 in the optical axis direction. The light passing through the lens module through the through hole 6431 can be incident on the image sensor. That is, the light having passed through the lens module can be incident on the image sensor after passing through the through hole 6421a of the circuit member 6420, the through hole 6411a of the substrate 6410, and the through hole 6431 of the base 6430.

The base 6430 may comprise a sensor coupling portion 432. The OIS feedback sensor 6900 may be disposed in the sensor coupling portion 432. The sensor coupling portion 432 may accommodate at least a portion of the OIS feedback sensor 6900. The sensor coupling portion 432 may comprise a groove formed by recessing the upper surface of the base 6430. The sensor coupling portion 432 may comprise two grooves. At this time, an OIS feedback sensor 6900 is disposed in each of the two grooves, so that the movement of the drive magnet 6320 can be sensed in the x-axis direction and in the y-axis direction.

The base 6430 may comprise a terminal receiving portion 6433. A terminal portion 6412 of the substrate 6410 may be disposed in the terminal accommodating portion 6433. The terminal receiving portion 6433 may comprise a groove formed by recessing a portion of the side surface of the base 6430. The width of the terminal accommodating portion 6433 may be formed to correspond to the width of the terminal portion 6412 of the substrate 6410. The length of the terminal accommodating portion 6433 may be formed to correspond to the length of the terminal portion 6412 of the substrate 6410. Alternatively, the length of the terminal portion 6412 of the substrate 6410 is longer than the length of the terminal accommodating portion 6433, so that a portion of the terminal portion 6412 may be protruded downward from the base 6430.

The base 6430 may comprise a stepped portion 6434. The stepped portion 6434 may be formed on the side surface of the base 6430. The stepped portion 6434 can be formed around the outer circumferential surface of the base 6430. The stepped portion 6434 may be formed by protruding or recessing a portion of the side surface of the base 6430. The lower end of the side plate 6120 of the cover 6100 may be disposed on the stepped portion 6434.

The lens driving device may comprise an elastic member 6500. The elastic member 6500 may be coupled to the bobbin 6210 and the housing 6310. The elastic member 6500 can elastically support the bobbin 6210. The elastic member 6500 may have elasticity at least in part. The elastic member 6500 can movably support the bobbin 6210. The elastic member 6500 can support the movement of the bobbin 6210 during AF driving. At this time, the elastic member 6500 may be referred to as an 'AF supporting member'.

The elastic member 6500 may comprise an upper elastic member 6510. The upper elastic member 6510 may be disposed on the upper portion of the bobbin 6210. The upper elastic member 6510 may be coupled to the bobbin 6210 and the housing 6310.

The upper elastic member 6510 can be coupled to the upper surface of the bobbin 6210. The upper elastic member 6510 may be coupled to the upper surface of the housing 6310. The upper elastic member 6510 may be coupled with the support member 6600. The upper elastic member 6510 may be formed of a plate spring.

The upper elastic member 6510 may comprise first to sixth upper elastic units 6501, 6502, 6503, 6504, 6505, and 6506 that are spaced apart from each other. The upper elastic member 6510 may be used as a conductive line for supplying electricity to the AF feedback sensor 6710. The upper elastic member 6510 may comprise first to fourth upper elastic units 6501, 6502, 6503, and 6504 that are spaced apart from each other. Each of the first to fourth upper elastic units 6501, 6502, 6503, and 6504 may be coupled to a substrate 6720 to which an AF feedback sensor 6710 is coupled. The upper elastic member 6510 and the substrate 6710 may be coupled by soldering. The upper elastic member 6510 may be used as a conductive line for supplying electricity to the AF driving coil 6220. The upper elastic member 6510 may comprise a fifth upper elastic unit 6505 and a sixth upper elastic unit 6506 that are spaced apart from each other. The fifth upper elastic unit 6505 may be coupled with one end of the AF driving coil 6220, and the sixth upper elastic unit 6506 may be coupled with the other end of the AF driving coil 6220. The upper elastic member 6510 and the AF driving coil 6220 can be coupled by soldering.

The upper elastic member 6510 may comprise an outer side 6511. The outer side 6511 can be coupled to the housing 6310. The outer side 6511 can be coupled to the upper surface of the housing 6310. The outer side 6511 may comprise a hole or a groove coupled to the protrusion of the housing 6310. The outer side 6511 can be fixed to the housing 6310 by an adhesive.

The upper elastic member 6510 may comprise an inner side 6512. The inner side 6512 can be coupled to the bobbin 6210. The inner side 6512 can be coupled to the upper surface of the bobbin 6210. The inner side 6512 may comprise a hole or groove coupled to a protrusion of the bobbin 6210. The inner side 6512 can be fixed to the bobbin 6210 by an adhesive.

The upper elastic member 6510 may comprise a connecting portion 6513. The connection portion 6513 can connect the outer side 6511 and the inner side 6512. The connecting portion 6513 can elastically connect the outer side 6511 and the inner side 6512. The connecting portion 6513 may have elasticity. At this time, the connecting portion 6513 may be referred to as an 'elastic portion'. The connecting portion 6513 may be formed by bending two or more times.

The upper elastic member 6510 may comprise a coupling portion 6514. The coupling portion 6514 can be coupled with the support member 6600. The coupling portion 6514 can be coupled to the support member 6600 by soldering. The coupling portion 6514 may comprise a hole or groove coupled with the support member 6600. The coupling portion 6514 may be extended from the outer side 6511. The coupling portion 6514 may comprise a bent portion formed by bending.

The elastic member 6500 may comprise a lower elastic member 6520. The lower elastic member 6520 may be disposed at the lower side of the bobbin 6210. The lower elastic member 6520 can be coupled to the bobbin 6210 and the housing 6310. The lower elastic member 6520 can be coupled to the lower surface of the bobbin 6210. The lower elastic member 6520 can be coupled to the lower surface of the housing 6310. The lower elastic member 6520 may be formed of a plate spring. The lower elastic member 6520 may be integrally formed.

The lower elastic member 6520 may comprise an outer side 6521. The outer side 6521 can be coupled to the housing 6310. The outer side 6521 can be coupled to the lower surface of the housing 6310. The outer side 6521 may comprise a hole or groove coupled to the protrusion of the housing 6310. The outer side 6521 can be fixed to the housing 6310 by an adhesive.

The lower elastic member 6520 may comprise an inner side 6522. The inner side 6522 can be coupled to the bobbin 6210. The inner side 6522 can be coupled to the lower surface of the bobbin 6210. The inner side 6522 may comprise a hole or groove coupled to a protrusion of bobbin 6210. The inner side 6522 can be fixed to the bobbin 6210 by an adhesive.

The lower elastic member 6520 may comprise a connecting portion 523. The connecting portion 523 can connect the outer side 6521 and the inner side 6522. The connecting portion 523 can elastically connect the outer side 6521 and the inner side 6522. The connecting portion 523 may have elasticity. At this time, the connecting portion 523 may be referred to as an 'elastic portion'. The connecting portion 523 may be formed by bending two or more times.

The lens driving device may comprise a support member 6600. The support member 6600 may be coupled to the upper elastic member 6510 and the substrate 6410. The support member 6600 can be coupled to the upper elastic member 6510 and the circuit member 6420 of the substrate 6410. The support member 6600 can movably support the housing 6310. The support member 6600 can elastically support the housing 6310. The support member 6600 may have elasticity at least in part. The support member 6600 can support the movement of the housing 6310 and the bobbin 6210 during OIS driving. At this time, the support member 6600 may be referred to as an 'OIS support member'. The support member 6600 may be formed of a wire. As a modified embodiment, the support member 6600 may be formed as a plate spring.

The support member 6600 may comprise a plurality of wires. The support member 6600 may comprise six wires that are spaced apart from each other. The support member 6600 may comprise first to sixth support portions 6601, 6602, 6603, 6604, 6605, and 6606 that are spaced apart from each other. The first to sixth support portions 6601, 6602, 6603, 6604, 6605, and 6606 can be used as a conductive line inside the lens driving device. The first to sixth support portions 6601, 6602, 6603, 6604, 6605, and 6606 may be coupled with the substrate 6410. The first support portion 6601 may be coupled to the first upper elastic unit 6501. The second supporting portion 6602 may be coupled to the second upper elastic unit 6502. The third support portion 6603 may be coupled to the third upper elastic unit 6503. The fourth support portion 6604 may be coupled to the fourth upper elastic unit 6504. The fifth support portion 6605 may be coupled to the fifth upper elastic unit 6505. The sixth support portion 6606 may be coupled to the sixth upper elastic unit 6506.

The lens driving device may comprise a damper (not shown). The damper may be disposed on the support member 6600. The damper may be disposed on the support member 6600 and the housing 6310. The damper may be disposed on the elastic member 6500. The damper may be disposed on the elastic member 6500 and the bobbin and/or the elastic member 6500 and the housing 6310. The damper may be disposed on the elastic member 6500 and/or the support member 6600 to prevent a resonance phenomenon generated in the elastic member 6500 and/or the support member 6600.

The lens driving device may comprise an AF feedback sensor unit 6700. AF feedback sensor unit 6700 may be provided for autofocus feedback. The AF feedback sensor unit 6700 can sense movement of the bobbin 6210 in the optical axis direction. The AF feedback sensor unit 6700 may sense the amount of the movement of the bobbin 6210 in the optical axis direction and provide it to the control unit in real time.

The lens driving device may comprise an AF feedback sensor 6710. The AF feedback sensor unit 6700 may comprise the AF feedback sensor 6710. The AF feedback sensor 6710 may be disposed in the housing 6310. As a modified embodiment, the AF feedback sensor 6710 may be disposed on the bobbin 6210. The AF feedback sensor 6710 can detect the movement of the first mover 6200. The AF feedback sensor 6710 may comprise a Hall sensor. At this time, the Hall sensor senses the magnetic force of the sensing magnet 6730 and can detect the movement of the bobbin 6210 and the lens. The sensed value sensed by the AF feedback sensor 6710 may be used for AF feedback control.

The AF feedback sensor unit 6700 may comprise a substrate 6720. The substrate 6720 may be disposed in the housing 6310. The substrate 6720 may be coupled to the AF feedback sensor 6710. The substrate 6720 may be electrically connected to the AF feedback sensor 6710. The substrate 6720 can be coupled with the upper support member 6510. The substrate 6720 may comprise four terminals coupled with the first to fourth upper elastic units 6501, 6502, 6503, and 6504. The substrate 6720 and the upper support member 6510 can be coupled by soldering. The AF feedback sensor 6710 may be disposed on the substrate 6720. The AF feedback sensor 6710 may be disposed on the inner surface of the substrate 6720. The imaginary extended surface of the inner surface of the substrate 6720 can meet with the first groove 6331 or the second groove 6332. The distance between the AF feedback sensor 6720 and the sensing magnet 6730 may be shorter than the distance between the substrate 6720 and the sensing magnet 6730.

The AF feedback sensor unit 6700 may comprise a sensing magnet 6730. The sensing magnet 6730 may be disposed on the bobbin 6210. The sensing magnet 6730 can be sensed by the AF feedback sensor 6710. The sensing magnet 6730 may face the AF feedback sensor 6710. The sensing magnet 6730 may be disposed at the corner portion of the bobbin 6210. That is, the sensing magnet 6730 may be disposed to face the corner portion 6310*b* of the housing 6310.

The lens driving device may comprise a compensation magnet 6800. The compensation magnet 6800 may be disposed on the bobbin 6210. The compensation magnet 6800 may be disposed so as to be magnetically balanced with the sensing magnet 6730. The compensation magnet 6800 may be symmetrical with the sensing magnet 6730 about the optical axis. The compensation magnet 6800 may be disposed at a position corresponding to the sensing magnet 6730 around the optical axis. The compensation magnet 6800 may have a size and/or shape corresponding to the sensing magnet 6730 about the optical axis. A sensing magnet 6730 may be disposed on one side of the bobbin 6210, and a compensating magnet 6800 may be disposed on the other side of the bobbin 6210. The compensation magnet 6800 may be disposed at a corner portion of the bobbin 6210. That is, the compensation magnet 6800 may be disposed so as to face the corner portion 6310*b* of the housing 6310.

The lens driving device may comprise an OIS feedback sensor 6900. The OIS feedback sensor 6900 is disposed on the base 6430, and can sense the drive magnet 6320. The OIS feedback sensor 6900 may be disposed between the base 6430 and the substrate 6410. The OIS feedback sensor 6900 can sense the movement of the second mover 6300. The OIS feedback sensor 6900 may comprise a Hall sensor. At this time, the Hall sensor senses the magnetic force of the drive magnet 6320 and can sense the movement of the housing 6310 and the driving magnet 6320. The sensed value sensed by the OIS feedback sensor 6900 may be used for OIS feedback control.

Hereinafter, the operation of the camera module according to the third embodiment of the present invention will be described.

The autofocus function of the camera module according to the present embodiment will be described. When power is supplied to the AF driving coil 6220, the AF driving coil 6220 moves with respect to the drive magnet 6320 by electromagnetic interaction between the AF driving coil 6220 and the drive magnet 6320. At this time, the bobbin 6210 to which the AF driving coil 6220 is coupled moves integrally with the AF driving coil 6220. That is, the bobbin 6210 to which the lens module is coupled moves in the optical axis direction with respect to the housing 6310. Such movement of the bobbin 6210 results in movement of the lens module toward or away from the image sensor, thus, in the present embodiment, power is supplied to the AF driving coil 6220, so that focus adjustment can be performed on the subject. On the other hand, the aforementioned focus adjustment can be performed automatically according to the distance of the subject.

In the camera module according to the present embodiment, autofocus feedback control can be performed for more precise realization of the autofocus function. The AF feedback sensor 6710 disposed in the housing 6310 senses the magnetic field of the sensing magnet 6730 disposed on the bobbin 6210. Therefore, when the bobbin 6210 performs relative movement with respect to the housing 6310, the amount of the magnetic field sensed by the AF feedback sensor 6710 changes. The AF feedback sensor 6710 senses the movement amount of the bobbin 6210 or the position of the bobbin 6210 in the optical axis direction in this manner and transmits the sensed value to the control unit. The control unit determines whether to perform additional movement to the bobbin 6210 according to the received sensing value. Since such a process is occurring in real time, the autofocus function of the camera module according to the present embodiment can be performed more precisely through the autofocus feedback control.

The anti-shake correction function of the camera module according to the present embodiment will be described. When the power is supplied to the OIS driving coil 6422, the drive magnet 6320 moves relative to the OIS driving coil 6422 by electromagnetic interaction between the OIS driving coil 6422 and the drive magnet 6320. At this time, the housing 6310 to which the drive magnet 6320 is coupled moves integrally with the drive magnet 6320. That is, the housing 6310 moves in the horizontal direction (direction perpendicular to the optical axis) with respect to the base 6430. However, a tilt of the housing 6310 may be induced to the base 6430 at this time. Meanwhile, the bobbin 6210 moves integrally with the housing 6310 with respect to the horizontal movement of the housing 6310. Thus, due to such movement of the housing 6310, the lens module coupled to the bobbin 6210 is moved in a direction parallel to the direction in which the image sensor lies. That is, in the present embodiment, power can be supplied to the OIS driving coil 6422, so that the anti-shake correction function can be performed.

In the camera module according to the present embodiment, the anti-shake correction feedback control can be performed for more precise realization of the anti-shake correction function. The OIS feedback sensor 6800 disposed in the base 6430 senses the magnetic field of the drive magnet 6320 disposed in the housing 6310. Thus, when the housing 6310 performs a relative movement with respect to the base 6430, the amount of the magnetic field sensed by the OIS feedback sensor 6800 changes. The pair of OIS feedback sensors 6800 senses the movement amount or position of the housing 6310 in the horizontal direction (x-axis and y-axis direction) in this way and transmits the sensed value to the control unit. The control unit determines whether to perform additional movement with respect to the housing 6310 according to the received sensed value. Since such a process is occurring in real time, the anti-shake correction function of the camera module according to the present embodiment can be performed more precisely through the anti-shake correction feedback control.

As a comparative example, a yoke (not shown) may be disposed between the drive magnets 6320 and below the AF feedback sensor 6710 to prevent magnetic interference on the drive magnet 6320. In the present embodiment, the yoke component is omitted when compared with the comparative example. In the embodiment, a groove portion 6330, which is a shape for minimizing magnetic interference, is added to the drive magnet 6320 so as to minimize magnetic interference due to deletion of the yoke component. The groove portion 6330 may be formed such that the drive magnet 6320 is spaced as far as possible from the sensing magnet 6720. The closed loop auto focus (CLAF) structure and process simplification can be expected through the groove portion 6330. Therefore, design freedom can be ensured and cost reduction can be expected as well due to the structure simplification.

Although the camera module according to the first embodiment, the camera module according to the second embodiment, and the camera module according to the third embodiment have been described with different reference numerals, the scope of the present invention is not divided thereby. And the technical spirits of the camera module according to the first to third embodiments can be employed together in a single camera module or a lens driving device.

For example, in the magnet according to the first embodiment, a plurality of depressed parts may be provided on both sides by adopting the shape of the magnet according to the second embodiment. In the lens driving device according to the third embodiment, a plurality of grooves may be formed in both corner portions of the magnet unit, or only a single groove may be formed.

It should be noted that the exemplary embodiments disclosed in the drawings are merely examples of specific examples for the purpose of understanding, and are not intended to limit the scope of the present invention. It will be apparent to those skilled in the art that other modifications based on the technical spirit of the present invention are possible in addition to the exemplary embodiments disclosed herein.

The invention claimed is:
1. A camera module comprising:
a first camera module; and
a second camera module including a second side that faces a first side of the first camera module,
wherein the first camera module comprises:
a housing;
a bobbin disposed inside the housing;
a coil disposed on the outer circumferential surface of the bobbin; and
two magnets, facing each other, that are arranged at a side of the housing in the direction perpendicular to the first side of the first camera module, so as to face the coil,
wherein each of the two magnets comprises:
an upper surface;
a lower surface;
an inner surface facing the coil;
an outer surface disposed on the reverse side to the inner surface; and
two side surfaces connecting the inner surface and the outer surface,
wherein a depressed part is provided on the side surface of the magnet, among the two side surfaces of the magnet, that is disposed on the first side of the first camera module, the depressed part being formed by recessing a portion of the side surface of the magnet,
wherein the area of the inner surface of the magnet is smaller than the area of the outer surface of the magnet, and
wherein the magnet is disposed biased toward a center line of the side of the housing.

2. The camera module according to claim 1, wherein the depressed part is formed by recessing an area of 10 to 80% of the area of one side surface of the magnet.

3. The camera module according to claim 1, wherein the width of the depressed part in the horizontal direction is 10 to 80% of the width in the horizontal direction of one side surface of the magnet.

4. The camera module according to claim 1, wherein the depressed part is extended from an upper end to a lower end of the magnet.

5. The camera module according to claim 1, wherein the depressed part comprises a concavely formed round surface.

6. The camera module according to claim 1, wherein the depressed part comprises an inclined surface forming an obtuse angle or a right angle with one side surface of the magnet.

7. The camera module according to claim 1, wherein the depressed part formed in each of the two magnets comprises an optical axis and is symmetrical with respect to an imaginary plane parallel to the inner surface of the magnet.

8. The camera module according to claim 7, wherein the housing comprises a first side disposed on a first side surface of the first camera module, a second side disposed on the reverse side of the first side, and a third side and a fourth side which are reversely disposed between the first side and the second side,
 wherein the two magnets are disposed on the third side surface and the fourth side surface, respectively, and
 wherein the magnet is disposed biased toward the second side than the first side.

9. The camera module according to claim 7, wherein the two magnets have an asymmetrical shape with respect to the center of each of the magnets, and
 wherein the two magnets have an asymmetrical shape with respect to a virtual plane that comprises the center of each and is perpendicular to the inner surface of each of the two magnets.

10. The camera module according to claim 1, wherein the housing comprises a guide portion protruding in a shape corresponding to the depressed part to support the depressed part.

11. The camera module according to claim 1, further comprising:
 an upper elastic member disposed above the bobbin and coupled to the bobbin and the housing;
 a lower elastic member disposed below the bobbin and coupled to the bobbin and the housing; and
 a base disposed below the housing,
 wherein the lower elastic members are formed in a pair spaced apart from each other and electrically connected to the coil.

12. The camera module according to claim 1, wherein the second camera module comprises:
 a second housing;
 a second bobbin disposed inside the second housing of the second camera module;
 a second base disposed below the second housing of the second camera module;
 a second magnet disposed in the second housing of the second camera module;
 a first coil disposed on an outer circumferential surface of the second bobbin of the second camera module and facing the second magnet of the second camera module; and
 a second coil disposed between the second housing of the second camera module and the second base of the second camera module and facing the second magnet of the second camera module,
 wherein the second magnet of the second camera module comprises four magnets and is disposed at the corner of the second housing of the second camera module.

13. The camera module according to claim 1, wherein the first camera module is an AF (Auto Focus) module, and the second camera module is an OIS (Optical Image Stabilization) module.

14. The camera module according to claim 10, wherein the housing includes a support portion for supporting the inner surface of the magnet.

15. The camera module according to claim 14, wherein the support portion is disposed to face the guide portion.

16. The camera module according to claim 12, wherein an inner surface of the second housing is provided with a magnet coupling portion formed by being partly depressed outward and in which the second magnet is disposed.

17. A optical instrument comprising:
 a main body;
 a dual camera module disposed in the main body and configured to photograph an image of a subject; and
 a display unit disposed in the main body and outputting an image photographed by the dual camera module,
 wherein the dual camera module includes a first camera module and a second camera module including a second side that faces a first side of the first camera module,
 wherein the first camera module comprises:
  a housing;
  a bobbin disposed inside the housing;
  a coil disposed on the outer circumferential surface of the bobbin; and
  two magnets, facing each other, that are arranged at a side of the housing in the direction perpendicular to the first side of the first camera module, so as to face the coil,
 wherein each of the two magnets comprises:
  an upper surface;
  a lower surface;
  an inner surface facing the coil;
  an outer surface disposed on the reverse side to the inner surface; and
  two side surfaces connecting the inner surface and the outer surface,
  wherein a depressed part is provided on the side surface of the magnet, among the two side surfaces of the magnet, that is disposed on the first side of the first camera module, the depressed part being formed by recessing a portion of the side surface of the magnet,
  wherein the area of the inner surface of the magnet is smaller than the area of the outer surface of the magnet, and
  wherein the magnet is disposed biased toward a center line (X) of the side of housing.

18. The optical instrument according to claim 17, wherein the depressed part formed in each of the two magnets comprises an optical axis and is symmetrical with respect to an imaginary plane parallel to the inner surface of the magnet.

19. The optical instrument according to claim 18, wherein the housing comprises a first side disposed on a first side surface of the first camera module, a second side disposed on the reverse side of the first side, and a third side and a fourth side which are reversely disposed between the first side and the second side, wherein the two magnets are disposed on the third side surface and the fourth side surface, respectively, and wherein the magnet is disposed biased toward the second side than the first side.

20. The optical instrument according to claim 18, wherein the two magnets have an asymmetrical shape with respect to the center of each of the magnets, and wherein the two magnets have an asymmetrical shape with respect to a virtual plane that comprises the center of each and is perpendicular to the inner surface of each of the two magnets.

\* \* \* \* \*